United States Patent
Luo et al.

(10) Patent No.: US 8,091,659 B2
(45) Date of Patent: Jan. 10, 2012

(54) HYBRID VEHICLE HAVING ENGAGEABLE CLUTCH ASSEMBLY COUPLED BETWEEN ENGINE AND TRACTION MOTOR

(75) Inventors: HongBing Luo, Shenzhen (CN); Yi Ren, Shenzhen (CN); ShengLin Yang, Shenzhen (CN); Tao Wang, Shenzhen (CN); Yan Liu, Shenzhen (CN)

(73) Assignee: BYD Co. Ltd., Shenzhen (CN)

( * ) Notice: Subject to any disclaimer, the term of this patent is extended or adjusted under 35 U.S.C. 154(b) by 411 days.

(21) Appl. No.: 12/341,776

(22) Filed: Dec. 22, 2008

(65) Prior Publication Data

US 2009/0166113 A1   Jul. 2, 2009

(30) Foreign Application Priority Data

| Dec. 27, 2007 | (CN) | 2007 1 0302297 |
|---|---|---|
| Jun. 24, 2008 | (CN) | 2008 1 0126506 |
| Jun. 24, 2008 | (CN) | 2008 1 0126507 |
| Oct. 11, 2008 | (CN) | 2008 1 0216727 |
| Oct. 11, 2008 | (CN) | 2008 1 0217015 |
| Oct. 11, 2008 | (CN) | 2008 1 0217016 |
| Oct. 11, 2008 | (CN) | 2008 1 0217019 |
| Dec. 13, 2008 | (CN) | 2008 1 0185948 |
| Dec. 13, 2008 | (CN) | 2008 1 0185949 |
| Dec. 13, 2008 | (CN) | 2008 1 0185950 |
| Dec. 13, 2008 | (CN) | 2008 1 0185951 |
| Dec. 13, 2008 | (CN) | 2008 1 0185952 |

(51) Int. Cl.
*B60K 6/42* (2007.10)

(52) U.S. Cl. ............... 180/65.22; 180/65.285; 903/912; 903/946; 318/34

(58) Field of Classification Search .............. 180/65.22, 180/65.225, 65.23, 65.265, 65.285, 65.6; 903/906, 909, 912, 946; 318/4, 5, 34, 45
See application file for complete search history.

(56) References Cited

U.S. PATENT DOCUMENTS 4,410,075 A   10/1983   Caray et al.
(Continued)

FOREIGN PATENT DOCUMENTS

CN   1140433 A   1/1997
(Continued)

OTHER PUBLICATIONS

Notification of International Search Report and Written Opinion for PCT/CN2008/002072 mailed by Patent Cooperation Treaty (International Searching Authority) on Apr. 2, 2009.

(Continued)

*Primary Examiner* — John Walters
(74) *Attorney, Agent, or Firm* — Brinks Hofer Gilson & Lione

(57) ABSTRACT

A hybrid vehicle includes a battery system, an internal combustion engine, a first motor/generator, a second motor/generator, and an engageable clutch assembly. The engageable clutch assembly is disposed between the internal combustion engine and the first motor/generator. When engaged, the engageable clutch assembly couples the rotor spindle of the second motor/generator with the hollow rotor shaft of the first motor/generator. The engageable clutch assembly may also operate in a first mechanical mode that selectively engages and disengages the internal combustion engine from the second motor/generator, or operate in a second mechanical mode that dampens shock between the internal combustion engine and the first motor/generator when the international combustion engine operates at a rotational speed that is different than a rotational of the first motor/generator.

21 Claims, 39 Drawing Sheets

U.S. PATENT DOCUMENTS

| | | | |
|---|---|---|---|
| 4,787,612 A | | 11/1988 | Ball et al. |
| 5,343,970 A | | 9/1994 | Severinsky |
| 5,713,425 A | | 2/1998 | Buschhaus et al. |
| 5,845,731 A | | 12/1998 | Buglione et al. |
| 5,856,709 A | * | 1/1999 | Ibaraki et al. .................. 290/45 |
| 6,120,380 A | * | 9/2000 | Reik et al. .................. 464/68.5 |
| 6,155,364 A | | 12/2000 | Nagano et al. |
| 6,209,672 B1 | | 4/2001 | Severinsky |
| 6,480,767 B2 | | 11/2002 | Yamaguchi et al. |
| 6,520,879 B2 | * | 2/2003 | Kawabata et al. .................. 475/5 |
| 6,554,088 B2 | | 4/2003 | Severinsky et al. |
| 6,568,521 B2 | | 5/2003 | Diemer et al. |
| 6,899,190 B2 | * | 5/2005 | Bordini .................. 180/65.235 |
| 7,404,460 B2 | * | 7/2008 | Oshidari .................. 180/65.235 |
| 2005/0107204 A1 | | 5/2005 | Van Druten et al. |
| 2007/0007059 A1 | | 1/2007 | Nomura et al. |
| 2007/0163823 A1 | | 7/2007 | Abe et al. |

FOREIGN PATENT DOCUMENTS

| | | | |
|---|---|---|---|
| CN | 1225317 | A | 8/1999 |
| CN | 1532435 | A | 9/2004 |
| CN | 2654409 | Y | 11/2004 |
| CN | 1637327 | A | 7/2005 |
| CN | 1736750 | A | 2/2006 |
| CN | 1760562 | A | 4/2006 |
| CN | 1778587 | A | 5/2006 |
| CN | 1824556 | A | 8/2006 |
| CN | 1824945 | A | 8/2006 |
| CN | 1826243 | A | 8/2006 |
| CN | 1854561 | A | 11/2006 |
| CN | 1895942 | A | 1/2007 |
| CN | 2871973 | Y | 2/2007 |
| CN | 101042182 | A | 9/2007 |
| DE | 4431929 | C1 | 10/1995 |
| EP | 1 072 461 | A2 | 1/2001 |
| JP | 2002-316541 | | 10/2002 |
| JP | 2003-48438 | | 2/2003 |
| JP | 2006-288071 | | 10/2006 |
| WO | WO 2006/034520 | A1 | 4/2006 |
| WO | WO2006/137589 | A1 | 12/2006 |
| WO | WO 2007/080729 | A1 | 7/2007 |

OTHER PUBLICATIONS

Notification of International Search Report and Written Opinion for PCT/CN2008/002071 mailed by Patent Cooperation Treaty (International Searching Authority) on Apr. 9, 2009.

Notification of International Search Report and Written Opinion for PCT/CN2008/002070 mailed by Patent Cooperation Treaty (International Searching Authority) on Mar. 26, 2009.

Notification of International Search Report and Written Opinion for PCT/CN2008/002069 mailed by Patent Cooperation Treaty (International Searching Authority) on Apr. 2, 2009.

European Search Report mailed Dec. 30, 2010 in related application No. PCT/CN2008002069 (EP08871359.9).

* cited by examiner

EV-mode

Regenerative Braking Mode

Regenerative Braking and Charging Mode

Parallel-Hybrid Dual Power Mode

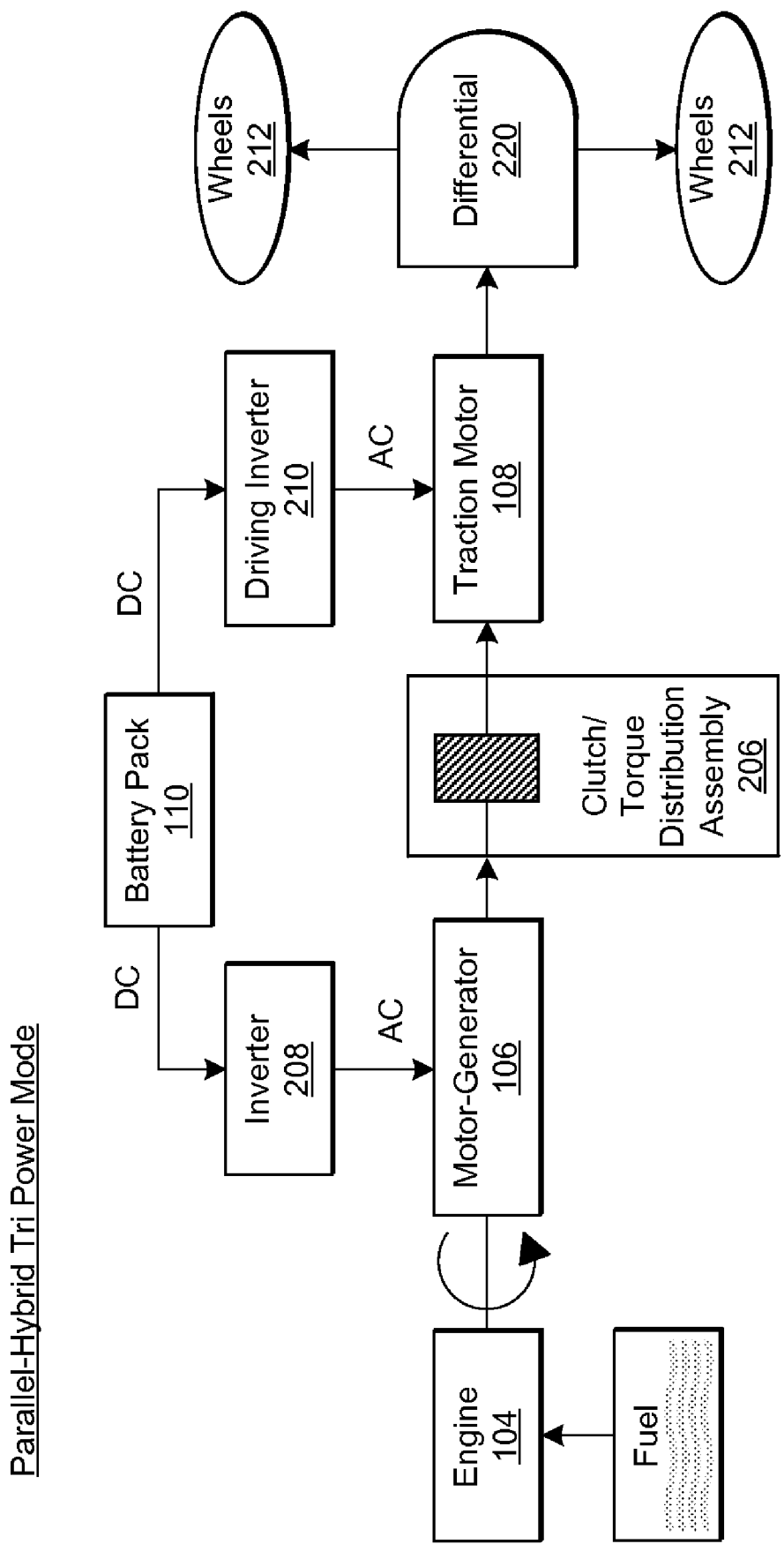

HYBRID VEHICLE HAVING ENGAGEABLE CLUTCH ASSEMBLY COUPLED BETWEEN ENGINE AND TRACTION MOTOR

CROSS-REFERENCE TO RELATED APPLICATIONS

1) Chinese Patent Application No. 2008-10185948.3 filed on Dec. 13, 2008, entitled "hybrid power driving system, controlling method thereof and vehicle comprising the same,"
2) Chinese Patent Application No. 2008-10185949.8 filed on Dec. 13, 2008, entitled "hybrid vehicle comprising a torsion coupling assembly,"
3) Chinese Patent Application No. 2008-10185950.0 filed on Dec. 13, 2008, entitled "hybrid driving system and vehicle comprising the same,"
4) Chinese Patent Application No. 2008-10185951.5 filed on Dec. 13, 2008, entitled "hybrid power vehicle,"
5) Chinese Patent Application No. 2008-10185952.X filed on Dec. 13, 2008, entitled "hybrid driving system and controlling method thereof,"
6) Chinese Patent Application No. 2008-10217019.6 filed on Oct. 11, 2008, entitled "A Hybrid Power Driving System and its Control Method,"
7) Chinese Patent Application No. 2008-10217015.8 filed on Oct. 11, 2008, entitled "A Hybrid Power Driving System and its Control Method,"
8) Chinese Patent Application No. 2008-10216727.8 filed on Oct. 11, 2008, entitled "A Hybrid Power Driving System,"
9) Chinese Patent Application No. 2008-10217016.2 filed on Oct. 11, 2008, entitled "Power Synthesis and Distribution Device and the Hybrid Power Driving System Using It,"
10) Chinese Patent Application No. 2008-10126507.6 filed on Jun. 24, 2008, entitled "A Hybrid Driving System,"
11) Chinese Patent Application No. 2008-10126506.1 filed on Jun. 24, 2008, entitled "A Hybrid Driving System and Its Driving Method," and
12) Chinese Patent Application No. 2007-10302297.7 filed on Dec. 27, 2007, entitled "The Power Control System and Method of Hybrid Vehicle with Double Motor."

The above enumerated patent applications are incorporated by reference herein in their entirety.

BACKGROUND

1. Technical Field

This application relates to a hybrid power system for a hybrid motor vehicle, and in particular, to a hybrid power system that supports multiple operating modes and power capability for operating the driving wheels of the motor vehicle.

2. Related Art

Motor vehicles typically operate using an internal combustible engine to convert the energy in a combustible fluid, such as gasoline or diesel fuel, into mechanical energy to operate the driving wheels of a motor vehicle. Such fuels are expensive and contribute to environmental pollution. As motor vehicle operators become more cost-conscious and environmentally conscious, an alternative to using petroleum-based fuels is desirable. One alternative is to provide power to the driving wheels of a motor vehicle using only electric power. However, motor vehicles that operate using only electric power have a short driving distance and do not address the needs of motor vehicle operators that often drive longer distances.

SUMMARY

A hybrid power system includes a traction motor and a motor-generator. The motor-generator and the traction motor may be selectively coupled to a battery pack. The motor-generator may receive electricity from the battery pack and may also charge the battery pack. An internal combustible engine further communicates with the motor-generator to form an electrical generating subsystem. The traction motor may receive electricity from the battery pack and may also charge the battery pack. The traction motor drives a set of driving wheels of the motor vehicle through a differential gear assembly.

The hybrid power system may also include other system components, such as a vehicle controller, and a clutch or torsion distribution assembly. The clutch may selectively couple the internal combustible engine with the traction motor to charge the battery pack, operate the driving wheels, or both. The vehicle controller may change the operating mode of the hybrid power system depending on a variety of input signals. The torsion distribution assembly may also dampen any shock transmitted between the internal combustible engine and the motor-generator.

The hybrid power system may also operate according to a variety of operating modes, such as an electric-only operating mode, a series operating mode, a series dual-power operating mode, parallel dual-power operating mode, and a parallel tri-power operating mode. The electric-only operating mode may be controlled by the driver of the motor vehicle. The series operating modes and the parallel operating mode may be controlled by the vehicle controller. The operating modes may also operate according to sub-modes. In one embodiment, the series operating mode operates according to a series dual-power mode. In another embodiment, the parallel operating mode operates according to a parallel tri-power mode. Other sub-modes are also possible.

The hybrid vehicle includes a controllable clutch, a battery system for receiving, storing and providing electrical power, an internal combustion engine configured to provide rotational power to a flywheel, and a first motor/generator having a hollow rotor shaft rotatably operatively coupled to the flywheel. The first motor/generator is configured in a first mode to receive electrical power from the battery system and provide rotational force to the hollow rotor shaft to rotate and start the internal combustion engine. The first motor/generator is configured in a second mode to receive rotational force through the hollow rotor shaft from the internal combustion engine to generate electrical power to charge the battery system. In a third mode, it is configured to receive electrical power from the battery system and provide rotational force to the hollow rotor shaft.

Also included is a gear transmission having a first port configured to receive rotational power in a first rotational (RPM) range, and a second port configured to provide rotational power in a second RPM range to the wheels of the vehicle. A second motor/generator has a rotor spindle concentrically disposed in the hollow rotor shaft and rotatably coupled to the first port of the gear transmission. The second motor/generator in a fourth mode is configured to receive electrical power from the battery system and provide rotational force to the first port of the gear transmission. The second motor/generator in a fifth mode is configured to generate electrical power to charge the battery system when receiving rotational force from the first port of the gear transmission when the wheels provide rotational force to the second port of the gear transmission.

Further, the vehicle includes an engageable clutch assembly disposed between the flywheel and the first motor/generator configured to operatively couple the flywheel with the hollow rotor shaft of the first motor/generator. When the clutch assembly is engaged, the rotor spindle of the second motor/generator is coupled with the flywheel and with the hollow rotor shaft, to provide additional rotational force from both the internal combustion engine and the first motor/generator to the first port of the gear transmission.

The engageable clutch assembly includes a driven plate assembly releasably coupled with the flywheel and configured to receive torsional power from the flywheel when the engageable clutch assembly is engaged, where the driven plate assembly is operatively coupled to the rotor spindle of the second motor/generator. The clutch assembly also includes an interconnecting plate assembly coupled with the flywheel configured to receive the torsional power from the flywheel, and configured to provide torsional power to the hollow rotor shaft of the first motor/generator. An engageable release bearing is configured when in an engaged position, to engage the driven plate assembly with the flywheel to provide torsional power from the flywheel to the rotor spindle of the second motor/generator. Conversely, the release bearing is configured when in a disengaged position to disengage the driven plate assembly from the flywheel so that torsional power from the flywheel is not transferred to the rotor spindle of the second motor/generator.

The clutch assembly further includes a clutch cover adapted to house the driven plate assembly, where the clutch cover is fixedly coupled to the flywheel and configured to rotate with the flywheel. The driven plate assembly is configured to rotate with the flywheel and the clutch cover when the release bearing is in the engaged position, and is configured to remain stationary or rotate independently relative to the rotating flywheel and clutch cover, when the release bearing is in the disengaged position.

A spring arrangement disposed within the clutch cover is in operative communication with the engageable release bearing and the driven plate. When the engagable release bearing is in the engaged position, the spring arrangement permits contact between the driven plate and the flywheel. When the engagable release bearing is in the disengaged position, the spring arrangement maintains the driven plate away from the flywheel. The spring arrangement may be a diaphragm spring.

The driven plate includes a friction disk made of frictional material configured to contact a surface of the flywheel when the engagable release bearing is in the engaged position. When the engagable release bearing is in the engaged position, the spring arrangement is in a flexed orientation, and when the engagable release bearing is in the disengaged position, the spring arrangement is in a non-flexed orientation.

The interconnecting plate assembly includes an inner sideboard having a plurality of recesses, which is configured to operatively couple the interconnecting plate assembly to the clutch cover, and a torsion plate in communication with the inner sideboard, which is operatively coupled to the hollow rotor shaft of the first motor/generator. Also included is an outer sideboard in communication with an opposite side of the torsion plate, and a plurality of shock absorbing elements mounted on the torsion plate and partially received within corresponding recesses of the inner sideboard. The shock absorbing elements are configured to absorb rotational shock transmitted between the internal combustion engine and the hollow rotor shaft of the first motor/generator.

The engageable clutch assembly may operate in a first mechanical mode that selectively engages and disengages the internal combustion engine from the second motor/generator. The engageable clutch assembly may also operate in a second mechanical mode that dampens shock between the internal combustion engine and the first motor/generator when the internal combustion engine is not in angular alignment with the first motor/generator.

The release bearing is hydraulically actuated to reciprocally move between the engaged position and the disengaged position, and is disposed between the internal combustion engine and the second motor/generator. When in the engaged first position, the engageable clutch assembly operates in the first mechanical mode. When disengaged, the engageable clutch assembly operates in the second mechanical mode.

A controller is configured to receive a first input signal indicating a rotational speed of the engine, and a second input signal indicating a rotational speed of the second motor/generator. The controller is configured to engage the engageable clutch assembly based on a difference in value between the first and second input signals.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 10 shows an example of the system of FIG. 2 operating in a parallel tri-power mode where the engine and both motors provide torque for the wheels.

DETAILED DESCRIPTION OF THE PREFERRED EMBODIMENTS

Figure 1:
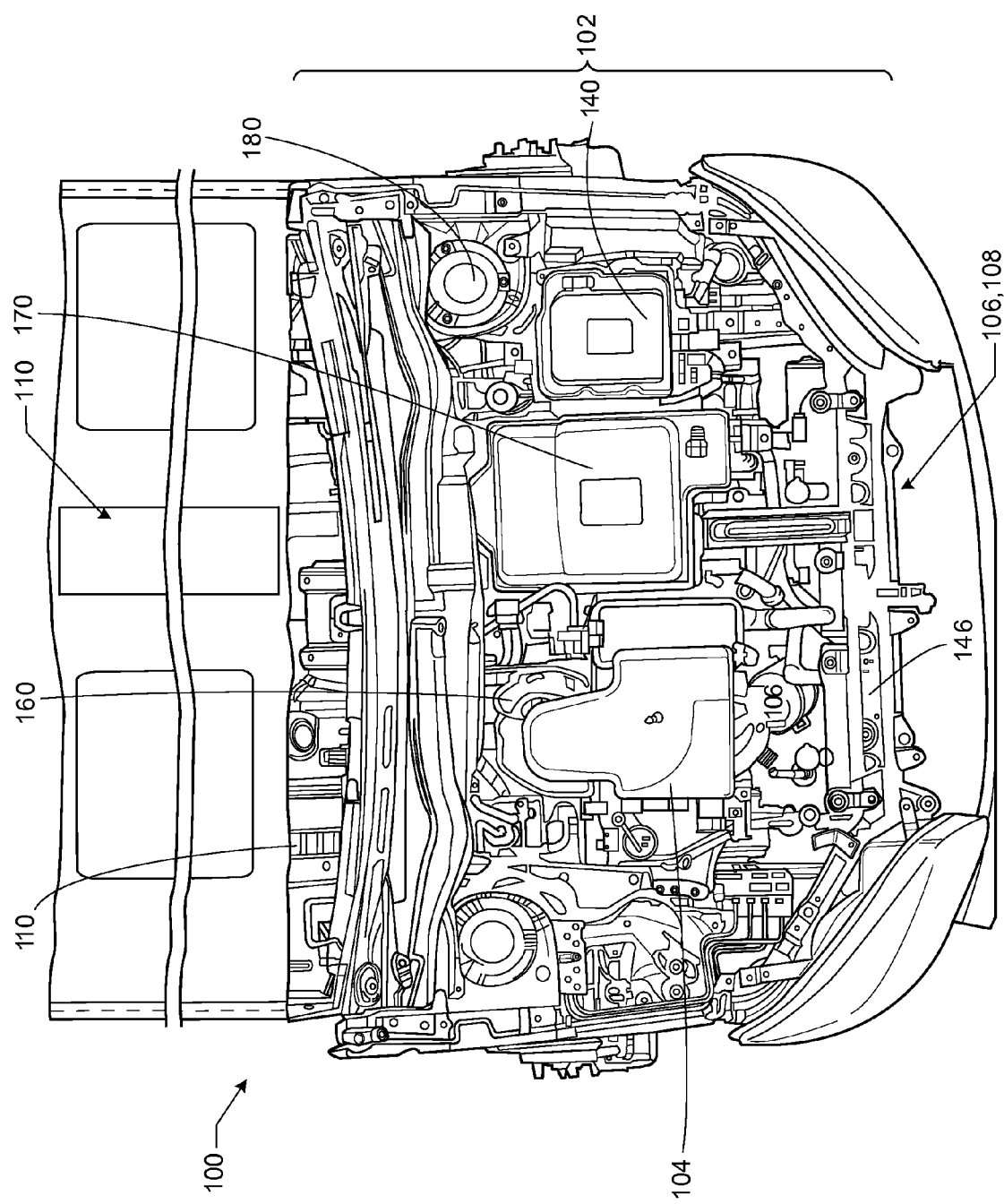
FIG. 1 shows an engine/motor compartment of a motor vehicle with a hybrid power system.

FIG. 1 shows the front engine compartment 100 of a motor vehicle equipped with a multi-mode hybrid power system 102. The hybrid power system 102 includes an internal combustible engine 104, an electric motor-generator 106, an electric traction motor 108, and a battery pack 110. The battery pack 110 may be located within a floorboard compartment and may not be visible in the view of FIG. 1. The hybrid power system 102 may also include other components, such as, a power inverter assembly 140, radiator 146, intake manifold 160, control system enclosure 170, shock absorber towers 180, and other components, such as, various filters, fuel injection system, master cylinder assembly, water pump, electronic ignition housing, etc.

Figure 2:
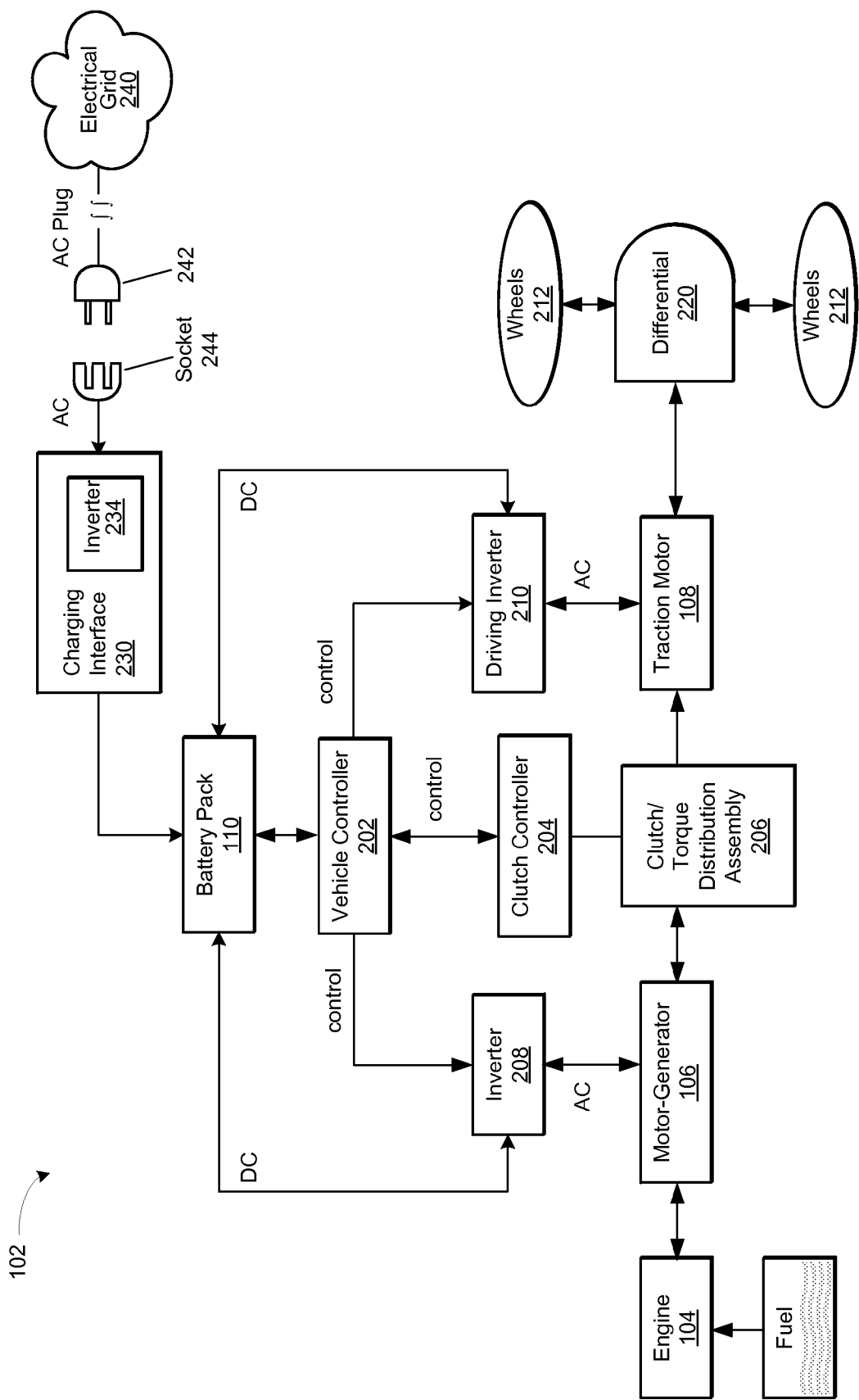
FIG. 2 is a schematic system diagram for a hybrid vehicle.

FIG. 2 shows a block diagram of the multi-mode or hybrid power system 102, which includes a vehicle controller 202, a clutch controller 204, a clutch assembly or torque distribution assembly 206, a first inverter 208, a driving inverter 210, the engine 104, the electric motor-generator 106, the electric traction motor 108, and a connection to a set of driving wheels 212 though a differential gear assembly 220 or other similar torque transfer/gear balancing arrangement. The differential gear assembly 220 permits rotation of opposing wheels, such as the left front wheel and the right front wheel, at different rotational speeds to facilitate turning and cornering without tire slippage or grabbing. The first inverter 208 and the driving inverter 210 may be part of the vehicle controller 202 or may be separate therefrom.

The internal-combustion engine 104 may be a gasoline engine, a diesel engine, or may use alternative fuel sources, such as methanol, ethanol, propane, hydrogen, etc. The engine 104 is preferably a four cylinder engine, but other known configurations may be used. The motor-generator 106 and the traction motor 108 are preferably AC motors. However, other electric motors may be used, such as, switched reluctance motors, DC permanent magnet motors, repulsion-induction motors, or other suitable electric motors. According to established electromagnetic induction principles, the motor-generator 106 and the traction motor 108 can function in both an electrical generator mode and in a motor mode. When working in the generator mode, the respective motors convert mechanical energy into electrical energy, which may be used to charge the battery in some specific embodiments. When working in the motor mode, the electric motors convert electrical energy into mechanical energy to provide torque indirectly or directly to the wheels of the vehicle.

In one embodiment, the vehicle controller 202 communicates with the first inverter 208, the driving inverter 210, and the clutch controller 204. The clutch controller 204 controls the clutch 206, also referred to interchangeably as the torque distribution system. The vehicle controller 202 (or controller) may be or may include one or more microprocessors or computers/computer systems, discrete components, etc. The vehicle controller 202 controls the operating mode of the hybrid power system 102. The operating mode of the motor vehicle may determine the specific operating function of one or more components of the hybrid power system 102 including, but not limited to, the internal-combustible engine 104, the motor-generator 106, the electric traction motor 108, the clutch controller 204, the torque distribution assembly 206, the first inverter 208, and the driving inverter 210.

The engine 104 communicates with the electric motor-generator 106 to receive rotational power from the electric motor-generator 106 when the vehicle controller 202 first starts the engine 104. Thus, the motor-generator 106 can operate as a conventional starter motor. The engine 104 is also operative to provide torque to the electric motor-generator 106 for charging the battery pack 110 or for providing power to the traction motor 108 in a specific operating mode.

The electric traction motor 108 is configured to provide torque to the driving wheels 212 through a gear reduction assembly and the differential gear assembly 220. The gear reduction assembly and the differential gear assembly 220 may be combined into a single assembly. When the clutch 206 is engaged, the electric traction motor 108 may receive additional torque from the engine 104, in addition to receiving electrical power from either the battery or from the motor-generator 106, depending on the mode and the load conditions. In addition, the electric traction motor 108 may charge the battery pack 110 through regenerative braking or other mechanism to charge to the battery pack 110.

The battery pack 110 provides electrical power at about 330 volts DC to the first inverter 208, which converts the DC power to AC power. The first inverter 208 provides the AC power to the motor-generator 106, and may be controlled by the controller 202 to provide about 0 volts AC (off state) to about 330 volts AC (full power state) to the motor-generator 106. Similarly, the battery pack 110 provides electric power at about 330 volts DC to the driving inverter 210, which converts the DC power to AC power. The driving inverter 210 provides AC the power to the traction motor 108, and may be controlled by the controller 202 to provide about 0 volts AC (off state) to about 330 volts AC (full power state) to the traction motor 108. Preferably, the motor-generator 106 and the traction motor 108 operates in an AC multi-phase configuration.

The battery pack 110 is not limited to a specific voltage, and based on its configuration and arrangement of cells, may provided a different DC voltage, with the specific motor-generator 106 and traction motor 108 selected for efficient operation in the voltage range provided by the battery pack 110. Although the first inverter 208 and the driving inverter 210 are shown separately in the figures, these components may be contained in a single package, chip, or component, or may be configured as multiple and separate components, which may be included in or may be separate from the controller 202. The battery pack 110 may also provide electrical power to the engine 104 for electronic ignition and spark generation, vehicle controller 202 operation, clutch controller 204 operation, vehicle lighting and accessory operation, and any other component of the vehicle.

Regarding the terminology for the modes and sub-modes as used in this document, a vehicle that uses only electric motors without any form of internal-combustion engine is referred to as an electric vehicle or pure electric vehicle (EV). A vehicle that uses both an internal-combustion engine and one or more electric motors is loosely referred to as a hybrid vehicle or operates in a hybrid mode. Hybrid operation may include series hybrid mode and parallel hybrid mode.

A series hybrid mode means that the internal-combustion engine provides torque only to the motor-generator to generate electricity, and that no torque from the internal-combustion engine is directly fed to the drive wheels. Multiple sub-modes within the series hybrid mode may be provided, such as series mode and series dual-power mode, depending upon which components and how many components are engaged to power the vehicle.

A parallel hybrid mode means that the internal-combustion engine provides torque to the motor-generator to generate electricity, and also provides torque to drive the wheels, typically through an arrangement of a clutch or other engagable mechanical arrangement. Again, multiple sub-modes within the parallel hybrid mode may be described, such as parallel dual-power mode and parallel tri-power mode, depending upon which components and how many components are engaged to power the vehicle. The various operating modes are explained in further detail with reference to FIG. 3 through FIG. 10.

A user-selectable switch ("EV/HEV control input") on the dashboard of the vehicle may permit the operator to switch between a pure electric driving mode (EV—electric vehicle mode) or a hybrid driving mode (HEV). The switch may be a depressible button, knob, lever, or other control input, and may be located in the interior of the motor vehicle or in another location of the motor vehicle. The controller 202 utilizes the state of the switch as an input operating signal to determine whether the motor vehicle operator has selected an electric-only mode or a hybrid mode.

Figure 3:
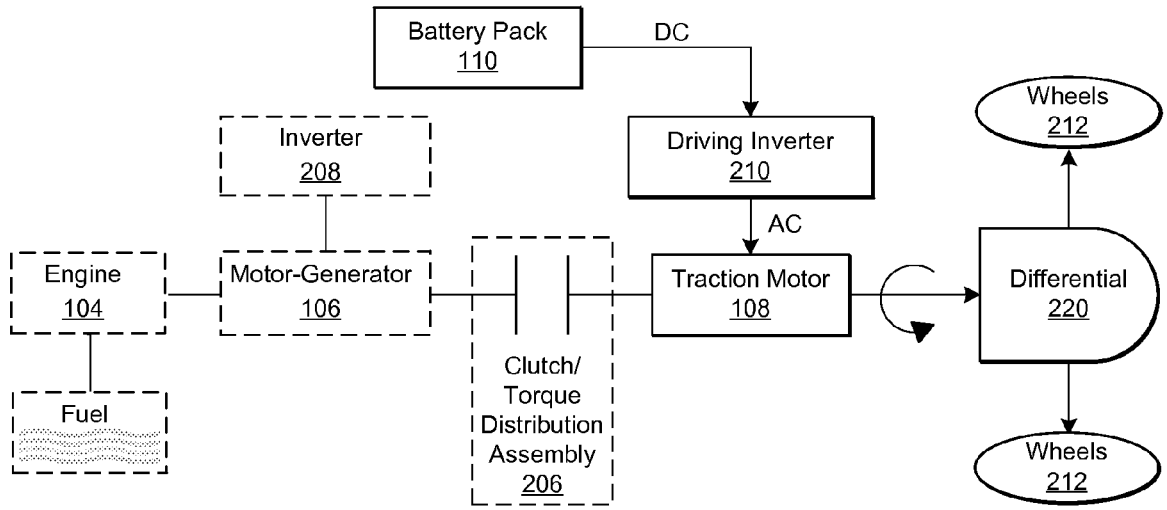
FIG. 3 shows an example of the system of FIG. 2 operating in an electric-only (EV) power mode.

FIG. 3 shows an example of the hybrid power system 102 operating according to an electric-only power mode (EV mode). In one implementation of the electric-only power mode, the battery pack 110 provides power to the traction motor 108 via the driving inverter 210. The clutch 206 is not engaged such that the motor-generator 106 and the traction motor 108 are not coupled. The engine 104 is not powered (thus shown in dashed lines) and the traction motor 108 provides all power to operate the driving wheels 212. The hybrid power system 102 may operate in the electric-only mode when a motor vehicle operator selects the electric-only mode using the EV/HEV input control. For example, when the EV/HEV input control is manipulated to select the electric-only mode, the vehicle controller 202 may communicate one or more output control signals to instruct the clutch controller 204, the electric motor-generator 106, and the electric traction motor 108 so that only the electric traction motor 108 operates the driving wheels 212. Other output control signals may be provided. Components shown in dashed lines in FIGS. 3-10 indicate that these components may be inactivate in this specific mode.

Figure 4:
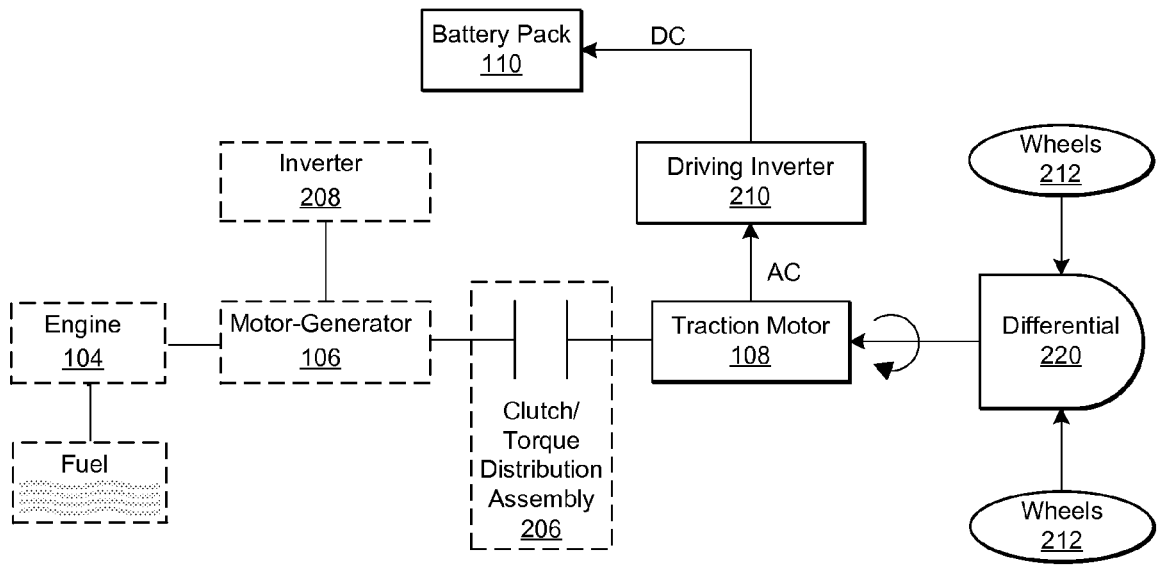
FIG. 4 shows an example of the system of FIG. 2 operating in a regenerative braking mode.

FIG. 4 shows an example of the hybrid power system 102 operating according to a regenerative braking mode. In the regenerative braking mode, the traction motor 108 accepts torque from the driving wheels 212 and converts the torque into AC Power. The traction motor 108 then feeds the AC power to the driving inverter 210, and then to the battery pack 110 to charge the battery pack 110. In one implementation, the hybrid power system 102 operates in regenerative braking mode while the motor vehicle is decelerating, such as when the driver does not depress or minimally depresses the accelerator pedal, which may also be dependent upon the road gradient.

Although the motor-generator 106 may charge the battery 110 and/or provide electricity to the traction motor 108 under engine power depending on the operating mode, the motor-generator 106 preferably does not charge the battery 110 during a regenerative breaking mode when coupled to the driving wheels through the engaged or closed clutch 206 in a hybrid parallel mode described below.

One or more input operating signals may cause the vehicle controller 202 to operate in the regenerative braking mode. For example, the hybrid power system 102 may operate in the regenerative braking mode when an accelerator depth input operating signal is below a predetermined threshold value, such as when the driver is not depressing the accelerator pedal or is minimally depressing the pedal. Regenerative braking mode may also be operative when a brake input operating signal is above a predetermined threshold value, which indicates that the driver is depressing the brake pedal. In one implementation, the hybrid power system 102 operates in the regenerative braking mode when the accelerator depth input operating signal is 0 (meaning no pedal depression) and the brake input operating signal is greater than 0 (indicating some depression of the brake pedal).

Figure 5:
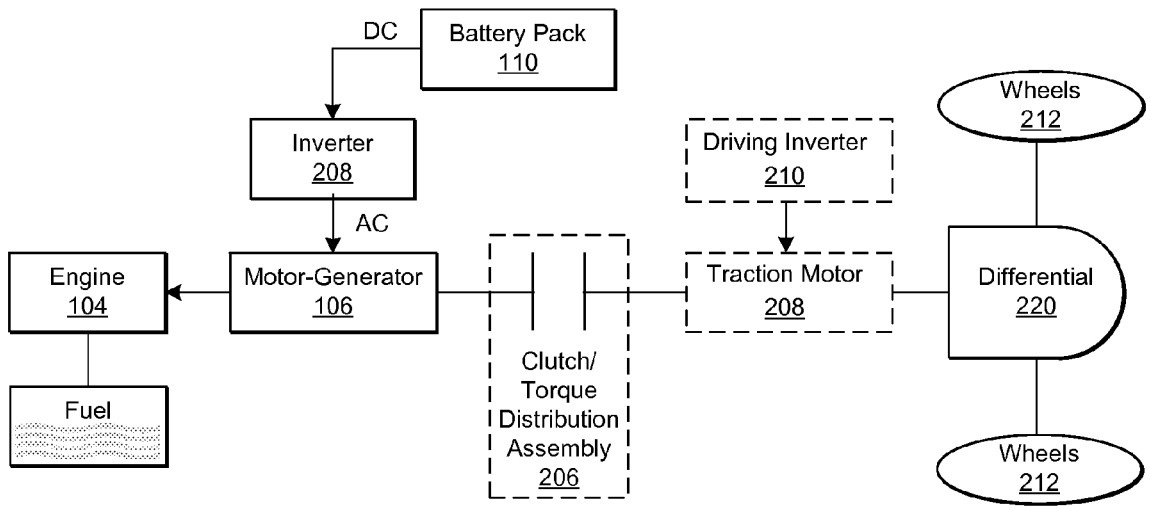
FIG. 5 shows an example of the system of FIG. 2 operating in an electric starter motor mode.

FIG. 5 shows the hybrid power system 102 operating according to an electric starting mode. In the electric starting mode, the battery pack 110 supplies power to the electric motor-generator 106 to start the engine 104. The motor-generator 106 may provide torque to the engine 104 until the engine 104 starts and/or obtains a desired rotational speed. In one implementation, the motor-generator 106 rotates the engine flywheel until the engine is rotating at about 1200 RPM. Once this occurs, the engine 104 is started via an electronic ignition system (not shown), which provides the proper spark to the cylinders using the appropriate timing scheme.

Depending upon operating conditions and whether the system is operating in a series power mode or a parallel power mode, the vehicle controller 202 may change the engine speed. When operating in a series mode, the vehicle controller 202 may set the engine speed to the most efficient operating RPM in which to rotate the motor-generator 106 to generate electricity. When operating in a parallel mode where the engine 104 is coupled to the wheels 212 through the clutch 206, the vehicle controller 202 may set the engine speed based upon system parameters, such as for example, the speed of the vehicle, the acceleration demand, the load on the vehicle (hill climbing), and other parameters.

Figure 6:
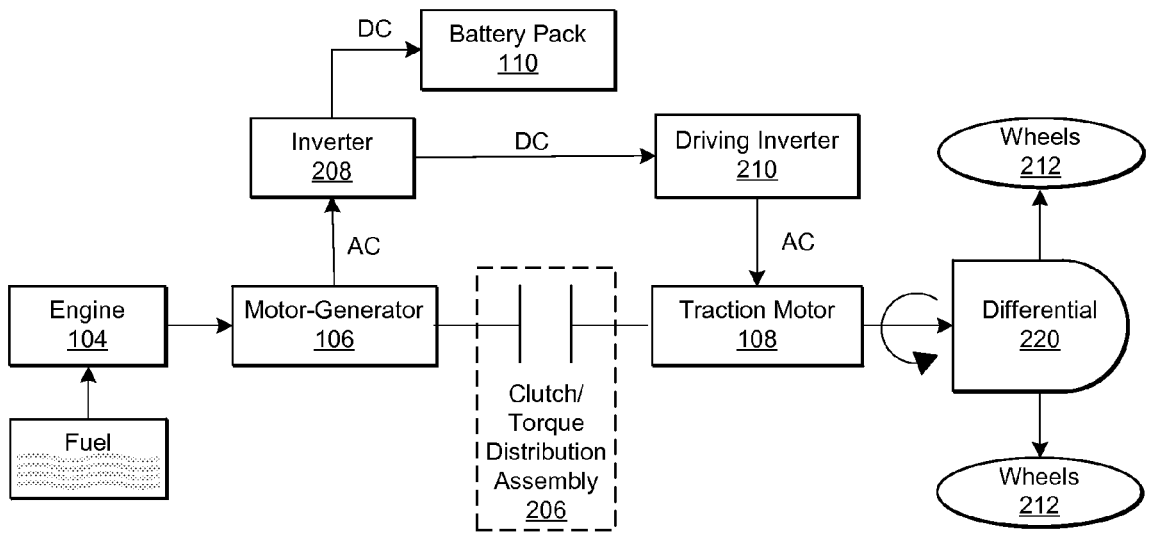
FIG. 6 shows an example of the system of FIG. 2 operating in a series power mode where excess generated electricity charges the battery.

FIG. 6 shows the hybrid power system 102 operating according to a series hybrid power mode where excess generated electricity is used to charge the battery 110. In series hybrid power mode, the engine 104 drives the motor-generator 106 to generate electricity to charge the battery pack 110 through the first inverter. In addition, the traction motor 108 may receive power from the motor-generator 106 to operate the driving wheels 212 via the driving inverter 210. For example, where the motor-generator 106 generates power greater than the amount of power consumed by the traction motor 108, the traction motor 108 may accept the power generated by the motor-generator 106, and the excess power may be diverted to charge the battery pack 110.

Figure 7:
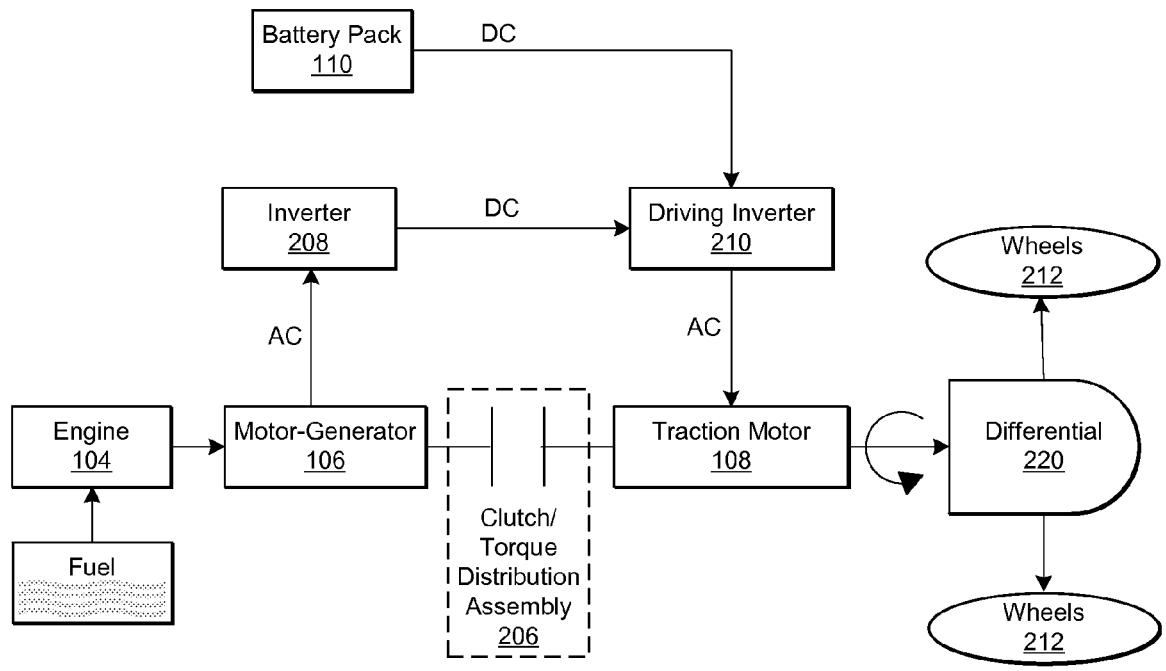
FIG. 7 shows an example of the system of FIG. 2 operating in a series dual-power mode where all generated and stored electricity is directed to the traction motor.

FIG. 7 shows the hybrid power system 102 operating according to a series hybrid dual-power mode. When the traction motor 108 requires all of the power or more power than is generated by the motor-generator 106, the traction motor 108 may receive additional power from the battery pack 110. Hence, in series hybrid dual-power mode, the traction motor 108 operates the driving wheels 212 while the motor-generator 106 and the battery pack 110 provide power to the traction motor 108.

Figure 8:
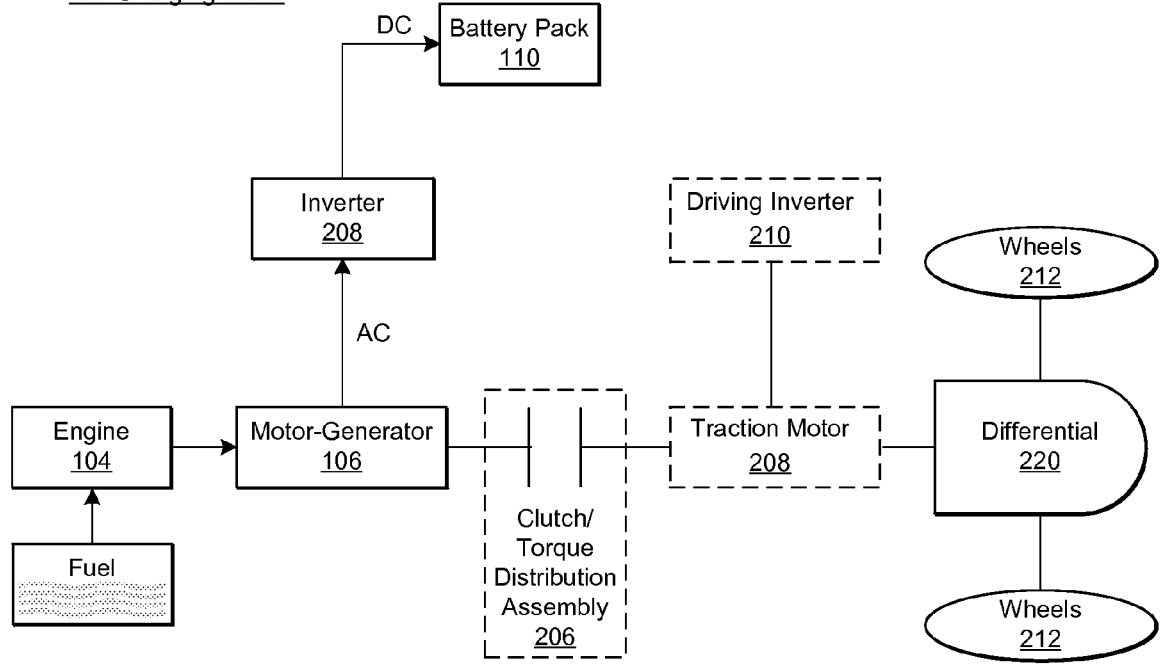
FIG. 8 shows an example of the system of FIG. 2 operating in a charging power mode.

FIG. 8 shows an example of the hybrid power system 102 operating according to an idle-charging mode. In idle-charging mode, the engine 104 drives the motor-generator 106, which charges the battery pack 110. In one implementation, the hybrid power system 102 operates according to the idle-charging mode when the gear-mode input operating signal indicates that the motor vehicle is in a "park" or "neutral" gear-mode. However, the hybrid power system 102 may operate according to the charging mode based on other combinations of input signals.

Figure 9:
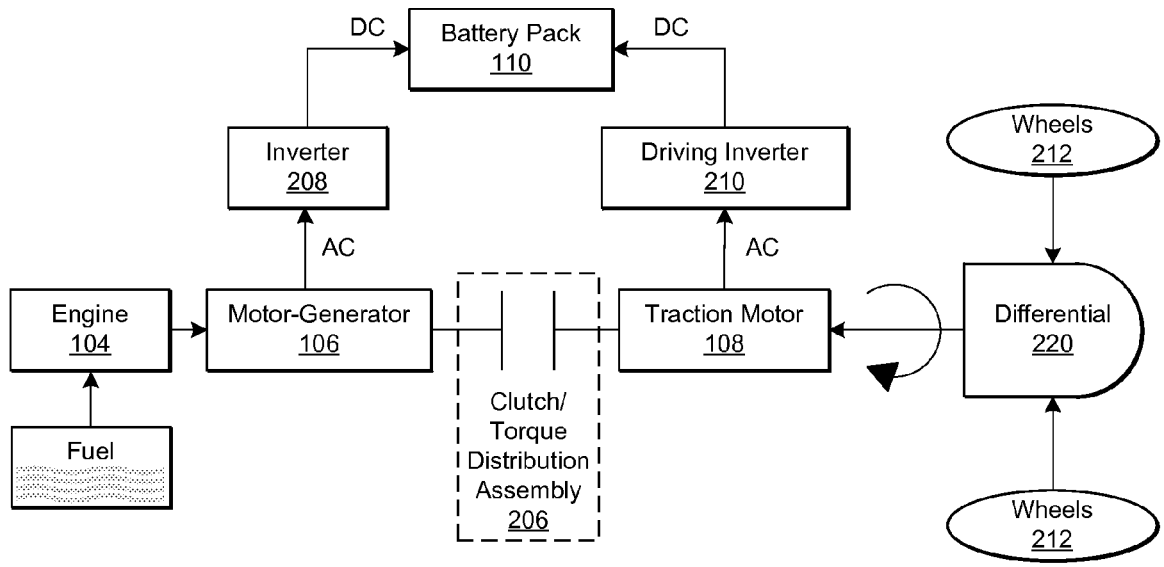
FIG. 9 shows an example of the system of FIG. 2 operating in a regenerative braking charging mode.

FIG. 9 shows the hybrid power system 102 operating according to a regenerative braking and charging mode. In the regenerative braking and charging mode, one or more components charge the battery pack 110 using one or more charging mechanisms. For example, through regenerative braking, the traction motor 108 operates as a generator by accepting torque from the driving wheels 212 to provide electricity to the battery pack 110. Simultaneously, the engine may drive the motor-generator 106 to further charge the battery pack 110. The hybrid power system 102 may operate in the regenerative charging mode when one or more input operating signals exceed or fall below a predetermined threshold value. For example, the hybrid power system 102 may operate in the regenerative charging mode when the accelerator depth input operating signal is 0 and the brake input operating signal is above 0.

Figure 9A:
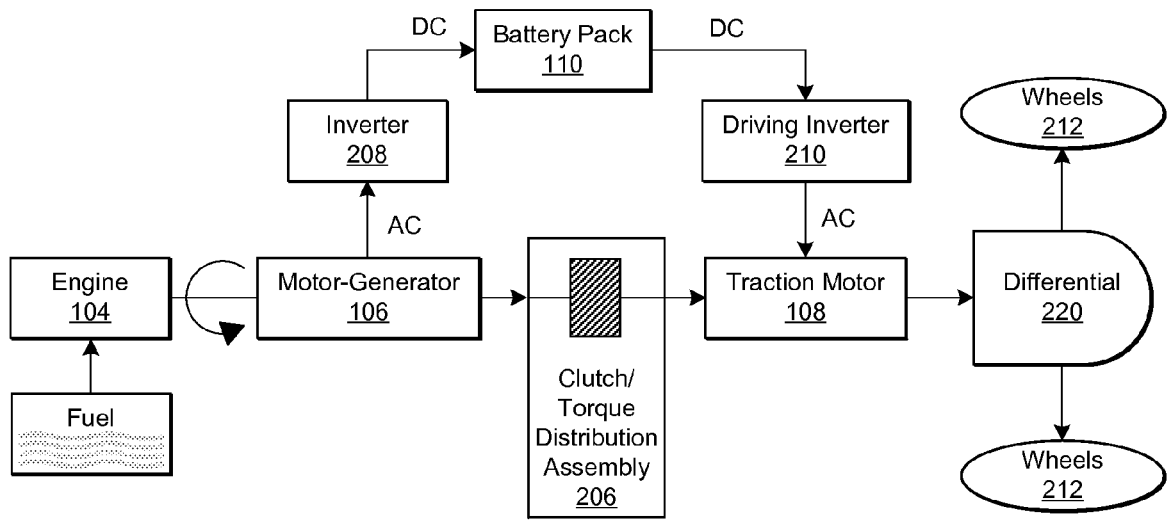
FIG. 9A shows an example of the system of FIG. 2 operating in a parallel dual-power mode where the engine and the traction motor provide torque for the wheels.

FIG. 9A shows an example of the hybrid power system 102 operating according to a parallel hybrid dual-power mode. In this mode, the clutch or torque distribution assembly 206 is engaged. With the clutch 206 engaged, the engine 104, through the direct coupling with the motor-generator 106 and the traction motor 108, provides torque to operate the driving wheels 212. Thus, the engine and the traction motor (under battery power) provide torque to the driving wheels 212. Further, in this mode, the motor-generator 106, turning under power from the engine 104, may provide electricity to charge the battery pack 110. In an alternate embodiment of the parallel hybrid dual-power mode, the motor-generator 106 need not necessarily provide any charging power to the battery pack 110.

FIG. 10 shows an example of the hybrid power system 102 operating according to a parallel hybrid tri-power mode. In this mode, the clutch or torque distribution assembly 206 is engaged. With the clutch 206 engaged, the engine 104, through the direct coupling with the motor-generator 106 and the traction motor 108, provides torque to operate the driving wheels 212. Thus, the engine and both motors provide torque to the driving wheels 212. In addition, the battery pack 110 provides power to the motor-generator 106 and to the traction motor 108 to further increase the amount of torque directed to the driving wheels 212.

Note that the configuration and coupling of the clutch 206 and the traction motor 108 may vary in some embodiments. In one embodiment shown in FIG. 11, the output of the clutch or torque distribution assembly 206, rather than being coupled directly to the traction motor 108, may be alternatively coupled to a deceleration mechanism or reduction gear, which may be housed in the transmission gear reduction assembly (also referred to as the transmission) 1108. The transmission gear reduction assembly 1108 may include one or more gears or gear assemblies (for example, a primary and a secondary deceleration gear) that physically couple the high-speed rotational output of the traction motor 108 with the lower speed input portion of the differential gear assembly 220 or other gear mechanism. As mentioned above, in some embodiments, the deceleration mechanism or reduction gear may be combined with the differential gear assembly 220.

In another embodiment for example, the deceleration mechanism or reduction gears may include helical gears, planetary gears, straight gears, and combinations of these and other gears. Accordingly, the transmission gear reduction assembly 1108 may include an input coupling or gear input configured to receive torque from the output of the traction motor 108. In an alternate embodiment, the transmission gear reduction assembly 1108 may include a second input or port configured to receive rotational torque from another source of power.

Referring now to specific parameters of the engine 104 and motors 106 and 108, in one specific embodiment, the engine 104 may have a displacement of about 998 cc, a maximum output torque of about 90 Newton-meters, a maximum output power of about 50 kW, and a maximum output speed of about 6000 RPM. In another embodiment the motor-generator 106 may have a maximum output torque of about 150 Newton-meters, a maximum output power of about 20 kW, and a maximum output speed of about 5000 RPM. In a further embodiment the traction motor 108 may have a maximum output torque of about 400 Newton-meters, a maximum output power of about 50 kW, and a maximum output speed of about 6000 RPM.

Although the battery 110 is described and shown in the above figures as receiving power from the motor-generator 106 and/or the traction motor 108 when those components operate as electrical generators, the battery may also be charged from an external electrical source. Accordingly, the hybrid system is also referred to as a "plug-in" hybrid system. As shown in FIG. 2, the battery may be coupled to an external charging interface 230, which includes an inverter 234. For example, the charging interface 230 may accept and direct power received from the electrical "grid" 240 through a plug 242 and socket 244 arrangement. In one embodiment, the input power may be standard 120-240 VAC power from a standard receptacle, also referred to as "wall power" or household power. A suitable DC voltage source, such as a large storage battery at a charging facility may also charge the battery. Appropriate charging of the battery 110 through plug-in charging permits the vehicle to operate in the EV mode without using the engine 104 at all.

The battery pack 110 preferably uses lithium polymer and/or lithium-ion-phosphate technology that permits the vehicle to travel about at least 50 km on a single battery charge. In a preferably embodiment, the vehicle may have an operative travel range of about at least 100 km on a single battery charge when operating in pure EV mode.

In one embodiment, the vehicle includes about 50 lithium battery cells are coupled in series. In a preferred embodiment, about 100 individual lithium battery cells are coupled in series, where each battery cell has a voltage of about 3.3 volts. Thus, the total voltage output of the battery cells is about 330 volts, which is a suitable working voltage for the motor/generator 106 and the traction motor 108. Other working voltages may be used depending on the selected electric motors and the number of series-coupled batteries. In other embodiments, the battery pack 110 may include other types of batteries, such as lead-acid batteries, nickel-chromium batteries, nickel-hydride batteries.

Returning back to FIG. 11, this figure illustrates one embodiment of a power plant 1104, which may include the engine 104, the motor-generator 106, and the traction motor 108. Also shown is the gear reduction assembly (also referred to as the transmission) 1108, which includes one or more gear assemblies that physically couple the high-speed rotational output of the traction motor 108 with the lower speed input portion of the differential gear assembly 220 via a primary and a secondary deceleration gear arrangement. The gear reduction assembly 1108 further includes a rank unit 1250 (FIG. 12), which provides the mechanical gearing to facilitate selection of a gear mode, such as park, neutral, reverse, and drive. The engine 104 may include standard components, such as an oil pan 1112, oil filter 1114, air filter housing 1116, and the like.

Figure 12:
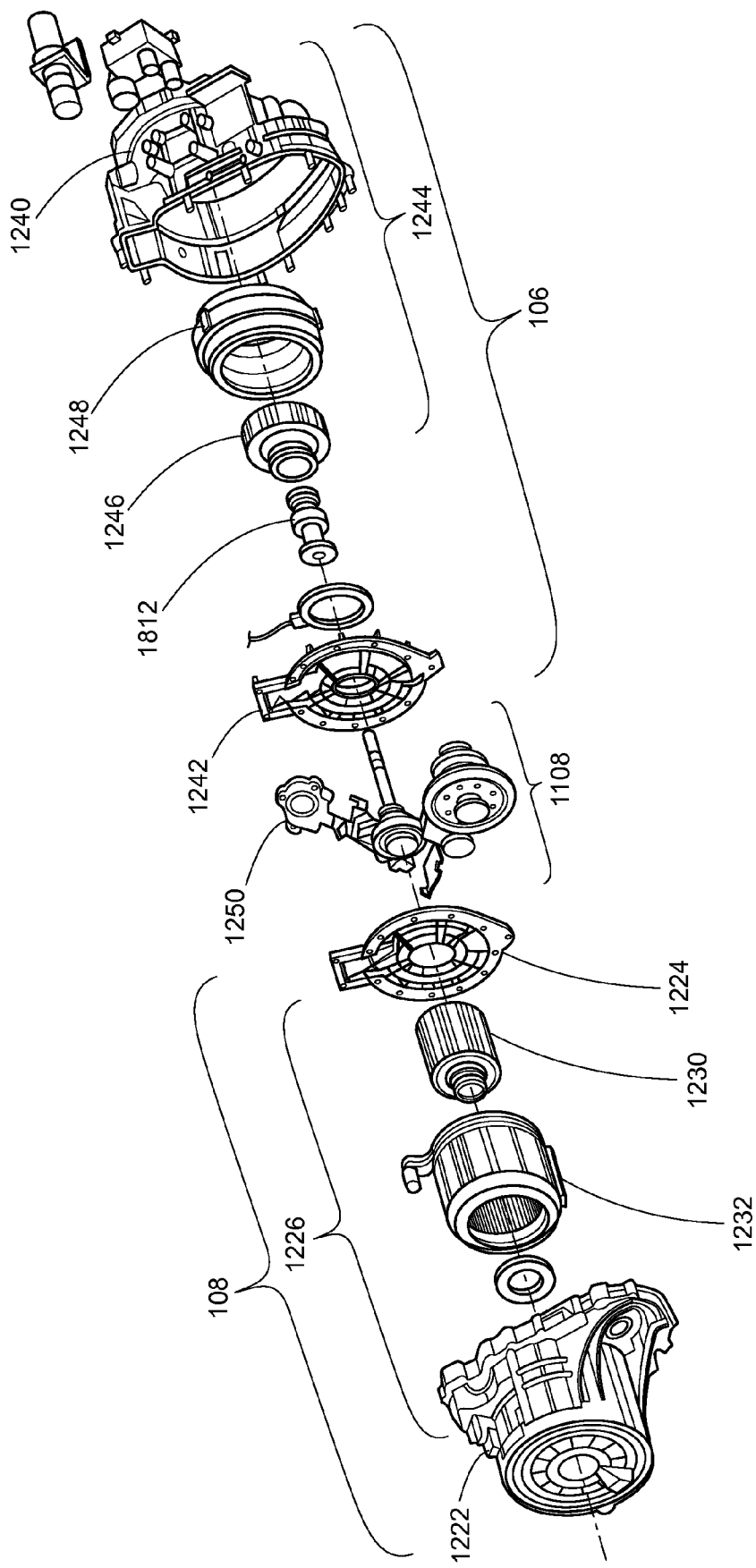
FIG. 12 is an exploded view of a portion of a power assembly of the power plant of FIG. 11, including the transmission.

FIG. 12 shows an exploded view of some of the components enclosed within the transmission or gear reduction assembly 1108, which is coupled between the motor-generator 106 and the traction motor 108. The motor-generator 106 and the traction motor 108 are shown generally in FIG. 12. On one side of the gear reduction assembly 1108, a traction motor housing 1222 houses the traction motor 108, and includes a traction motor housing cover 1224, which together define a traction motor assembly 1226. The traction motor 108 includes a rotor 1230 and a stator 1232. On an opposite side of the gear reduction assembly 1108, a motor-generator housing 1240 houses the motor-generator 106, and includes a motor-generator housing cover 1242, which together define a motor-generator assembly 1244. The motor-generator 106 similarly includes a rotor 1246 and a stator 1248.

Figure 13:
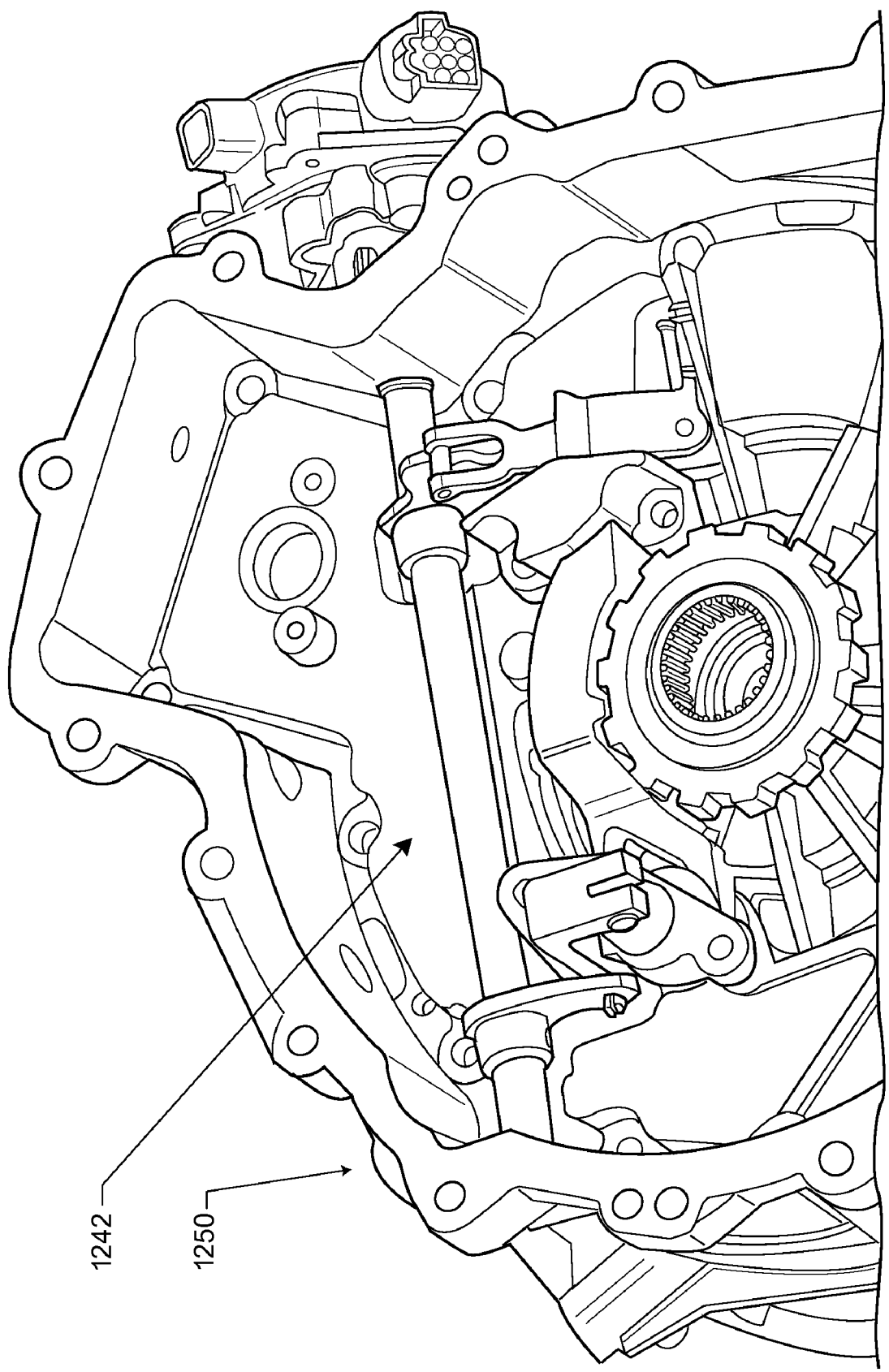
FIG. 13 is a perspective view of the rank selector assembly.

The rank unit 1250 is located within the transmission or gear reduction assembly 1108, which is between the traction motor assembly 1226 and the motor-generator assembly 1244, and is also referred to as the gear selector. The rank unit 1250 or selector is typically manually operated by the driver to select the gear mode, such as park, neutral, drive, and reverse. The controller 202 may recognize the position or operating mode of the rank unit 1250 via a gear-mode sensor or other sensor in communication with the vehicle controller 202. FIG. 13 shows the rank unit 1250 in greater detail.

Figure 11:
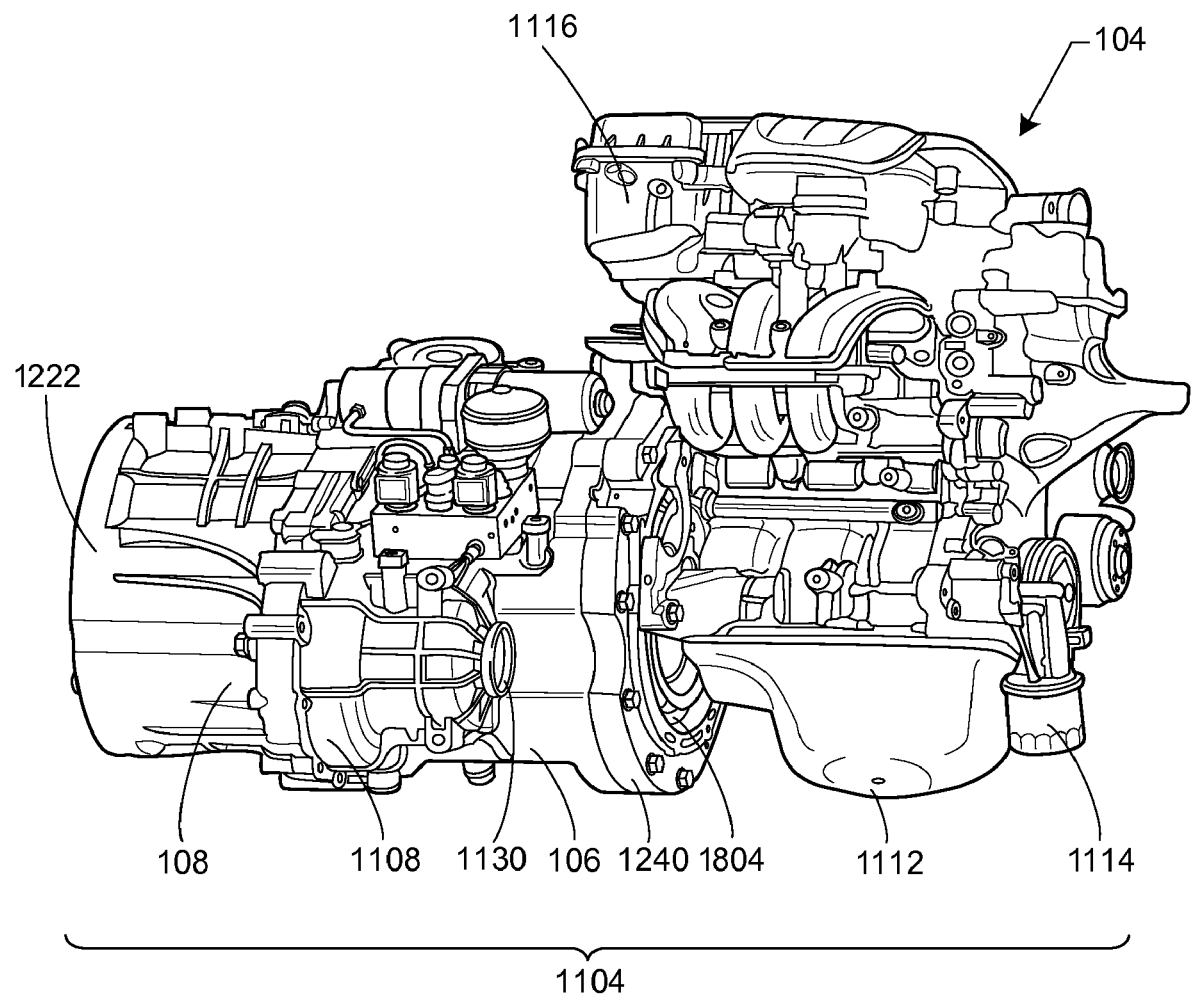
FIG. 11 is a pictorial perspective view of a power plant for a hybrid electric vehicle.

Referring to FIGS. 11-13, the gear reduction assembly 1108 or "transmission" includes the rank unit 1250. As described above, the gear reduction assembly 1108 physically couples the high-speed rotational output of the traction motor 108 with the lower speed input portion of the differential gear assembly 220. A half-shaft (see FIG. 39) couples the output of the differential gear assembly 220 through an opening or output port 1130 in the gear reduction assembly 1108 to each of the driving wheels 212. In a preferred embodiment, the gear reduction assembly 1108 houses the differential gear assembly 220, which in turn, provides an output to each of the two front wheels 212.

Figure 14:
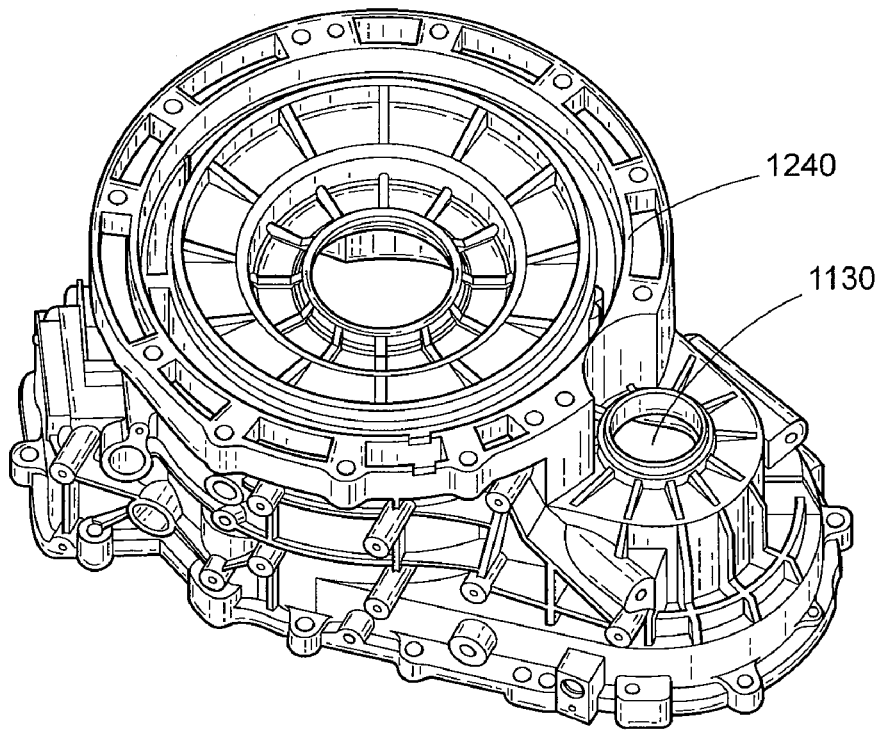
FIG. 14 is a pictorial perspective view of a front cover of the power assembly of FIG. 12.
Figure 15:
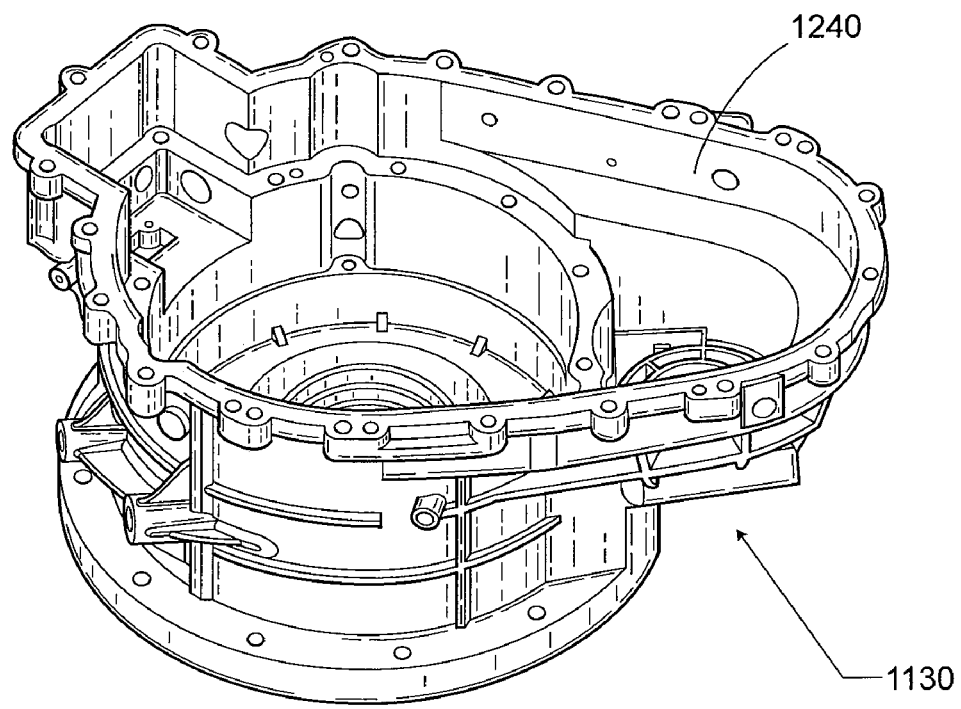
FIG. 15 is a pictorial perspective view of a front cover of the power assembly of FIG. 12 taken from the opposite direction as seen in FIG. 14.
Figure 16:
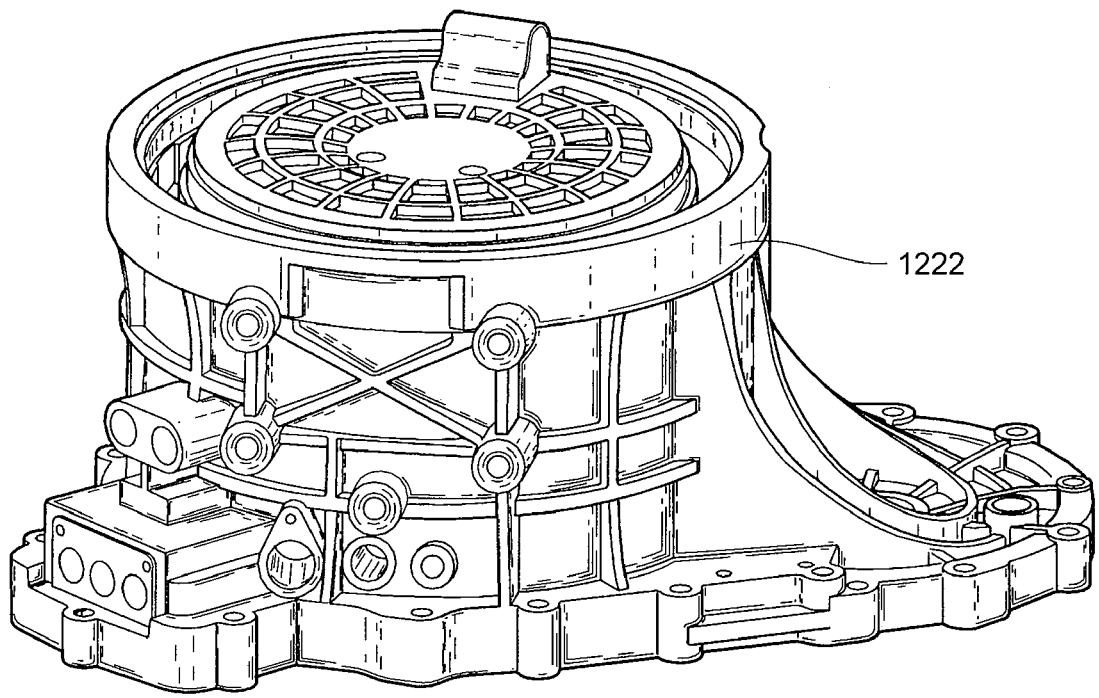
FIG. 16 is a pictorial perspective view of a back cover of the power assembly of FIG. 12.
Figure 17:
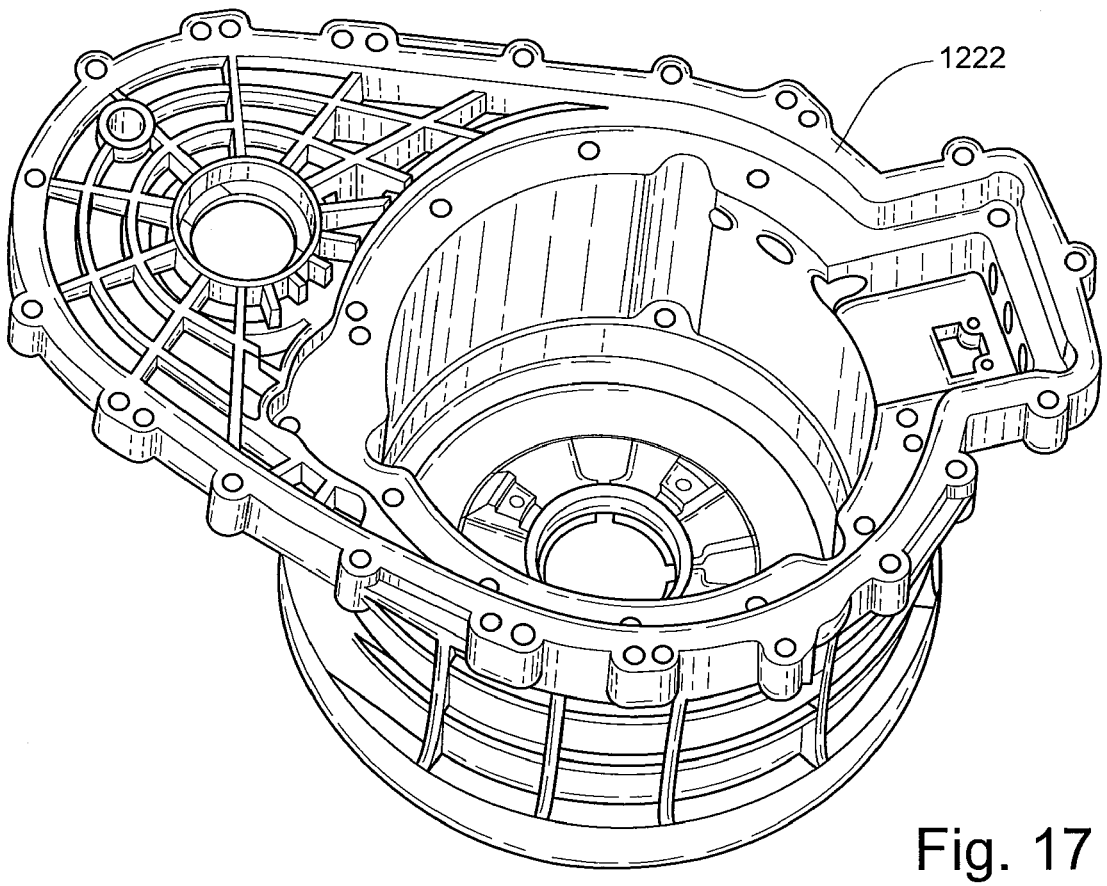
FIG. 17 is a pictorial perspective view of a back cover of the power assembly of FIG. 12 taken from an opposite direction as seen in FIG. 16.

FIG. 14 illustrates one embodiment of the motor-generator housing 1240 showing an external perspective, while FIG. 15 shows the motor-generator housing from an internal perspective. Similarly, FIG. 16 illustrates one embodiment of the traction motor housing 1222 showing an external perspective, while FIG. 17 shows the traction motor housing from an internal perspective.

Figure 18:
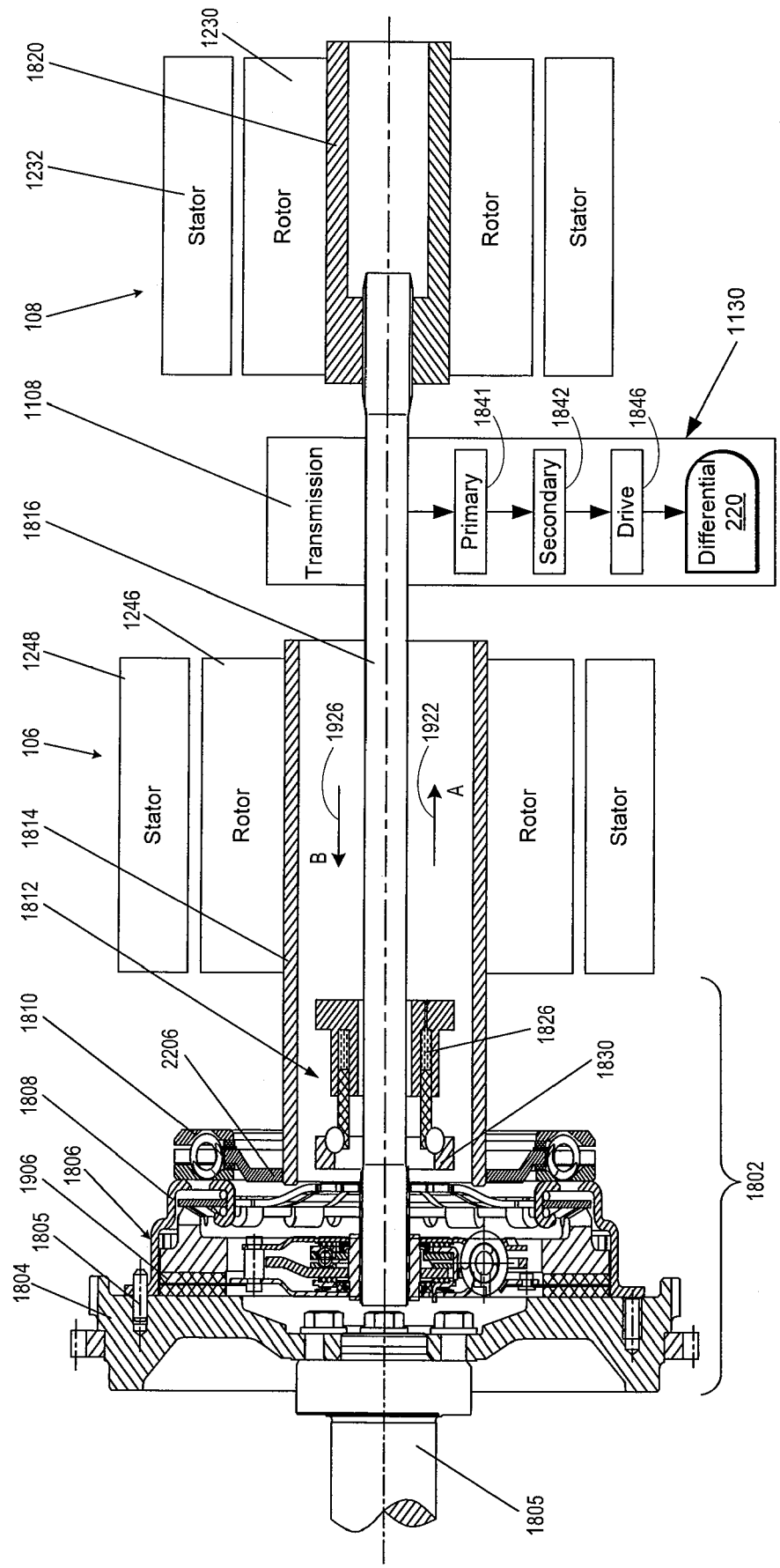
FIG. 18 is a side sectional view showing the clutch assembly and transmission.

FIG. 18 shows a torque distribution assembly 1802, also referred to interchangeably as the clutch 206 in FIGS. 2 through 10, which is operatively coupled to an engine flywheel 1804. The flywheel 1804 receives rotational power from a crankshaft 1805 of the engine 104. The torque distribution assembly 1802 is responsible for distributing the torque generated by the engine 104 and the motors 106, 108 according to two different mechanical modes.

In a first mechanical mode, the torque distribution assembly 1802 may provide a true "clutch function" to selectively engage and disengage the engine 104 from the traction motor 108. In a second mechanical mode, the torque distribution assembly 1802 provides a "soft" coupling or torsional connection between the engine 104 and the motor-generator 106. The soft or torsional connection dampens or reduces the shock or impact caused by abrupt rotational changes when the engine 104 initially starts, and conversely, provides damping or shock reduction when the motor-generator initially provides power under battery operation. Such rotational shock or rotational difference and/or misalignment less than a predetermined amount may be absorbed or smoothed by the torque distribution assembly 1802.

Note that the coupling between the motor-generator 106 and the engine 104 is always "connected" and cannot be selectively disengaged. Rather, there is a loose or shock-absorbing connection between the engine flywheel 1804 and the motor-generator 106, but they are nonetheless connected, and disengagement is not possible in specific embodiments. Because the motor-generator 106 and the engine 104 are connected, the difference in rotational speed, or angular alignment between the engine and the motor-generator 106 may only occur for a small fraction of a revolution, for example for a small sector of a revolution, such as about less than about 3 to about 10 degrees.

Figure 18A:
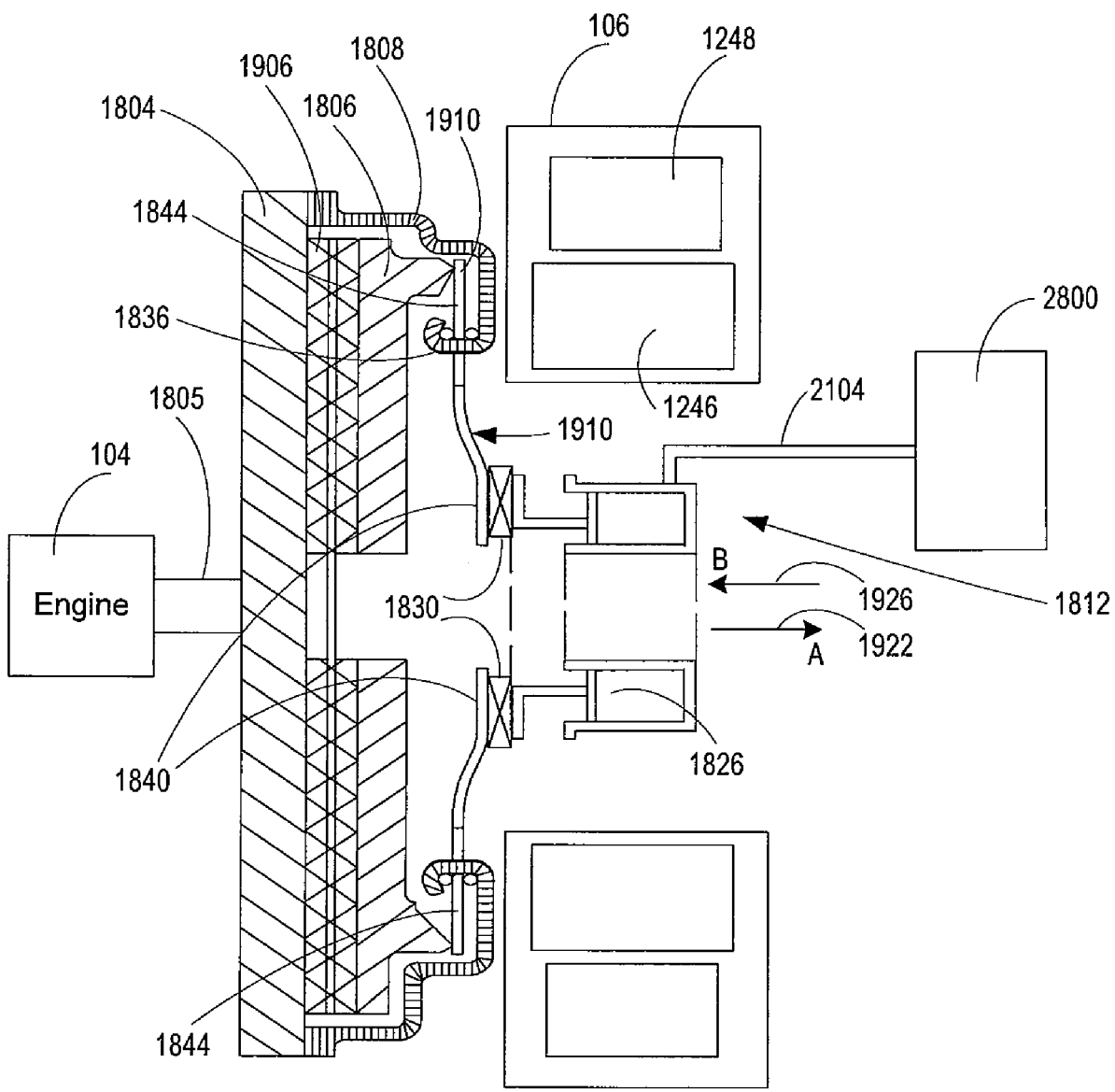
FIG. 18A is a side sectional view showing details of the clutch assembly.
Figure 19:
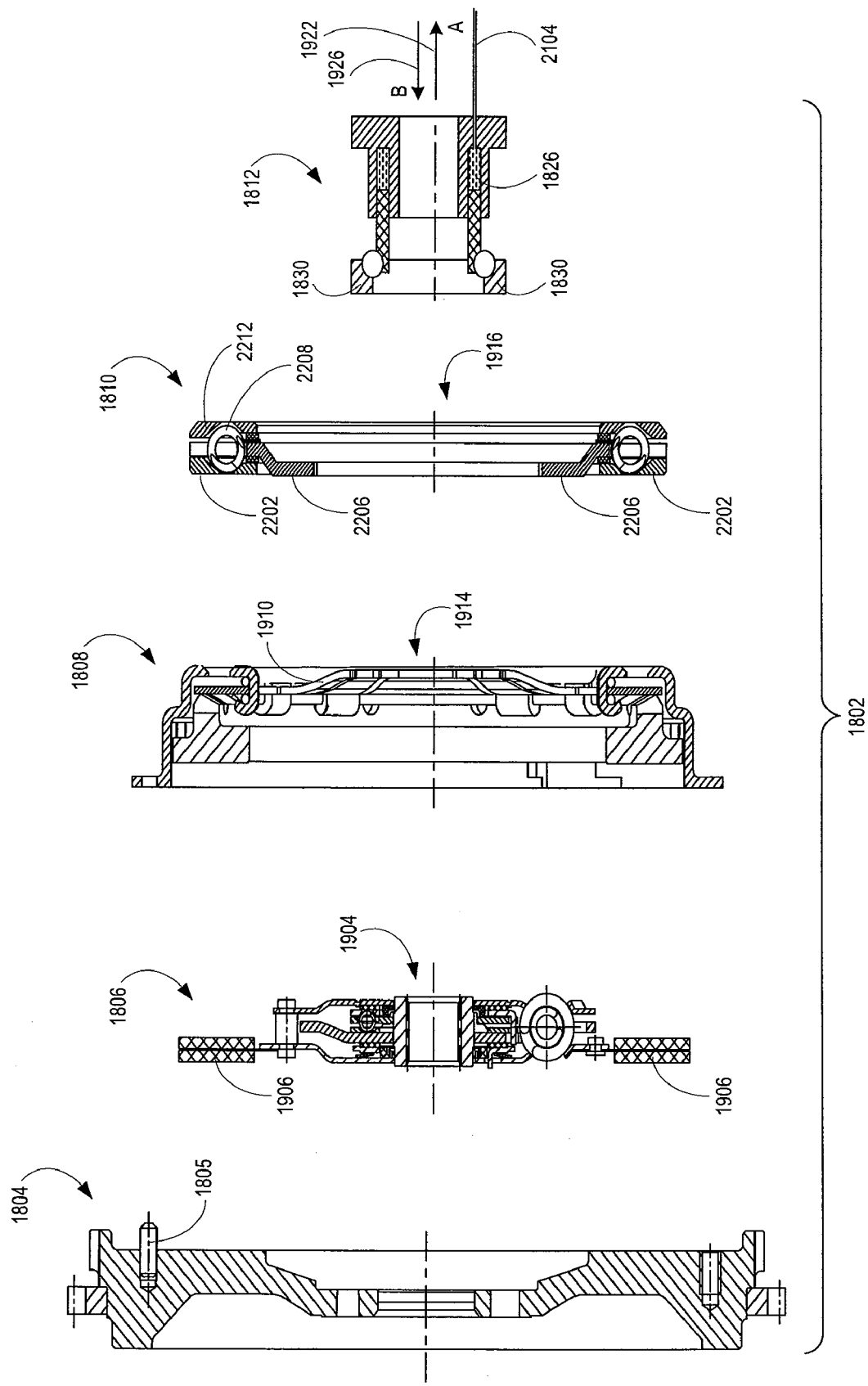
FIG. 19 is an exploded view of the components of the clutch assembly.

As shown in FIGS. 18, 18A, and in the exploded view of FIG. 19, in one embodiment, the torque distribution assembly 1802 is coupled to the flywheel 1804 with connectors or bolts 1805. The torque distribution assembly 1802 includes a driven plate assembly 1806, a cover assembly 1808, an interconnecting plate assembly 1810, a release bearing assembly 1812, a hollow drive shaft 1814 configured to rotate the rotor 1246 of motor-generator 106, and a transmission spindle 1816 configured to rotate the rotor 1230 of the traction motor 108 through a rotor shaft 1820. The transmission spindle 1816 is received through a toothed or spline-like aperture 1904 in the driven plate assembly 1806. Thus, the transmission spindle 1816 rotates when the driven plate assembly rotates, which occurs when the driven plate assembly is engaged against the rotating flywheel 1804.

The selectively engagable clutch coupling connected between the flywheel 1804 and the traction motor 108, referred to as the first mechanical mode, will now be described. Selective engagement of the clutch function is controlled by the vehicle controller 202 via the clutch controller 204, which controls activation of the release bearing assembly 1812. The release bearing assembly 1812 is located within the hollow drive shaft 1814 of the motor-generator 106, and may be spring-loaded to perform selective engagement and disengagement. Note that in a preferable embodiment, the release bearing 1812 is hydraulically actuated. However, any suitable engagement system may be used to activate and deactivate the release bearing assembly 1812. For example, the release bearing assembly 1812 may be electrically activated by a solenoid or other magnetic switch, or may be pneumatically controlled using a supply of compressed air or gas. In the preferably embodiment, for example, the clutch controller 204 may activate hydraulic power via a hydraulic piston 1826 to cause the release bearing assembly 1812 to engage and disengage.

The driven plate assembly 1806 may include a rim or ring of frictional material or a friction plate 1906, which may be formed of asbestos or synthetic frictional material for example. When the driven plate assembly 1806 is pushed against the flywheel 1804 during clutch engagement, the friction plate 1906 contacts the surface of the flywheel 1804 creating static friction during slippage as the driven plate assembly 1806 begins to rotate. After several revolutions of the flywheel 1804, the slippage is eliminated, and the driven plate assembly 1806 rotates along with the flywheel 1804 under full engagement. The rotating driven plate assembly 1806 causes the transmission spindle 1816 to rotate in unison with the rotor 1230 of the traction motor 108.

The driven plate assembly 1806 is housed within the cover assembly 1808. The cover assembly 1808 includes a diaphragm spring 1910 or other flexible spring-like member. The diaphragm spring 1910 flexes in response to reciprocating movement of the piston 1826 of release bearing assembly 1812, which may be received through an opening 1914 in the cover assembly 1808. Another opening 1916 in the interconnecting plate assembly 1810 permits the piston 1826 of the release bearing assembly 1812 to contact the diaphragm spring 1910.

When the clutch is engaged, as shown when the release bearing assembly 1812 is in the position indicated by arrow "A" 1922, the piston 1826 is out of contact with the diaphragm spring 1910. Thus, the diaphragm spring 1910 is in a non-flexed orientation, and presses the friction plate 1906 of the driven plate assembly 1806 against the surface of the flywheel 1804. This engaged position is also shown in FIG. 18, and is described in greater detail with respect to FIG. 18A.

Conversely, when the clutch is disengaged, as shown when the piston 1826 is in the position indicated by arrow "B" 1926, the piston presses against the diaphragm spring 1910, which causes it to be in a flexed orientation. The un-flexing of the diaphragm spring 1910 pulls the driven plate assembly 1806 away from the flywheel 1804, thus disengaging the driven plate assembly 1806 from the rotating flywheel 1804, and is also described in greater detail with respect to FIG. 18A. Note that in different embodiments, the orientation of the diaphragm spring 1910 may either be in a flexed orientation or in an un-flexed orientation when the clutch is engaged or disengaged, depending upon the preferred "flex-state" of the diaphragm spring 1910. This may be determined by the amount of time or how often the clutch generally remains engaged during normal driving. Preferably, during normal driving where the clutch does not couple the engine 104 to the wheels (most of the time), the orientation of the diaphragm spring 1910 and the clutch assembly is configured so that minimum wear between components occurs.

FIG. 18A shows the interaction between the release bearing assembly 1812, the piston 1826, and the diaphragm spring 1910 in greater detail. The piston 1826 may move relative the release bearing assembly 1812, as shown by the arrows "A" 1922 and "B" 1926 of FIGS. 18 and 19, while the release bearing assembly 1812 may remain in a fixed position in one embodiment. A distal end of the piston 1826 may include a race bearing 1830 or ball-bearing race, that is configured to contact the diaphragm spring 1910 as the piston 1826 moves inwardly and outwardly so as to isolate any rotational differences. A flange or pivot 1836, which may be formed in or from a portion of the cover assembly 1808, in one embodiment, may provide a pivot point for flexing of the diaphragm spring 1910.

When the piston 1826 is activated to move in the inward direction shown by arrow "B," a radially-inward portion 1840 of the diaphragm spring 1910 moves in the same direction as the piston 1826 moves. However, due to the pivot point provided by the flange 1836, a radially-outward portion 1844 of the diaphragm spring 1910 moves in the opposite direction as the piston 1826. Such movement in the opposite direction causes the radially-outward portion 1844 of the diaphragm spring 1910 to "pull" or move the driven plate assembly 1806, along with the friction disk 1906, away from the surface of the flywheel 1804, effectively disengaging the clutch assembly.

Conversely, when the piston 1826 is activated to move in the outward direction shown by arrow "A, the radially-inward portion 1840 of the diaphragm spring 1910 moves in the same direction as the piston 1826. However, again due to the pivot point provided by the flange 1836, the radially-outward portion 1844 of the diaphragm spring 1910 moves in the opposite direction as the piston 1826 moves. Such movement in the opposite direction causes the radially-outward portion 1844 (and the entire diaphragm spring 1910) to "release" and return to its normal orientation, which forces the driven plate assembly 1806, along with the friction disk 1906, into contact with the surface of the flywheel 1804, which effectively maintains clutch engagement.

Figure 20:
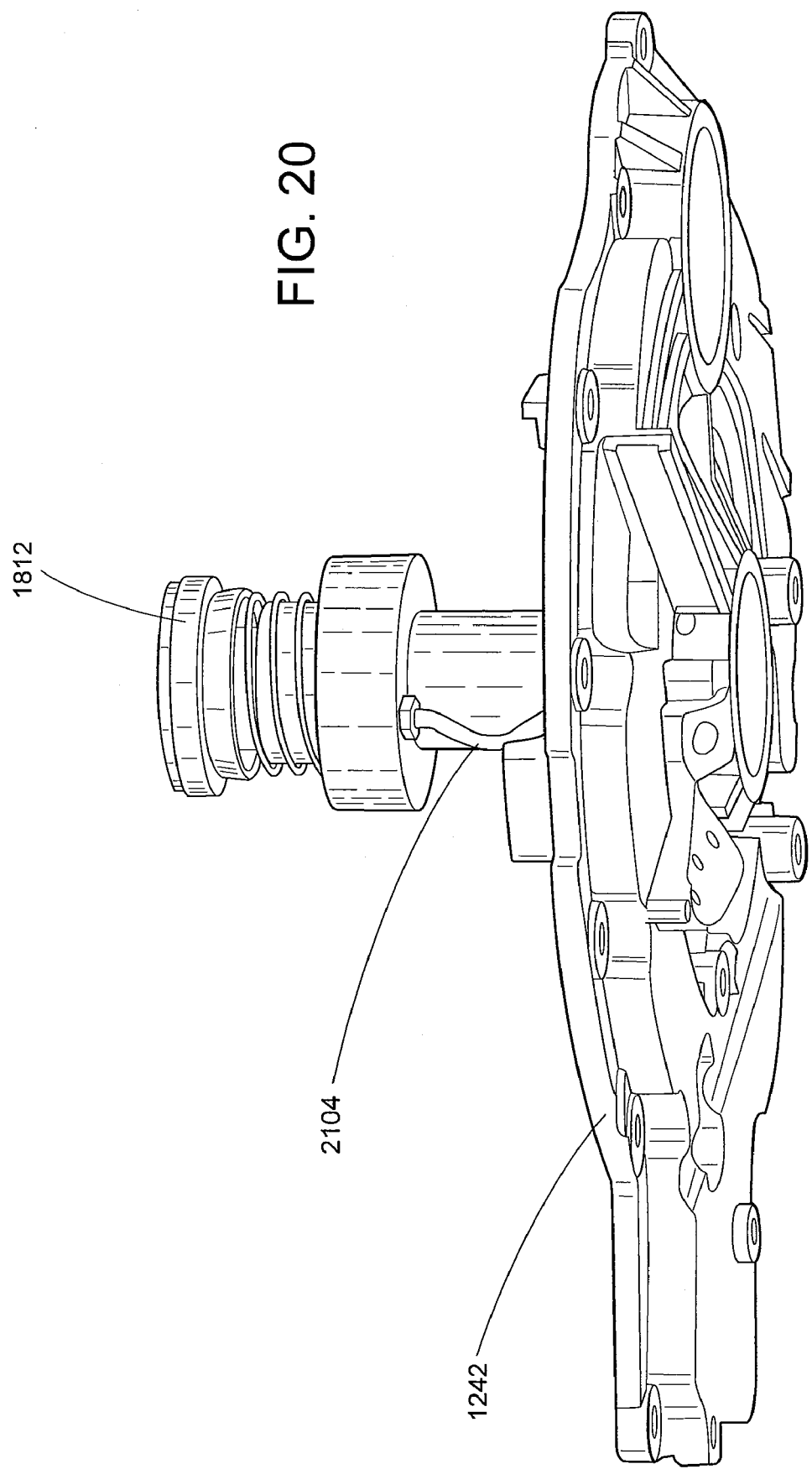
FIG. 20 is an illustration of a clutch release bearing and cover.
Figure 21:
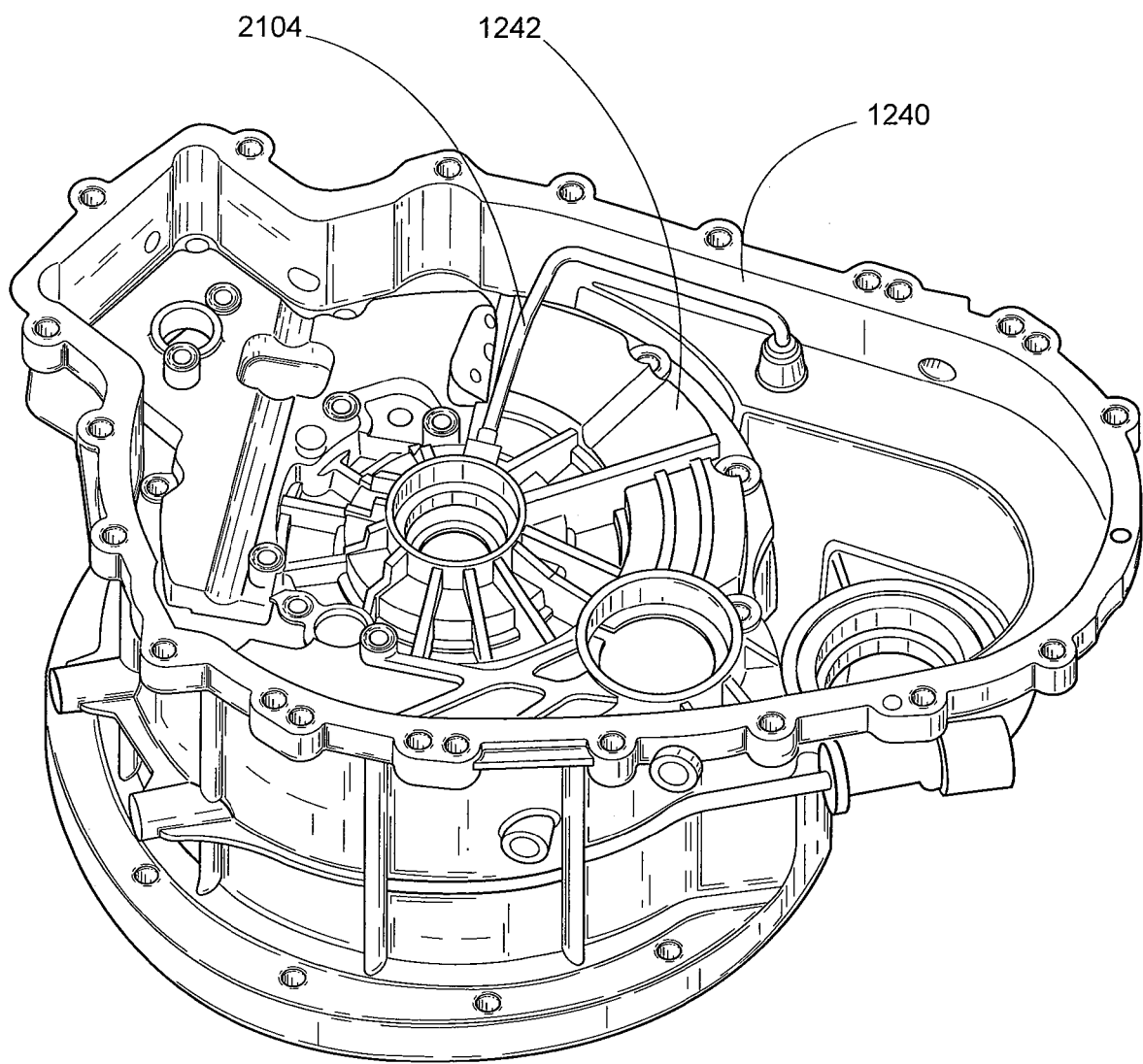
FIG. 21 is a perspective view of the motor-generator housing.

The hydraulic coupling to the release bearing assembly 1812 is shown in greater detail in FIG. 20, and is shown coupled to the motor-generator housing cover 1242. Again, this coupling may not necessarily be hydraulic in nature depending upon the specific embodiment, and may, for example, be an electrical coupling. FIG. 21 shows motor-generator housing cover 1242 with the release bearing assembly 1812 omitted, but illustrates a hydraulic line 2104 or other connection to the release bearing assembly 1812.

Referring back to FIGS. 18, 18A, and 19, the release bearing assembly 1812 includes the through-bore or cylindrical aperture 1904 configured to receive transmission spindle 1816. As described above, the piston 1826 of the release bearing assembly 1812 may be controlled to press against the diaphragm spring 1910 via the race bearing 1830 to disengage the driven plate assembly 1806, or to release the diaphragm spring 1910 so that power is transferred from the flywheel 1804 to the driven plate assembly 1806 and in turn, to the transmission spindle 1816. This provides directly-coupled rotational power to the traction motor 108 via the transmission spindle 1816. In this way, additional power from the engine 104 may be selectively coupled to the rotor shaft 1820 of the traction motor 108 in a true clutch mode to provide maximum power during the parallel tri-power mode.

The torque distribution assembly 1802, for example, may provide true clutch function to couple the engine 104 output with the traction motor 108 when the vehicle is climbing or accelerating. The torque distribution assembly 1802 may also be engaged according to the required power demands of the traction motor 108 and the motor-generator 106. For example, when the power output by the battery pack 110 is insufficient, the torque distribution assembly 1802 may couple the engine 104 to the traction motor 108 to provide extra power.

One or more operating input signals or status input signals may affect control of the torque distribution assembly 1802. For example, when the operating input signals or the status input signals indicate that the motor vehicle is operating at a high speed or with increased power demands (e.g., hill climbing, passing), the torque distribution assembly 1802 may cause the piston 1826 of the release bearing assembly 1812 to move out of contact with the diaphragm spring 1910 (clutch engaged). Conversely, when the operating input signals or the status input signals indicate that the motor vehicle is operating at a low speed or with decreased power demands, the torque distribution assembly 1802 may cause the piston 1826 of the release bearing assembly 1812 to contact and flex the diaphragm spring to disengage the clutch.

FIG. 18 shows that the torque distribution assembly 1802 is coupled to the transmission 1108. The transmission 1108 houses a primary deceleration gear 1841 configured to receive the high speed rotational output of the transmission spindle 1816, and convert its output to a lower rotational speed. A secondary deceleration gear 1842 coupled to the primary deceleration gear 1841 further reduces the rotational output speed. Finally, a driving gear 1846 receives the output from the secondary deceleration gear 1842 and couples the reduced output to the differential gear assembly 220, which in turn supplies torque to the driving wheels 212.

Figure 22:
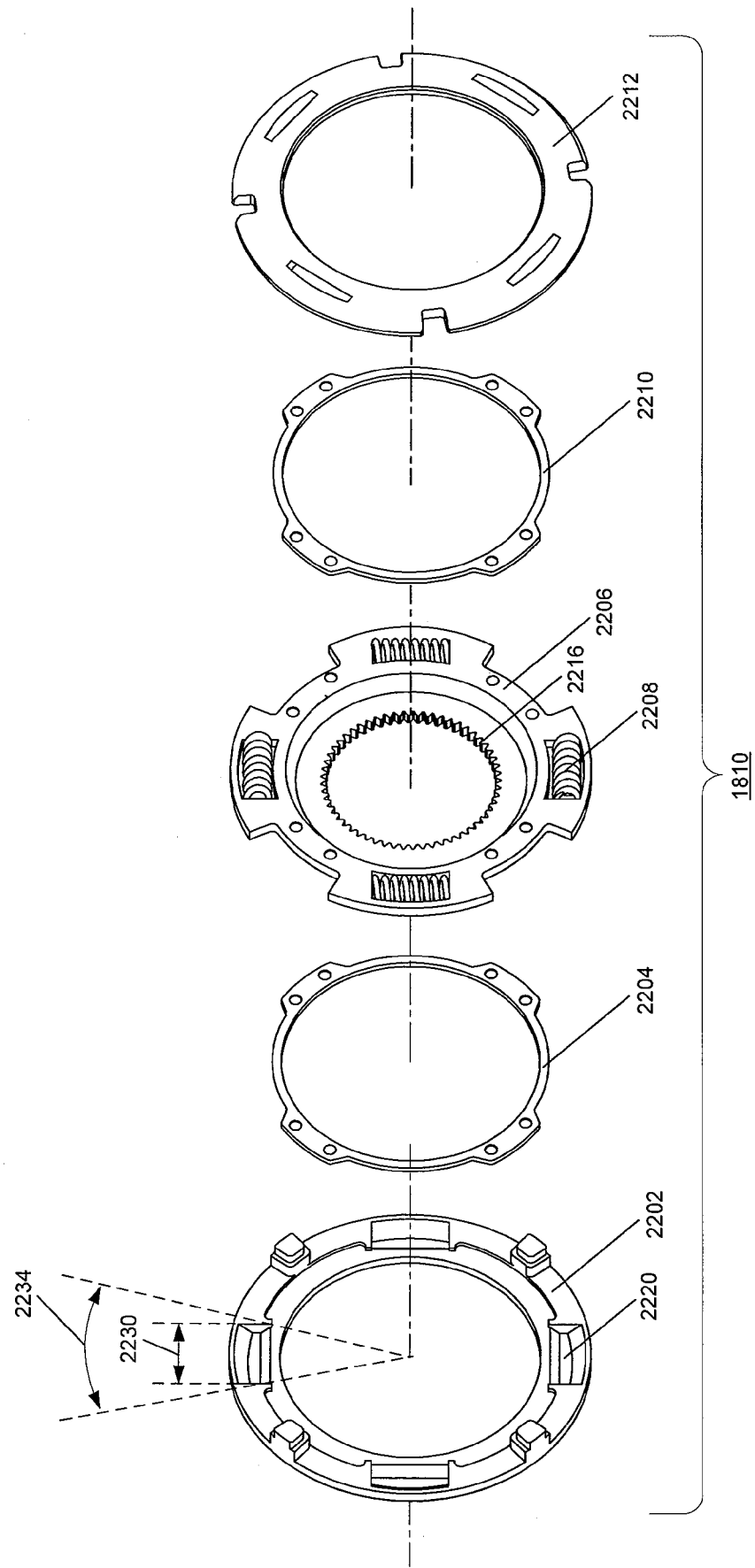
FIG. 22 shows an interconnecting plate assembly of FIG. 19.

Turn back to the torque distribution assembly 1802 of FIG. 18, the torsional or "loose" coupling between the flywheel 1804 and the motor-generator 106 will now be described ("the second mechanical mode"). FIG. 22 shows an exploded view of the interconnecting plate assembly 1810 of FIG. 18. The interconnecting plate assembly 1810 is coupled to the cover assembly 1808, and thus rotates with the cover assembly 1808, which is bolted to the flywheel 1804. In one embodiment, the interconnecting plate assembly 1810 includes an inner sideboard 2202 in communication with an inner gasket 2204, and a torsion plate 2206. The inner sideboard 2202 may be fixed to a portion of the cover assembly 1808 by welds, bolts, rivets, metal formation, or other suitable techniques to secure the interconnecting plate assembly 1810 to the cover assembly 1808.

The torsion plate 2206 may include one or more shock absorbing elements or springs 2208. The shock absorbing elements may be made of a resilient or deformable material. Other suitable torsional, deformable, or shock absorbing elements may be used. For example, the shock absorbing elements may be metal or composite coil springs or compression springs, blocks of compressible rubber, or other deformable material. The torsion plate 2206 also communicates with an outer gasket 2210 and an outer sideboard 2212. The inner gasket 2204 and the outer gasket 2210 may provide further shock absorbing or damping capability, which may reduce the shock transmitted to or from the hollow shaft 1814.

The inner gasket 2204 and the outer gasket 2210 may be made of a deformable or compressible material, such as a rubber, foam, or other suitable material that is adapted to provide a cushion to dampen mechanical movement and vibration. Accordingly, the interconnecting plate assembly 1810 provides multiple features to reduce and dampen shock and vibration between the engine 104 and the motor-generator 106.

The interconnecting plate assembly 1810 using the above-described components may provide a torsional or soft coupling between the engine 104 and the motor-generator 106 to reduce or absorb shock absorption. The hollow shaft 1814 is received through the aperture 1916 of the interconnecting plate assembly 1810 and is coupled to the torsion plate 2206. The torsion plate 2206 may have a splined or toothed aperture 2216 configured to receive and make positive engagement with the hollow shaft 1814, which may also have a spline or toothed portion. Thus, the hollow shaft 1814 rotates along with the interconnecting plate assembly 1810, the cover assembly 1808, and the flywheel 1804 when the engine 104 rotates.

In particular, the springs 2208 of the torsion plate 2206 may be configured to absorb shock when either the engine 104 or the motor-generator 106 rapidly changes rotational speed, such as upon starting or shutting-down. The springs 2208 of the interconnecting plate assembly 1810 permit the interconnecting plate assembly to rotationally flex relative to the cover assembly 1808. The springs 2208 may be partially received in a plurality of recesses 2220 in the inner sideboard 2202 to permit the torsion plate 2206 to rotationally flex or slip a few degrees relative to the cover assembly 1808. This may provide damping to reduce shock and vibration that may be transmitted from the torsion plate 2206 to the hollow shaft 1814.

Such rotationally flexing represents an angular misalignment between the torsion plate 2206 and the clutch cover 1808 (and hence with the flywheel). The maximum amount of any such angular misalignment is governed by an arcuate length 2230 of the recesses 2220 in the inner sideboard 2202, and in particular, an arc 2234 subtended by the recesses 2220. Such angular misalignment may range from about 0 degrees to about 20 degrees. Preferably, the angular misalignment typically ranges from about 0 degrees to about 10 degrees. The springs may compress and decompress in either a clockwise or counter-clockwise direction, and such compression and decompression may represent vibration between the components.

Figure 23:
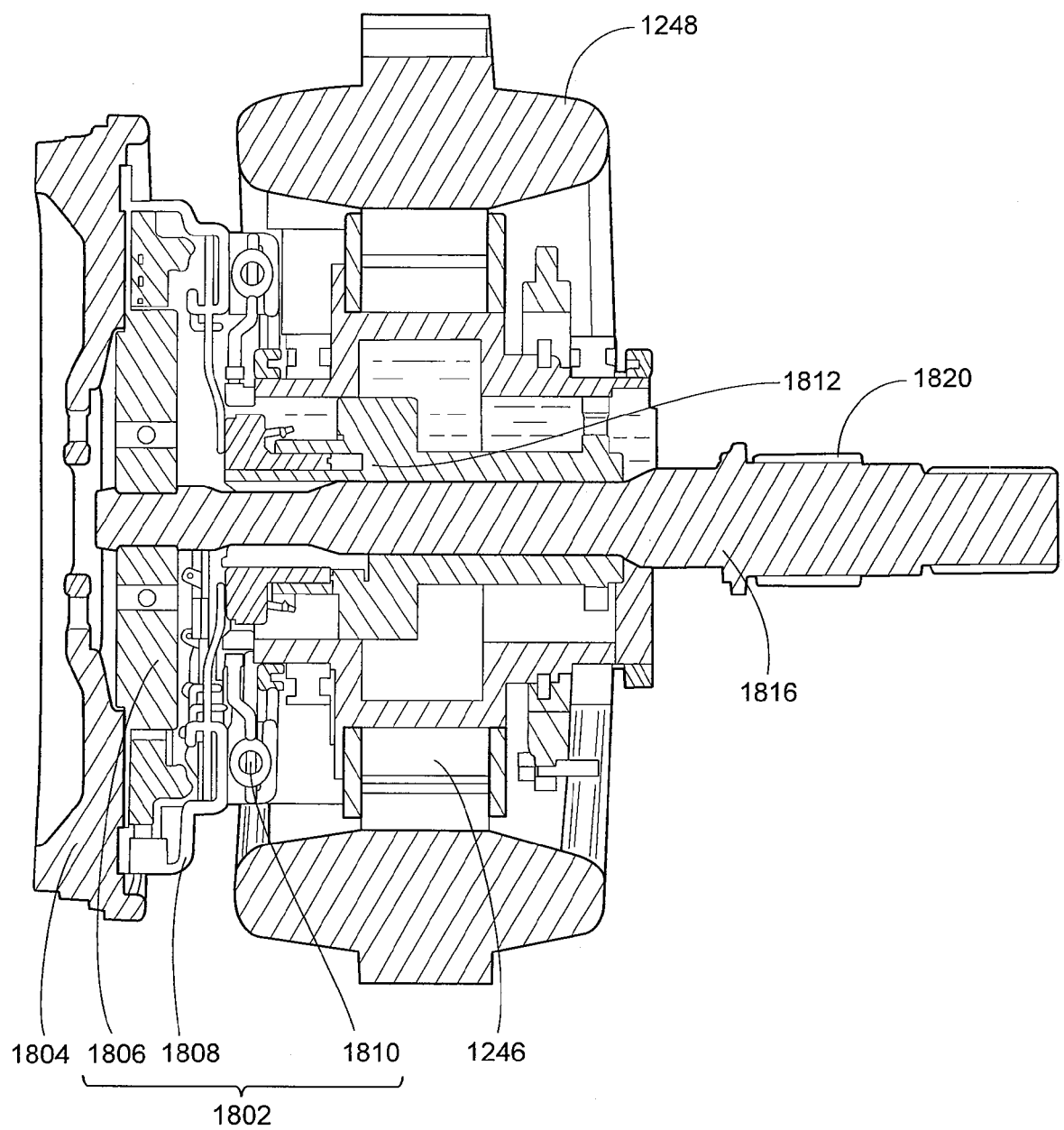
FIG. 23 is a side sectional view showing the power assembly and the motor-generator.
Figure 24:
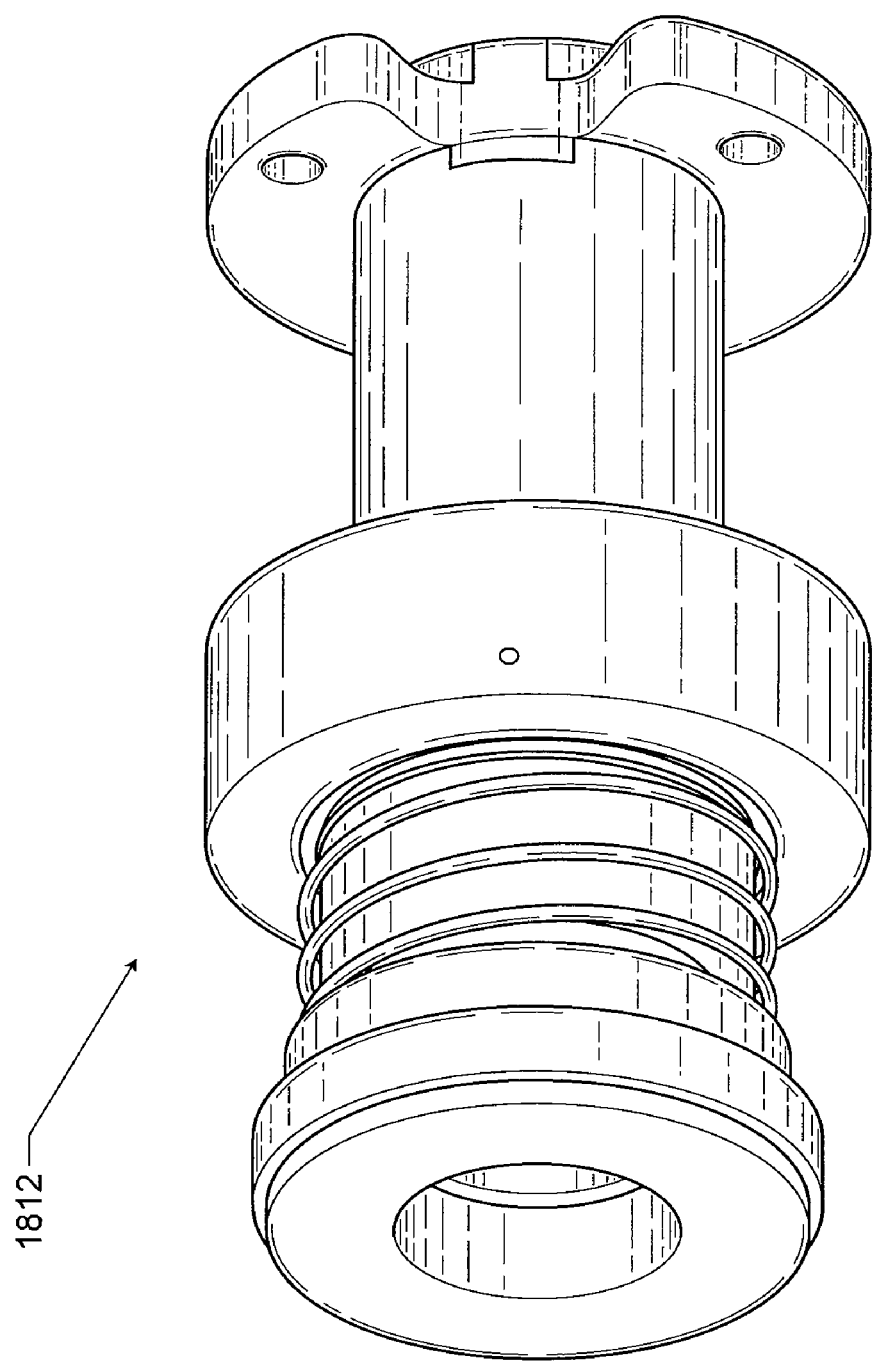
FIG. 24 is an illustration of a clutch release bearing.

FIG. 23 shows a pictorial representation of the torque distribution assembly 1802 coupling the engine flywheel 1804 to the components of the motor-generator 106. FIG. 24 shows an enlarged view of the release bearing assembly 1812.

Figure 25:
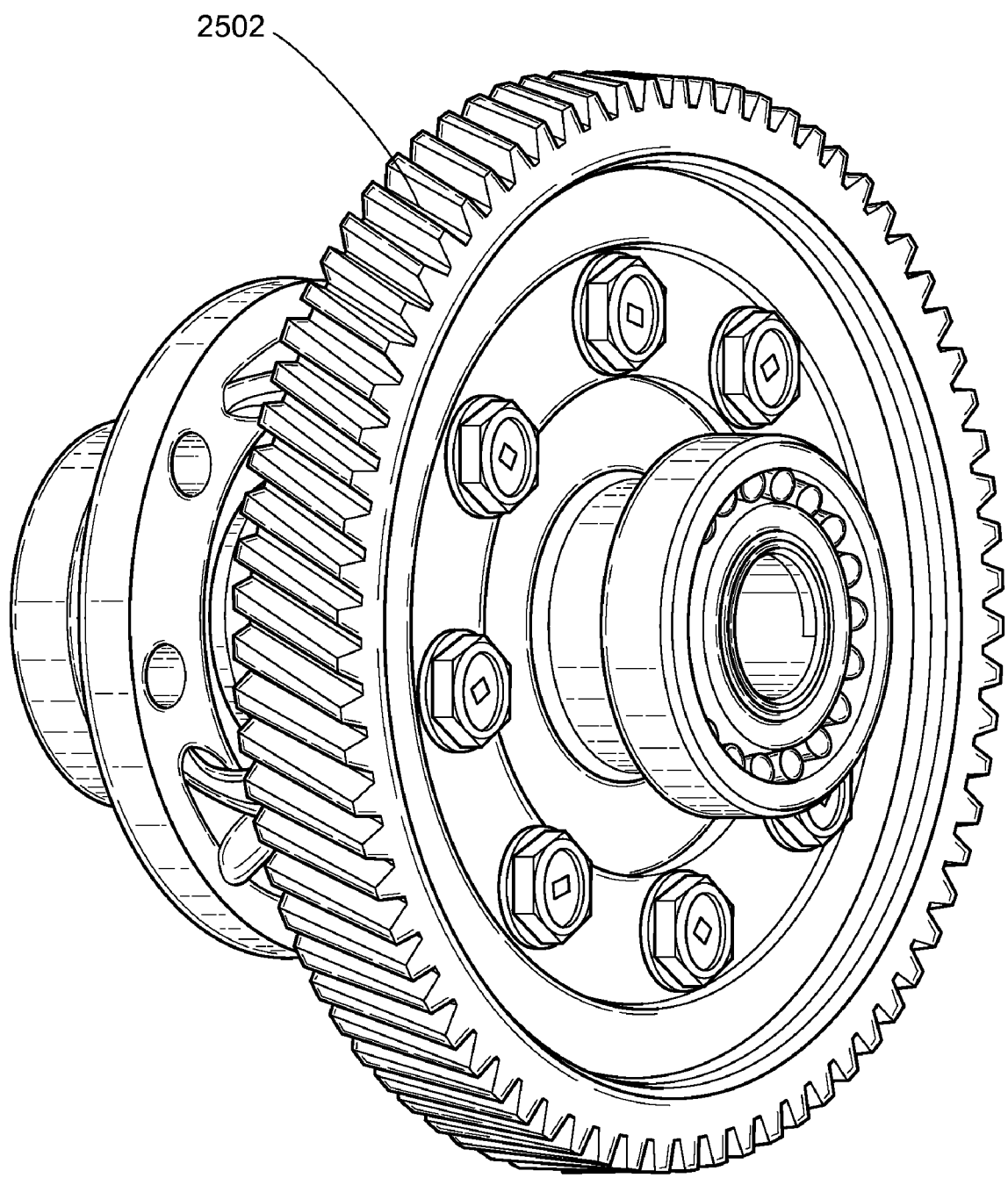
FIG. 25 illustrates a deceleration gear of the gear reduction assembly.

Referring FIGS. 11, 12, and 25, the gear reduction assembly 1108 is described in further detail. As described above, the gear reduction assembly 1108 houses the rank unit 1250 and a variety of transmission gears. FIG. 25 shows an example of one type of deceleration or reduction mechanism, and in particular, shows a transmission gear or reduction gear 2502. However many different types and combinations of gears may be used. For example, the gear reduction assembly 1108 may include helical gears, planetary gears, straight gears, and combinations of these gears.

Figure 26:
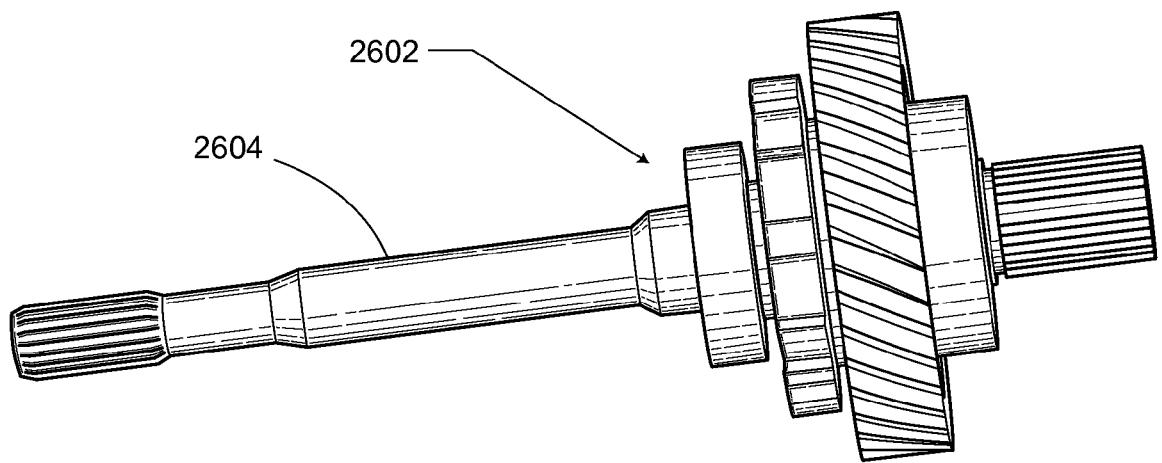
FIG. 26 illustrates a main shaft of a deceleration gear.
Figure 27:
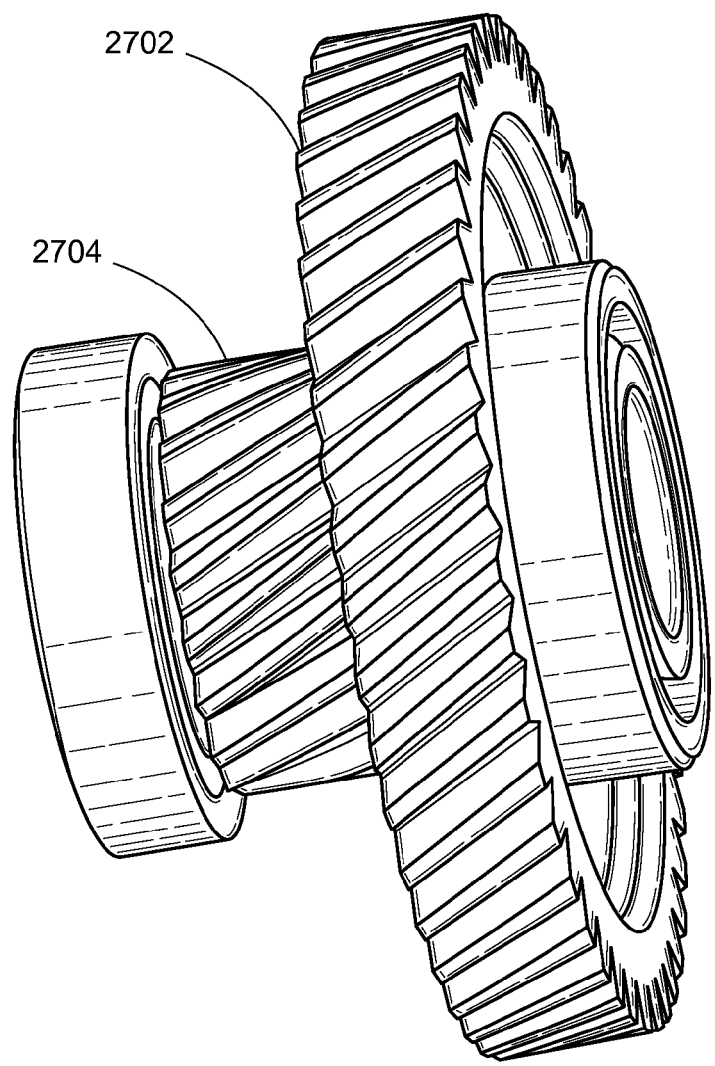
FIG. 27 illustrates a deceleration gear.

FIGS. 26 and 27 show further examples of reduction or deceleration gears 2702 and gear assemblies 2602 that may be included in the gear reduction assembly 1108. The deceleration gear 2702 shown in FIG. 27 includes an accessory shaft 2704. The gear assembly 2602 may include an input shaft 2604 to facilitate torque transfer to other gearing mechanisms. The gear assembly 2602 may rotate in conjunction with reduction gear 2702 to provide rotational reduction. The gear reduction assembly 1108 includes all of the required gearing, preferably including the differential gear assembly 220, which together define the transmission. The gear reduction assembly 1108 or transmission is a single rank, two-stage drive. As described above, the gear reduction assembly 1108 or transmission may include the primary decelerating gear 1841, the secondary decelerating gear 1842, and the driving gear 1846. Preferably, the differential gear assembly 220 is physically contained within the gear reduction assembly 1108, and receives rotational input from the driving gear 1846. In some embodiments, the differential gear assembly 220 may be physically separate from or external to the gear reduction assembly 1108.

The gear reduction assembly 1108 preferably includes only a single transmission gear so that the gear-shifting disadvantages associated with automatic transmissions and/or manual shifting are avoided. Also, no gear synchronizer or gear-shifting executive mechanism is needed, which simplifies the internal structure of the gear reduction assembly 1108, reduces the weight, and conserves space in the axial direction. In addition to the weight reduction, the engine 104 need only be activated in high-speed or passing mode, and thus can operate at its most efficient operating RPM, thus increasing fuel economy. Further, the various operating modes facilitate engine operation at its most efficient rotational speed so that maximum efficiency is achieved. Inefficient rotary speeds are avoided, such as idle and low rotary speeds. Moreover, only a very low-power, fuel efficient engine 104 is needed, which lowers manufacture costs, reduces size, and permits less complex factory assembly.

Figure 29:
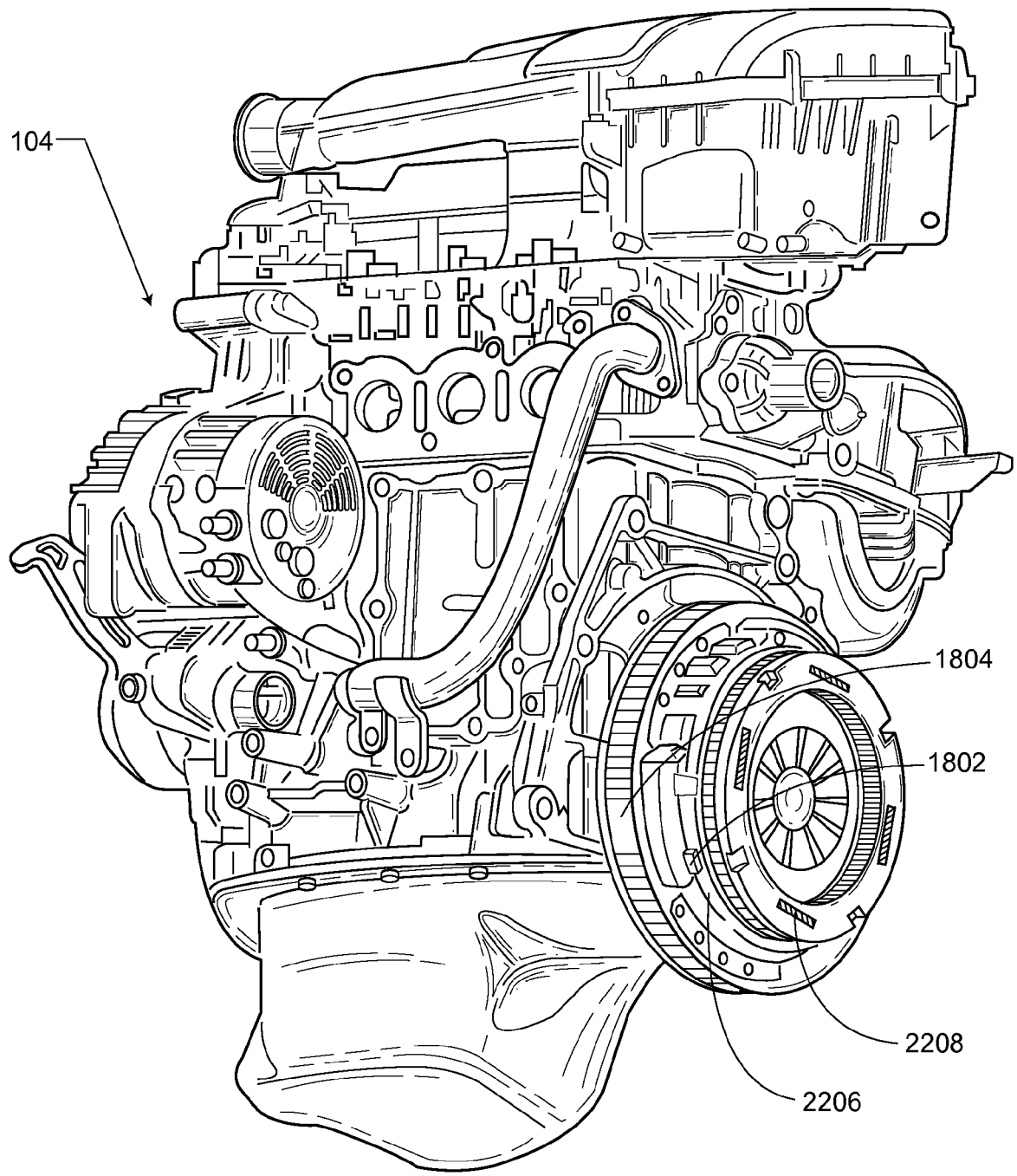
FIG. 29 is an illustration of the engine showing the flywheel and clutch components.
Figure 30:
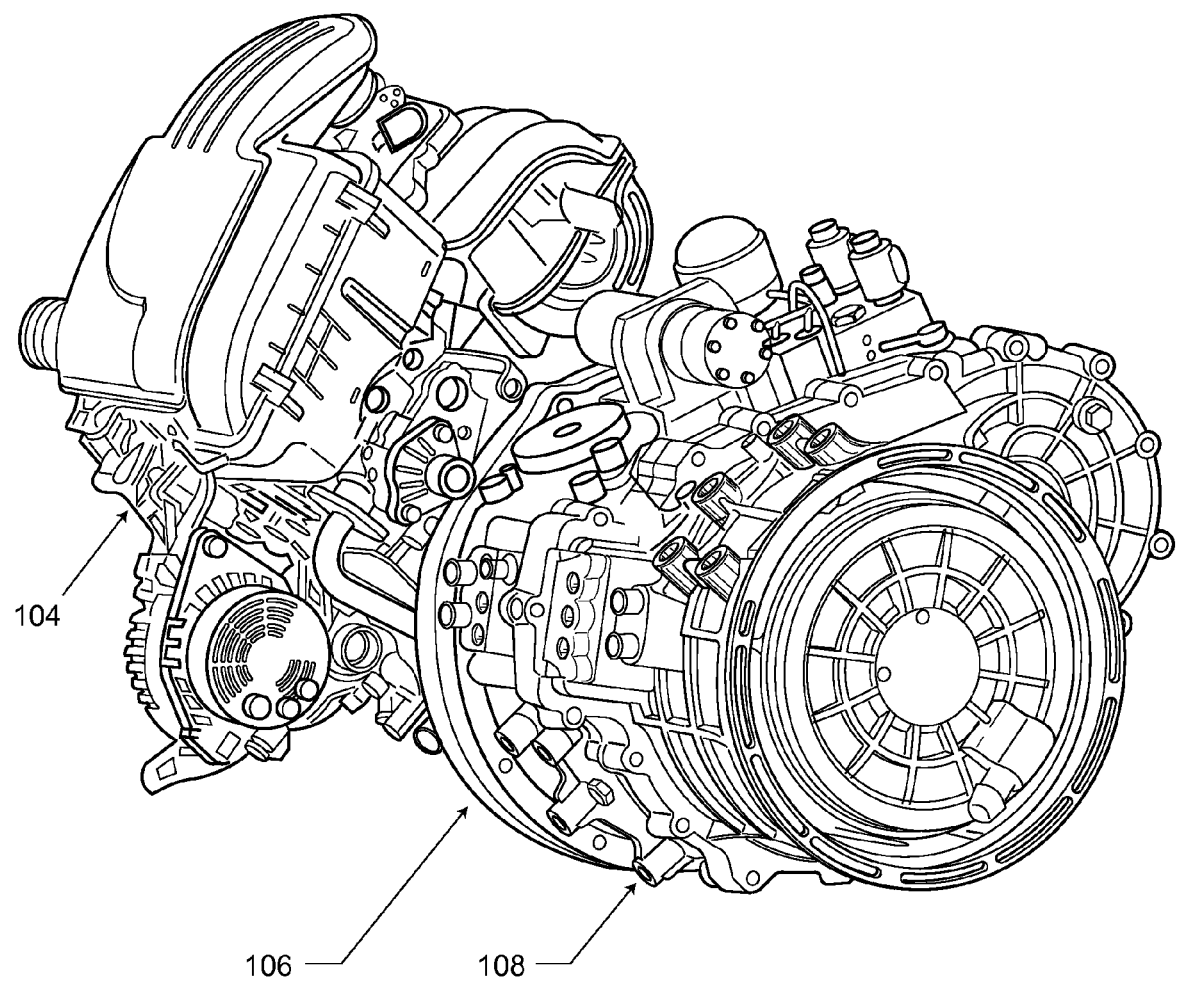
FIG. 30 is a pictorial perspective view of the power plant.
Figure 31:
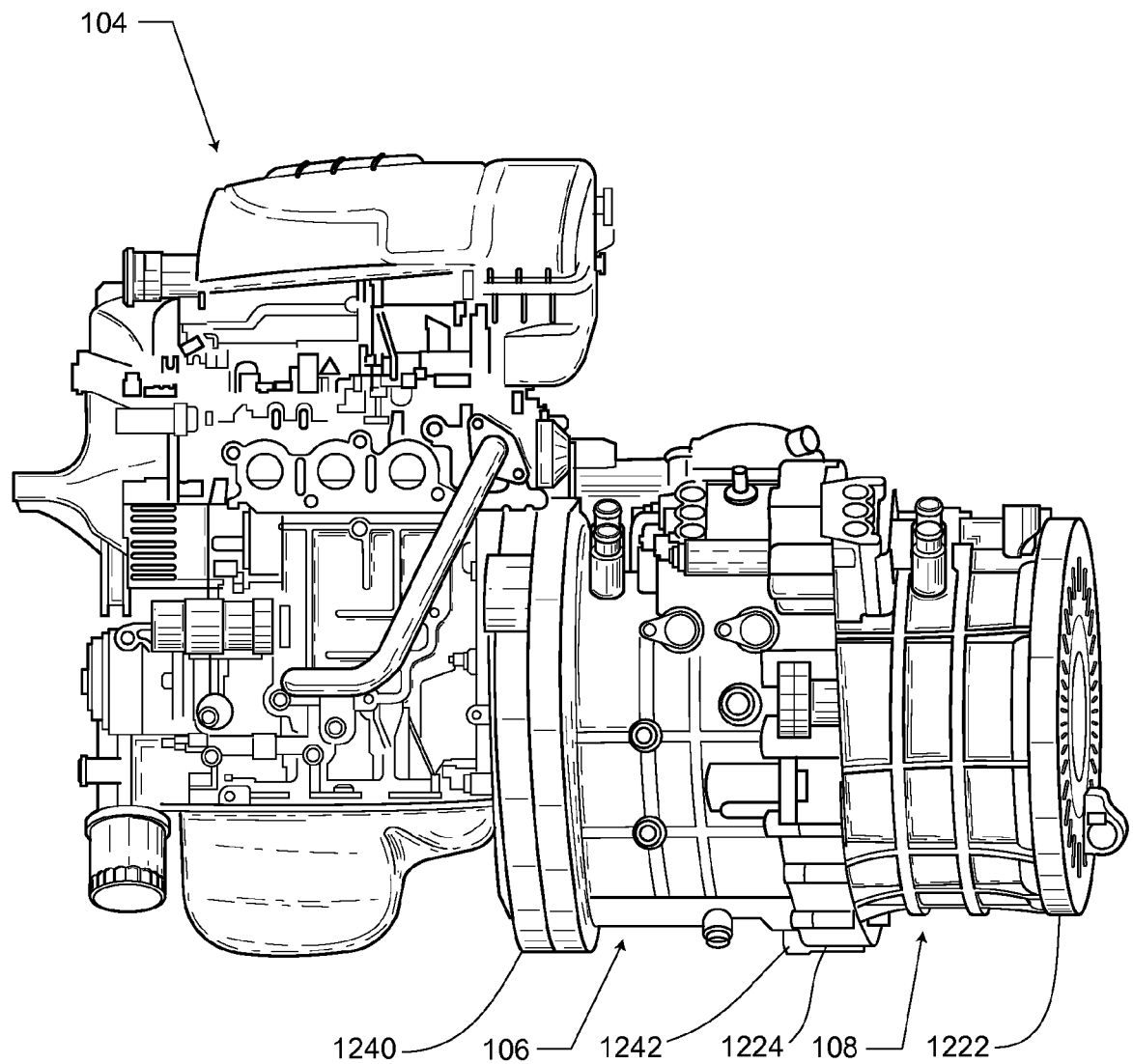
FIG. 31 is a pictorial left-side elevational view of the power plant of FIG. 30.
Figure 32:
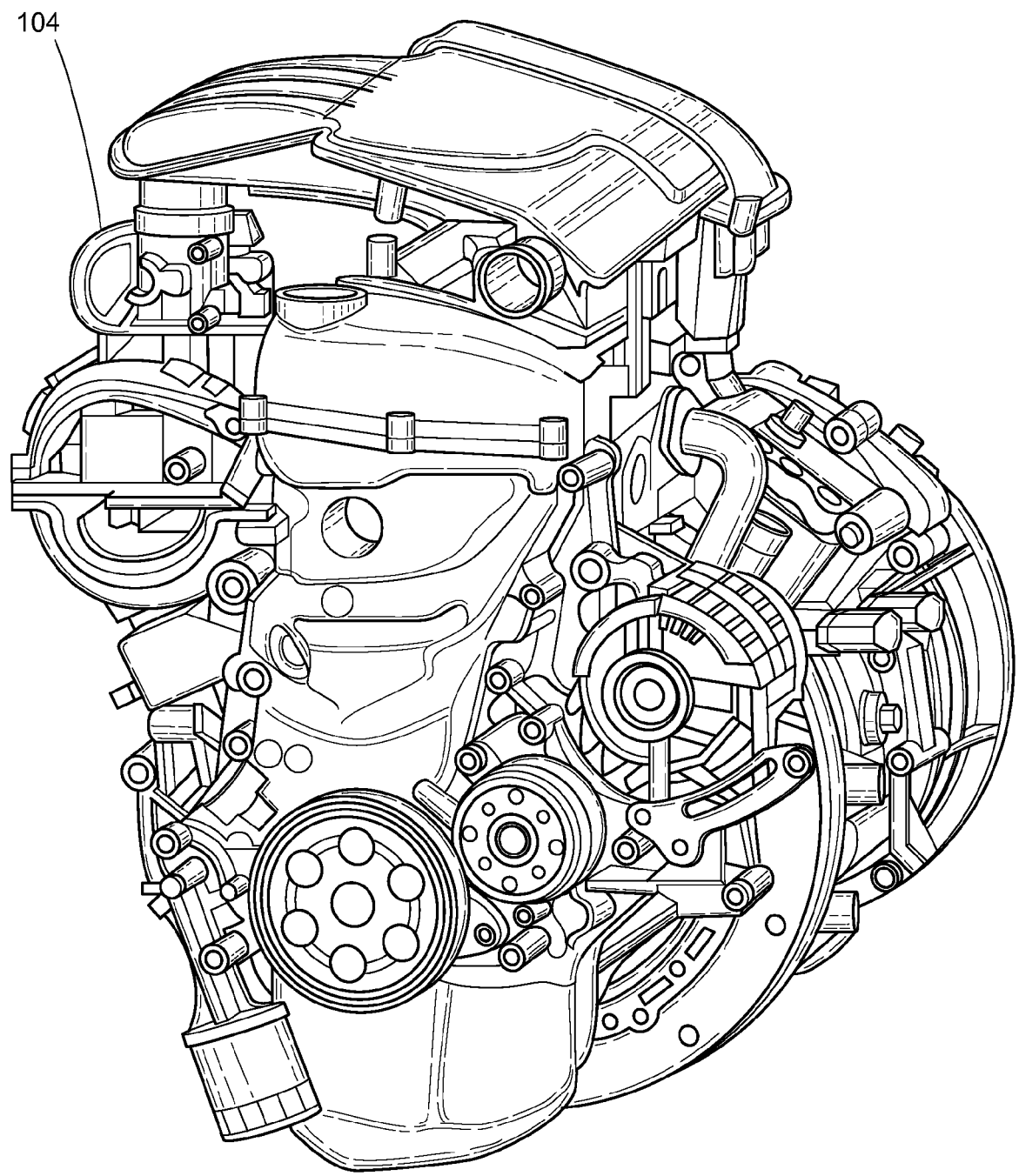
FIG. 32 is a back side elevational view of the power plant of FIG. 30.
Figure 33:
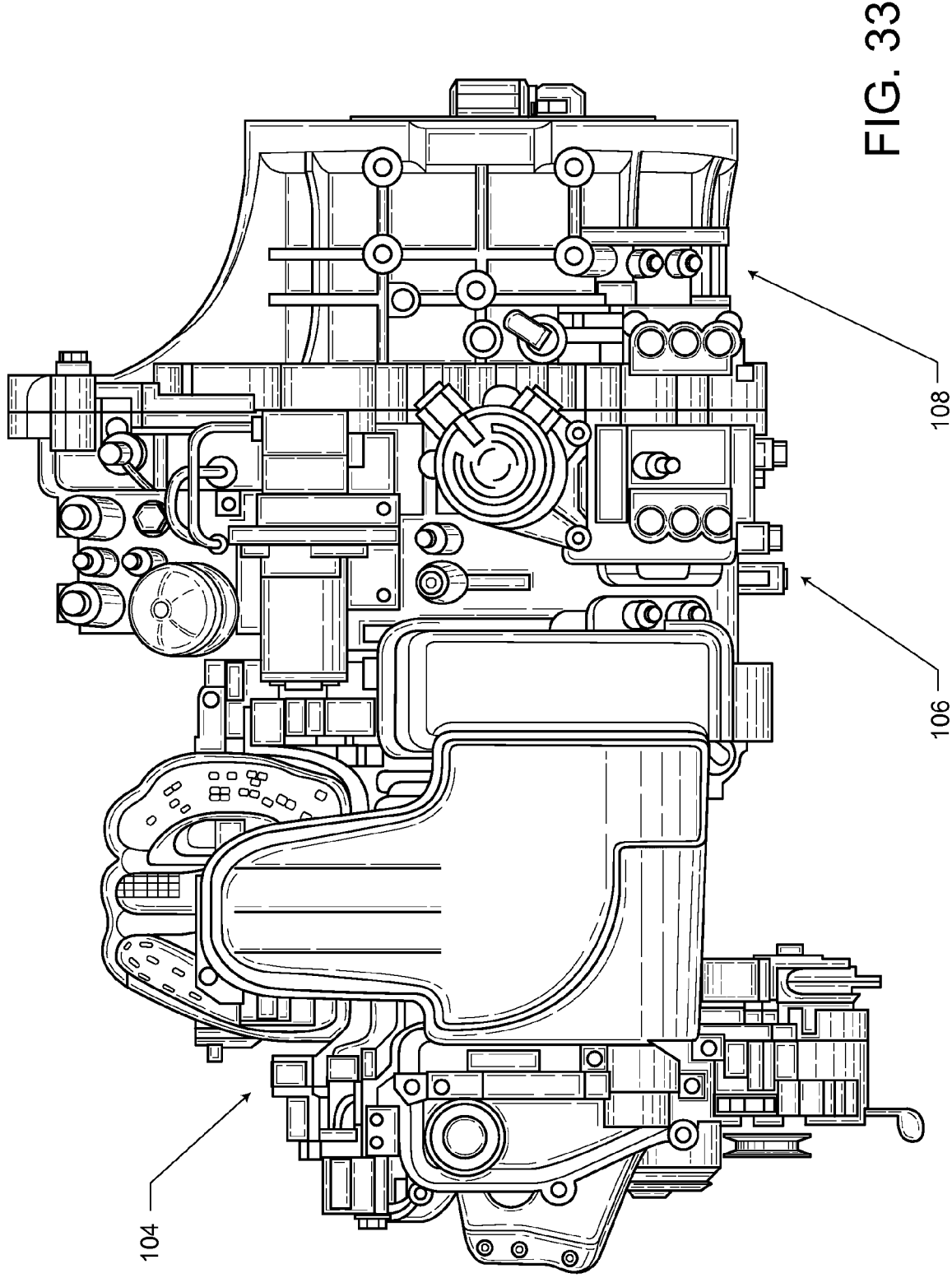
FIG. 33 is a top pictorial view of the power plant of FIG. 30.
Figure 34:
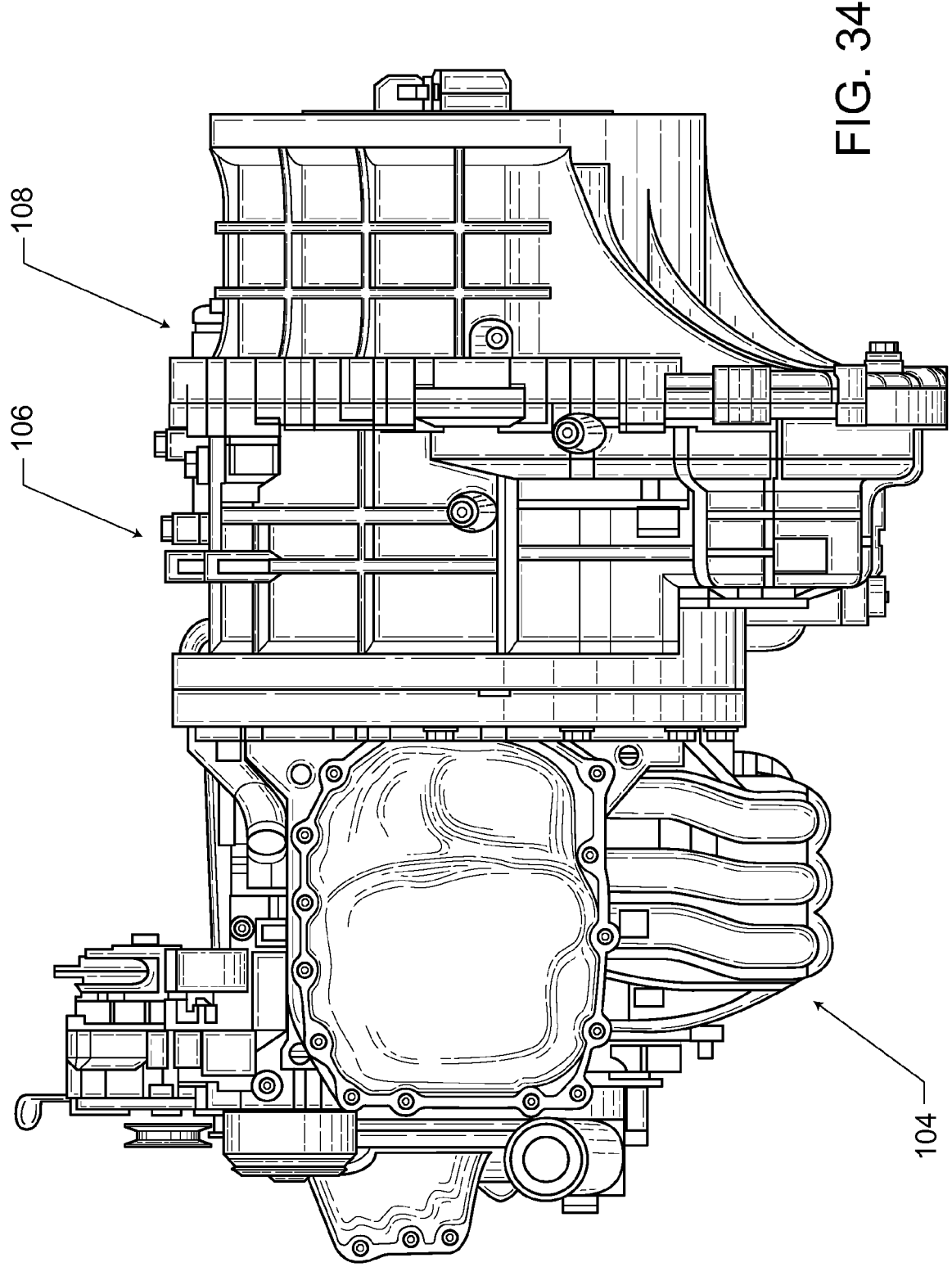
FIG. 34 is a bottom pictorial view of the power plant of FIG. 30.
Figure 35:
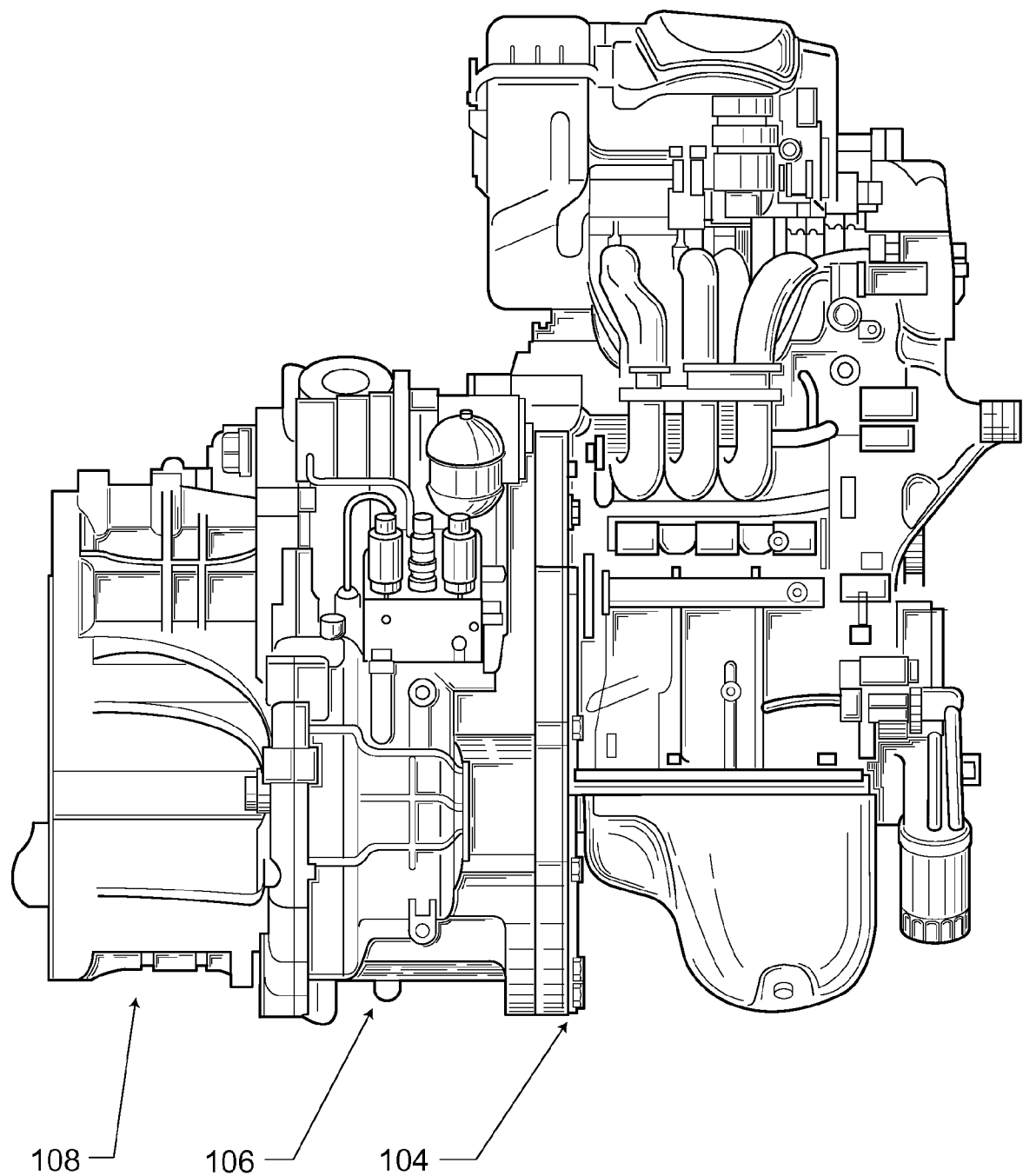
FIG. 35 is a pictorial view of the power plant of FIG. 30.

FIGS. 29-35 are further pictorial representations showing the engine 104, motor-generator 106, traction motor 108, and torque distribution assembly 1802, in various views. In particular, FIG. 29 shows the torsion plate 2206 with the exposed springs 2208 configured to and reduce shock and vibration between the engine 104 and the motor-generator 106.

Figure 39:
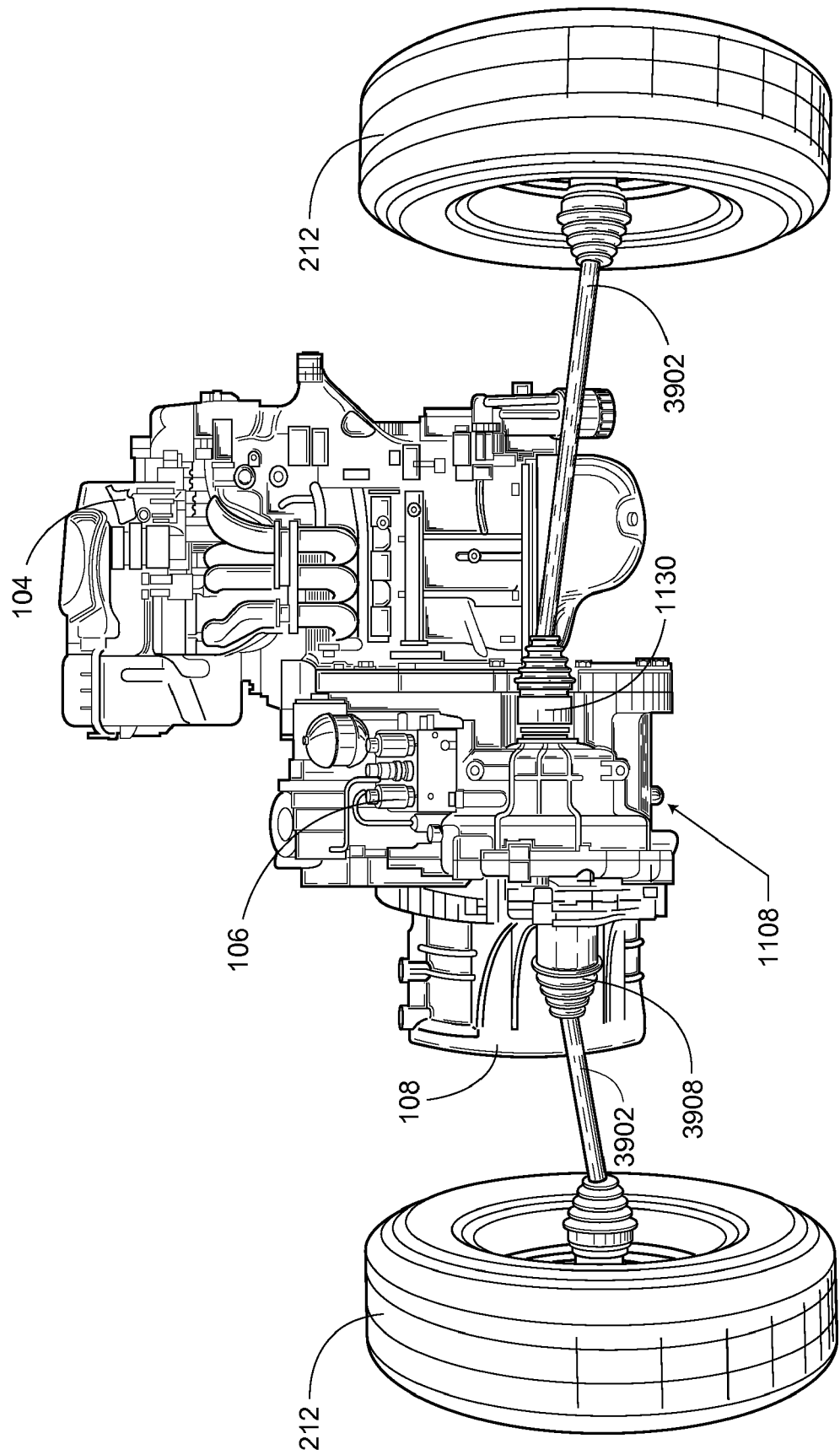
FIG. 39 is a pictorial perspective view showing coupling of the wheels to the transmission.

FIG. 39 shows the connection of the driving wheels 212 to the outputs of the differential gear assembly 212, which may be housed within the gear reduction assembly or transmission 1108. In some embodiments, the gear reduction assembly 1108 may include two openings that provide access to corresponding port. A half-shaft 3902 and universal joint 3908 distributes the rotational output from the differential 220 through each port to the corresponding driving wheel 212. Each half-shaft 3902 may be coupled to the final gear stage of the differential gear assembly 220, which is preferably located within the gear reduction assembly 1108.

As shown in the above figures, and in particular, FIG. 39, the engine 104, the motor-generator 106, the traction motor 108, the gear reduction assembly 1108 (which includes the differential assembly 220) are housed within an engine compartment and located between and above the two front wheels. In that regard, the motor-generator 106, the traction motor 108, the gear reduction assembly 1108, are located above a centerline of the wheels, which may be defined by the position of the half-shafts 3902. The engine 104 is substantially above the centerline of the wheels. The mechanical power coupling provided by the flywheel 1804, the torque distribution assembly 1802, and the spindle 1816, and other components are arranged in a generally linear manner from the engine 104 to the motor-generator 106, and from the motor-generator to the traction motor 108.

Figure 28:
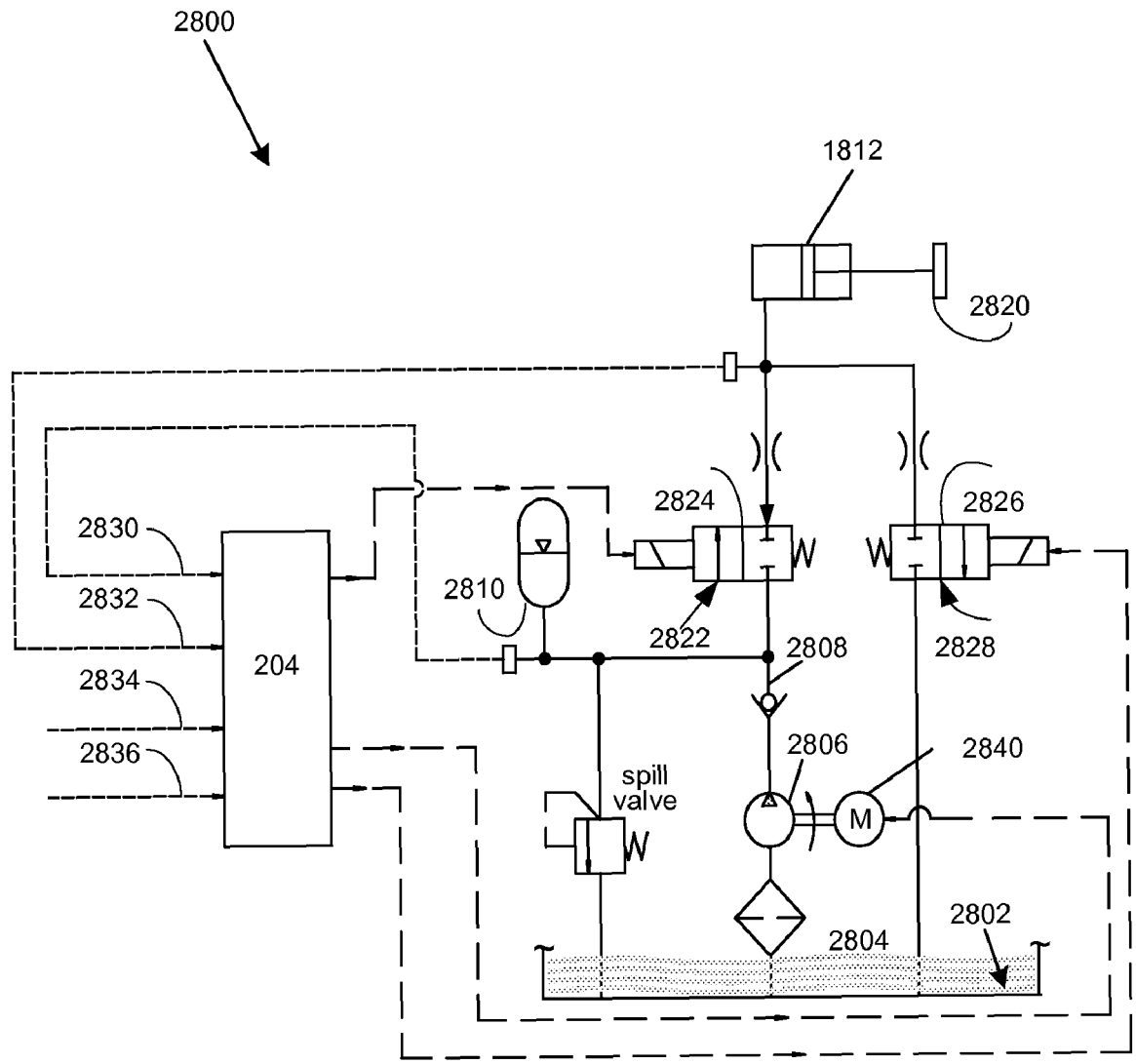
FIG. 28 is a schematic diagram of the hydraulic system.

FIG. 28 is a schematic diagram of a hydraulic control system 2800 configured to actuate various components in the torque distribution system 1802, and in particular, the release bearing assembly 1812 in the embodiments using hydraulic actuation. In one embodiment, the hydraulic flow path with respect to energy storage is as follows: Fluid flows from a hydraulic fluid reservoir 2802 through a filter 2804, to a fluid pump assembly 2806, through a check valve 2808, into an accumulator 2810, and back into the hydraulic fluid reservoir 2802.

In another embodiment, the hydraulic flow path with respect to a top pressure diaphragm spring 2820 (may also be referred to as 1910) when the clutch (release bearing assembly 1812) is separated, is as follows: Fluid flows from the accumulator 2810 through a first solenoid directional control valve 2822, through a large damping hole 2824, and to the release bearing assembly 1812.

In a further embodiment, the hydraulic flow path with respect to hydraulic fluid return, when the clutch (release bearing assembly 1812) is engaged or connected, is a follows: Fluid flows from the release bearing assembly 1812 through a small damping hole 2826, through a second solenoid directional control valve 2828, and back to the hydraulic fluid reservoir 2802.

The clutch (release bearing assembly 1812) is controlled via "energy storage" using the top pressure diaphragm spring 2820 and return fluid flow. Electrical signals (2830—first pressure sending signal, 2832—second pressure sending signal) generated by the various sensors are processed by the clutch controller 204. The clutch controller 204 may also process a clutch separation signal 2834 and a clutch connected signal 2836. The clutch controller 204 controls the hydraulic system pressure via electromagnetic valves and the hydraulic fluid pump assembly 2806 to ensure proper operation of the release bearing assembly 1812. The accumulator 2810 acts as the main source of energy while an electrical pump motor 2840 provides mechanical power to the hydraulic fluid pump assembly.

In known hydraulic systems, if the hydraulic fluid pump constantly pressurizes the hydraulic cylinder directly, a pump having a large fluid volume is needed (along with a large motor to pressurize the pump), and premature failures may result due to frequent hydraulic startup and large hydraulic shocks. However, the hydraulic system described in the various embodiments is advantageous because the fluid pump assembly 2806 pressurizes the accumulator 2810, where the accumulator, in turn, pressurizes the release bearing assembly 1812. This permits use of a hydraulic pump having smaller volume (along with a smaller pump motor 2840), reduces pump startup time, increases the pump lifetime, and reduces hydraulic fluid shock in the system. Use of the damping holes 2824 and 2826 increases the control accuracy of the hydraulic system 2800. In particular, the large damping hole 2824 permits quick clutch separation, while use of the small damping hole 2826 ensues operation of the clutch in the half-running-in condition.

Referring back to FIGS. 1-10, the vehicle controller 202 may accept a variety of input operating signals to facilitate changing or modifying the operating mode of the hybrid power system 102. For example, the vehicle controller 202 may accept a gear-mode input operating signal, an accelerator pedal depth input operating signal, brake pedal input operating signal, and a user-selected EV/HEV input operating signal, as well as sensor input data, such as outside temperature, engine temperature, vehicle speed, engine RPM, oil pressure, radiator water temperature, and the like. The vehicle controller may utilize the above-described input signals to control the torque and speed of the traction motor 108.

Regarding certain input operating signals or parameters, the accelerator depth input operating signal indicates the amount of depression of the accelerator pedal by the driver. In one implementation, the accelerator depth input operating signal indicates a depression percentage of the accelerator pedal. In an alternative implementation, the accelerator depth input operating signal indicates a depression distance of the accelerator pedal. The accelerator depth input operating signal may indicate a general or discrete amount of the accelerator pedal depth. As examples of measurements, the accelerator depth input operating signal may indicate that the accelerator pedal is depressed 25%, 50%, 75%, or is depressed by any other number, whether whole or fractional. The accelerator depth input operating signal may also indicate a combination of a depression percentage and a depression distance.

The brake input operating signal indicates the amount of depression of a brake pedal by the driver. In one implementation, the brake input operating signal indicates a depression distance that the brake pedal is depressed. In another embodiment, the brake input operating signal may indicate a depression percentage of the brake pedal. The brake input operating signal may indicate a combination of a depression percentage and a depression distance. In one embodiment, an angle sensor (not shown) in communication with the brake pedal communicates the brake input operating signal value to the vehicle controller. The brake input operating signal may be measured as a percentage, distance, or any suitable unit of measurement.

The vehicle controller 202 may also accept and process other input operating signals, such as road surface gradient (hill angle), battery capacity, vehicle velocity, or any other input signal. The surface gradient input signal indicates the angle of the surface on which the motor vehicle is traveling. The vehicle controller 202 may use the surface gradient input signal to control one or more components of the hybrid power system 102, such as the electric motor-generator 106 or the electric traction motor 108, to prevent uncontrolled sliding of the motor vehicle during the ascent or descent on a sloping surface.

The battery capacity input status signal indicates the charge capacity of the battery pack 110. The measure of the charge capacity may be the amount of remaining charge of the battery pack 110 or may be the amount of total charge of the battery pack 110. For example, the battery capacity input status signal may indicate that the battery pack 110 has a 75% total charge. As another example, the battery capacity input signal may indicate that the battery pack 110 has a 25% remaining charge.

The velocity input signal indicates the velocity of the motor vehicle. Based on the input operating signals and input status signals, the vehicle controller 202 outputs one or more output control signals to control the vehicle. Examples of output control signals include a clutch engagement output signal that indicates whether the clutch 206 should engage or disengage, a starting power output signal that indicates the amount of starting power to start the engine 104, a target rotating speed output signal for the electric motor-generator 106, a target rotating speed output signal for the electric traction motor 108, a target rotating speed output signal for the engine 104, and a power or torque indicator signal. The target rotating speed signals may be used to synchronize the engine speed with the motor speeds when engaging the clutch.

The vehicle controller 202 may also communicate with the electric motor-generator 106, the clutch controller 204, and the traction motor 108. For example, the vehicle controller 202 may communicate the clutch engagement indicator output signal to the clutch controller 204.

The vehicle controller 102 may communicate with the engine 104, electric motor-generator 106, and the traction motor 108 to form a subsystem to facilitate charging the battery pack 110, directing power from the battery pack 110, and for operating the driving wheels 212. In one embodiment, the vehicle controller 102 may regulate a rotational differential between the engine 104, the motor-generator 106, and the traction motor 108 to facilitate engagement of the clutch 206. In another embodiment, the vehicle controller 102 may regulate a torque differential between the engine 104, the motor-generator 106, and the traction motor 108 to facilitate disengagement of the clutch 206.

When the hybrid power system 102 is operating in the hybrid power mode, the vehicle controller 202 may determine a vehicle total power demand according to one or more input operating signals, input status signals, or combinations thereof. For example, the vehicle controller 202 may determine the vehicle total power demand using a throttle depth input status signal, a velocity status input signal, or other signals. In one implementation, the vehicle controller 202 determines the total power demand based on a torque input status signal, a velocity input status signal, and an accelerator depth input status signal. The total power demand signal may be used to determine the required power output of one or more components, such as the engine 104, the motor-generator 106, and the traction motor 108. The vehicle controller 202 may also use other operating power requirements, such as motor vehicle optimal operating power, to determine one or more of the required power outputs.

In one implementation, the vehicle controller 102 may determine the traction motor 108 required power output by accounting for the best power output of the traction motor. One example for determining the required power output of the traction motor 108 and the required power output for the motor-generator 106 is shown below in the following equations:

If $P-P_e \leq P_{2\_MAX}$, then:

if $P-P_e < P_{2\_MIN}$, then:

$P_2 = P_{2\_MAX}$ and $P_e = P - P_2$, and $P_1 = 0;$

Else then $P_2 = P - P_e$ and $P_1 = 0$, and,      1)

If $P-P_e > P_{2\_MAX}$, then $P_2 = P_{2\_MAX}$ and $P_1 = P - P_e - P_2$, where:      2)

P=the motor vehicle total power request,
$P_e$=the motor vehicle optimal operating power,
$P_{2\_MAX}$=the maximum power output of the traction motor,
$P_2$=the required power output of the traction motor, and
$P_1$=the required power output of the engine.

Although each of the operating modes are shown separately in FIGS. 3 through 10, any operating mode may transition to another operating mode according to any combination of input operating signals, input status signals, and output control signals. For example, the hybrid power system 102 may transition from the parallel power mode to the regenerative braking mode, or from the regenerative braking mode to the charging power mode. Any other combinations of transitions are also possible depending on the state of the appropriate output signals and input signals.

Figure 36:
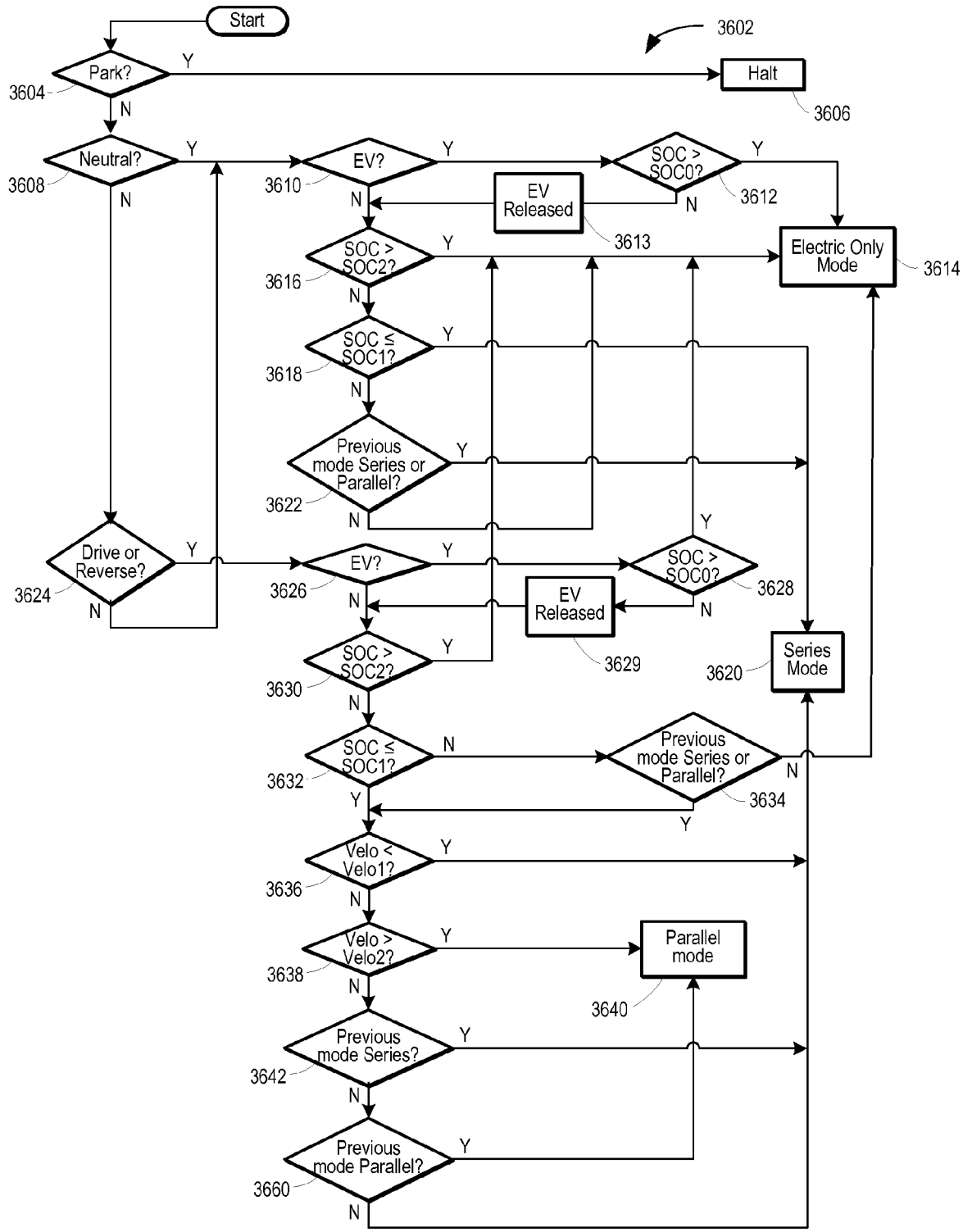
FIG. 36 is a flowchart showing control flow for various operating modes.

FIG. 36 shows one example of control system flow 3602 for controlling and/or changing the operating modes of a hybrid vehicle that employs the hybrid power system 102 and vehicle controller 202. In one embodiment, the vehicle controller 202 implements the control system flow 3602.

Initially, the vehicle controller 202 determines the present rank or gear mode of the hybrid motor vehicle. The present rank or gear mode may be determined by the vehicle controller 202 in conjunction with the rank unit 1250. If the vehicle controller 202 determines that the present gear-mode is a "park" gear-mode (3604), the vehicle controller 202 instructs the hybrid power system 102 to cease operation or to halt (3606). For example, the vehicle controller 202 may instruct the internal combustible engine 104, the electric motor-generator 106, and the electric traction motor 108 to cease operation. The vehicle controller 202 may also instruct the torque distribution assembly 1802 (clutch 206) to disengage.

If the vehicle controller 202 determines that the present gear-mode is not the "park" gear-mode, the control system flow determines whether the hybrid motor vehicle is in a "neutral" gear-mode (3608). If the "neutral" gear-mode has been selected (3608), the vehicle controller 202 may then determine if the user-selectable EV switch mode has been selected (3610). Depending on whether the pure EV driving mode has been selected, the control system flow compares the present battery pack 110 capacity SOC against various threshold values.

If the electric-only power mode has been selected (3610), the vehicle controller 202 compares the present battery capacity SOC with an electric-only minimum threshold $SOC_0$ (3612). The electric-only minimum threshold $SOC_0$ may represent the minimum value of the battery pack 110 discharging limit. For example, the electric-only minimum threshold $SOC_0$ may represent about a 10% to about a 15% remaining charge of the battery pack 110. Other values may be used, such as between about 5% and about 20%. In another embodiment, if the electric-only power mode has been selected, the vehicle will only operate in this selected mode if the required driving power is less than about 90% of the maximum power output of the traction motor 108. This value, for example, may range from about 75% to about 95%.

If the present battery capacity SOC is greater than the electric-only minimum threshold $SOC_0$ (3612), the control system flow sets the operating mode of the hybrid power system 102 to electric-only power mode (3614). If the present battery capacity SOC is not greater than the electric-only minimum threshold $SOC_0$ (3612), the EV mode is released (3613). Control flow for setting the operating mode to electric-only power mode is explained with reference to FIG. 40 below.

If the electric-only power mode has not been selected (3610), the present battery capacity SOC is compared with an efficient operating battery threshold $SOC_2$ (3616). The value of the efficient operating battery threshold $SOC_2$ may represent about a 50% electric charge of the battery pack 110. Other values may be used, such as between about 40% and about 60%. Battery capacity in the efficient operating battery threshold $SOC_2$ range indicates relatively efficient vehicle operation. If the present battery capacity SOC is greater than the efficient operating battery threshold $SOC_2$ (3616), the operating mode is set to electric-only power mode operation (3614).

If the present battery capacity SOC is not greater than the efficient operating battery threshold $SOC_2$ (3616), the present battery capacity SOC is compared against a minimum electric starting capacity threshold $SOC_1$ (3618). For example, the minimum electric starting capacity threshold $SOC_1$ may represent a 30% electric charge of the battery pack 110. Other values may be used, such as between about 20% and about 40%. Battery capacity above the minimum electric starting capacity threshold $SOC_1$ range indicates that sufficient battery power exists to start the engine 104. If the present battery capacity SOC is less than or equal to the minimum electric starting capacity threshold $SOC_1$ (3618), the series mode is set (3620). Control flow for setting the operating mode to series mode operation (3620) is explained with reference to FIG. 41 below.

The control system flow 3602 also considers a previous or existing operating mode when determining a next operating mode. For example, when the present battery capacity SOC is not less than or equal to the minimum electric starting capacity threshold $SOC_1$ (3618), and when the previous operating mode was either in the series mode or the parallel mode (3622), the operating mode is set to series mode operation (3620). In step (3622), if the previous operating mode of the hybrid power system 102 was neither the series mode nor the parallel mode (3622), the operating mode is set to electric-only power mode operation (3614).

If the vehicle is not in the "drive" gear-mode or the "reverse" gear-mode (3624), the control system flow assumes a neutral mode (3608). If "drive" or "reverse" gear mode has been selected (3624), control system flow determines if an electric-only power mode has been selected (3626). If the present battery capacity SOC is not greater than the electric-only minimum threshold $SOC_0$ (3628), then the EV mode is released (3629), and control system flow determines if the present battery capacity SOC is greater than the efficient operating battery threshold $SOC_2$ (3630). If the present battery capacity SOC is greater than the efficient operating battery threshold $SOC_2$ (3630), the control system flow sets the operating mode of the hybrid power system 102 to electric-only power mode (3614).

If the control system flow determines if the present battery capacity SOC is not less than or equal to the minimum electric starting capacity threshold $SOC_1$ (3632), the control system flow determines if the previous operating mode was the series mode or the parallel mode (3634). If neither mode was previously selected, the control system flow sets the operating mode of the hybrid power system 102 to electric-only power mode (3614).

Next, the vehicle controller 202 may evaluate the velocity of the vehicle relative to the present battery capacity, the previous operating modes, and/or other criteria. If the present velocity VELO is less than the lower velocity threshold $VELO_1$, the operating mode is set to series mode (3620). In one implementation, the value of the lower velocity threshold of the hybrid motor vehicle may be about 45 km/hr. This value may range, for example, between about 35 km/hr to about 55 km/hr.

Next, if the present velocity VELO is greater than the upper velocity threshold $VELO_2$ (3638), the operating mode is set to the parallel mode (3640). An example value for the upper velocity threshold $VELO_2$ is about 55 km/hr. Control flow for setting the operating mode to parallel mode operation (3640) is explained with reference to FIG. 42. If the present velocity VELO is not greater than the upper velocity threshold $VELO_2$ (3638), the vehicle controller 202 determines whether the previous operating mode was the series mode (3642). If the series mode was previously set (3642), the operating mode is then set to series mode (3620).

If the series mode was not previously set (3642), the vehicle controller 202 determines whether the previous operating mode was the parallel operating mode (3660). If the parallel mode was previously set (3660), the operating mode is then set to parallel mode (3640). If the parallel mode was not previously set (3660), the operating mode is then set to series mode (3620).

Figure 37:
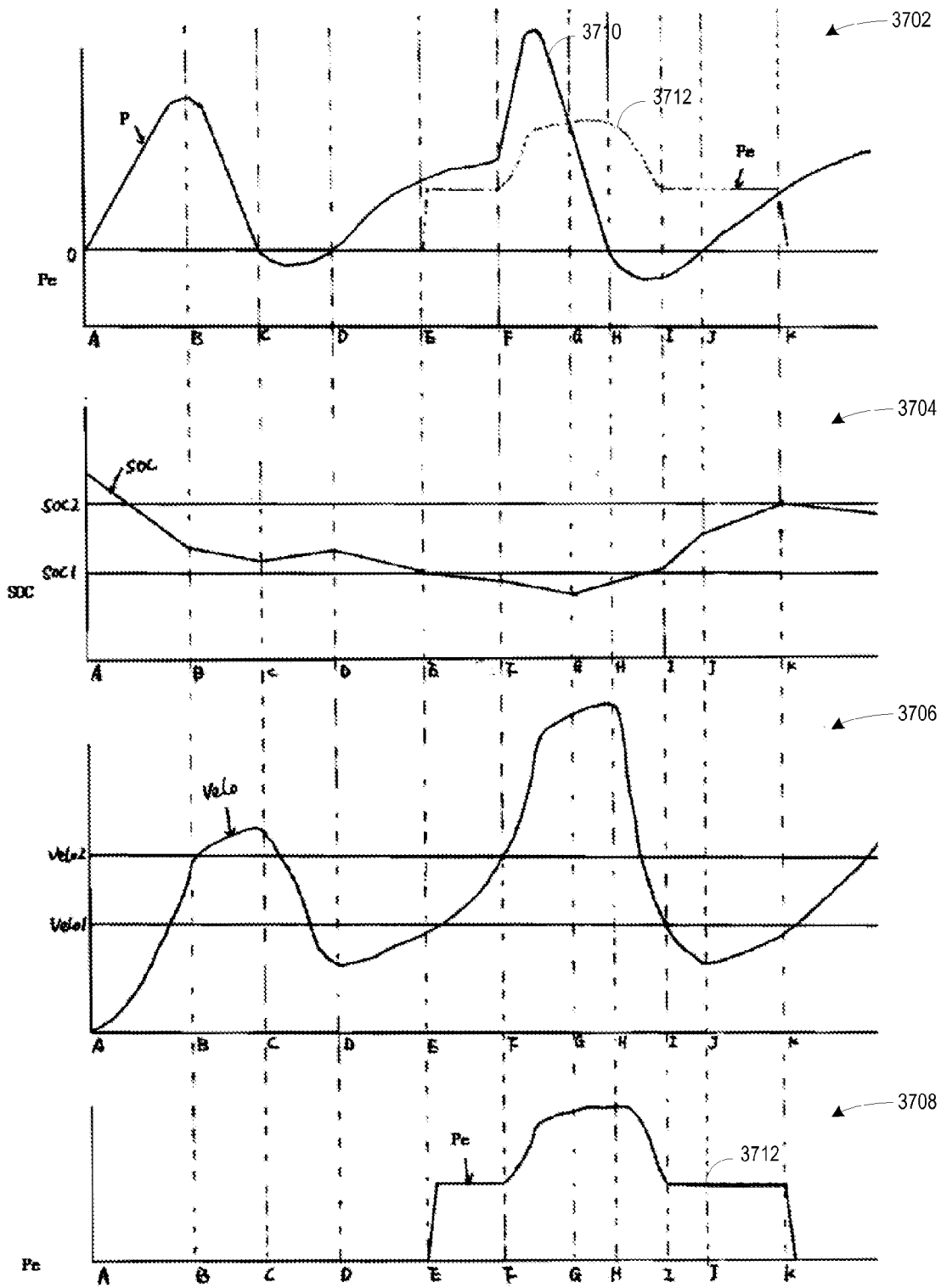
FIG. 37 shows four graphs directed to engine and battery parameters.

FIG. 37 shows four graphs directed to engine and battery power parameters, including a power charging graph 3702, an electric charging (ampere-hour) graph 3704, a velocity graph 3706, and a vehicle output power graph 3708. The power charging graph 3702 shows the power charging according to different operating modes of the hybrid power system 102. The vertical axis is power measured in kilowatts, and the horizontal axis represents the operating modes by letter segments. The power charging graph 3702 shows a vehicle power demand graph 3710 and a vehicle output power graph 3712. The vehicle output power graph 3708 is similar to the power charging graph 3702, but only includes the vehicle output power line 3712.

The electric charging graph 3704 shows the electric charging rate of the battery pack 110 according to different operating modes of the hybrid power system 102. The vertical axis is electric quantity measured in ampere-hours (A-h), and the horizontal axis shows the operating modes. The line labeled $SOC_1$ represents 30% of full battery charge, and the line $SOC_2$ represents 50% of full battery charge, for example.

The velocity graph 3706 shows the velocity of the hybrid motor vehicle according to different operating modes of the hybrid power system 102. The vertical axis is velocity, and the horizontal axis represents the operating mode. In one implementation, the line $VELO_1$ represents the lower velocity threshold of 45 km/hr and the line $VELO_2$ represents the upper velocity threshold of 55 km/hr.

According to FIG. 37, the operating modes of the hybrid vehicle may be divided into 10 segments, labeled as A-K. The segments are approximate and may vary depending on the specific implementation of the hybrid power system 102. In one implementation, segments A-E represent the electric-only power mode, segments E-F and I-K represent the series power mode, and the segments F-I represent the parallel mode.

In segments A-E, the hybrid power system 102 operates in the electric-only power mode. In this mode, the clutch 206 is disengaged, the traction motor 108 is in operation, and the electric-motor generator 106 and the internal combustible engine 104 are not operating.

In segments A-C, the vehicle is accelerating, which requires a positive torque. Accordingly, in this region, the present battery capacity SOC is decreasing and the battery pack 110 is supplying electricity to the traction motor 108.

Segments C-D represent deceleration of the vehicle. During deceleration, the traction motor 108 uses regenerative braking and receives feedback torque from the driving wheels 212 to provide an electric charge to the battery pack 110. Accordingly, in these segments, the present battery capacity SOC is increasing.

Segments D-E represent a transition from the electric-only power mode to the series hybrid mode, and the vehicle is accelerating. As the vehicle accelerates, the hybrid power system 102 draws power from the battery pack 110. When the system approaches segment E, the present battery capacity SOC is less than or equal to the electric starting battery capacity threshold $SOC_1$. As the system enters segment E region, it transitions from the electric-only power mode to the series mode.

Segments E-F represent operation in the series mode. In these segments, the clutch 206 disengages, the traction motor 108 operates the driving wheels 212, the engine 104 provides torque to the electric motor-generator 106, while the electric motor-generator 106 provides electricity to the traction motor 108. Since the hybrid vehicle is accelerating in segments E-F and the power demands of the traction motor 108 are greater than the electrical output of the electric motor-generator 106, the traction motor 108 begins receiving electricity from the battery pack 110. Accordingly, the present battery capacity SOC decreases in segments E-F regions.

Segment F represents a transition from the series mode to the parallel mode because the present velocity VELO of the vehicle meets and exceeds the upper velocity threshold $VELO_2$. Segments F-I represent the parallel mode. In these segments, the clutch 206 is engaged, and the engine 104, the electric motor-generator 106, and the electric traction motor 108 operate the driving wheels 212. The present battery capacity SOC decreases in segments F-G because the electric motor-generator 106 and electric traction motor 108 require additional electricity from the battery pack 110.

Segments G-H indicate that the vehicle requires a positive torque that is less than the output of the engine 104. Because the torque requirements of the vehicle are less than the torque output from the engine 104, the electric motor-generator 106 and the electric traction motor 108 operate to generate electricity from the surplus torque, which is then supplied to the battery pack 110. Accordingly, segments G-H show that the present battery capacity SOC is increasing.

Segments H-I indicate that the vehicle is decelerating and extra torque is available. As the vehicle decelerates, the internal combustible engine 104 and the traction motor 108 use surplus torque from the wheels to generate electricity and charge the battery pack 110. While approaching segment I, the operating mode transitions to the series mode because the present battery capacity SOC is increasing, and the present velocity VELO is less than or equal to the lower velocity threshold $VELO_1$.

Segments I-K represent operation in the series mode. In these segments, the clutch 206 is disengaged and the traction motor 108 operates the driving wheels 212. In addition, the engine 104 powers electric motor-generator 106, which provides electricity to the battery pack 110. As the system approaches segment K, it transitions to the electric-only power mode because the present battery capacity SOC is greater than or equal to the efficient operating battery threshold $SOC_2$. Alternatively, the hybrid power system 102 may operate according to the series mode until the electric-only power mode is selected.

Figure 38:
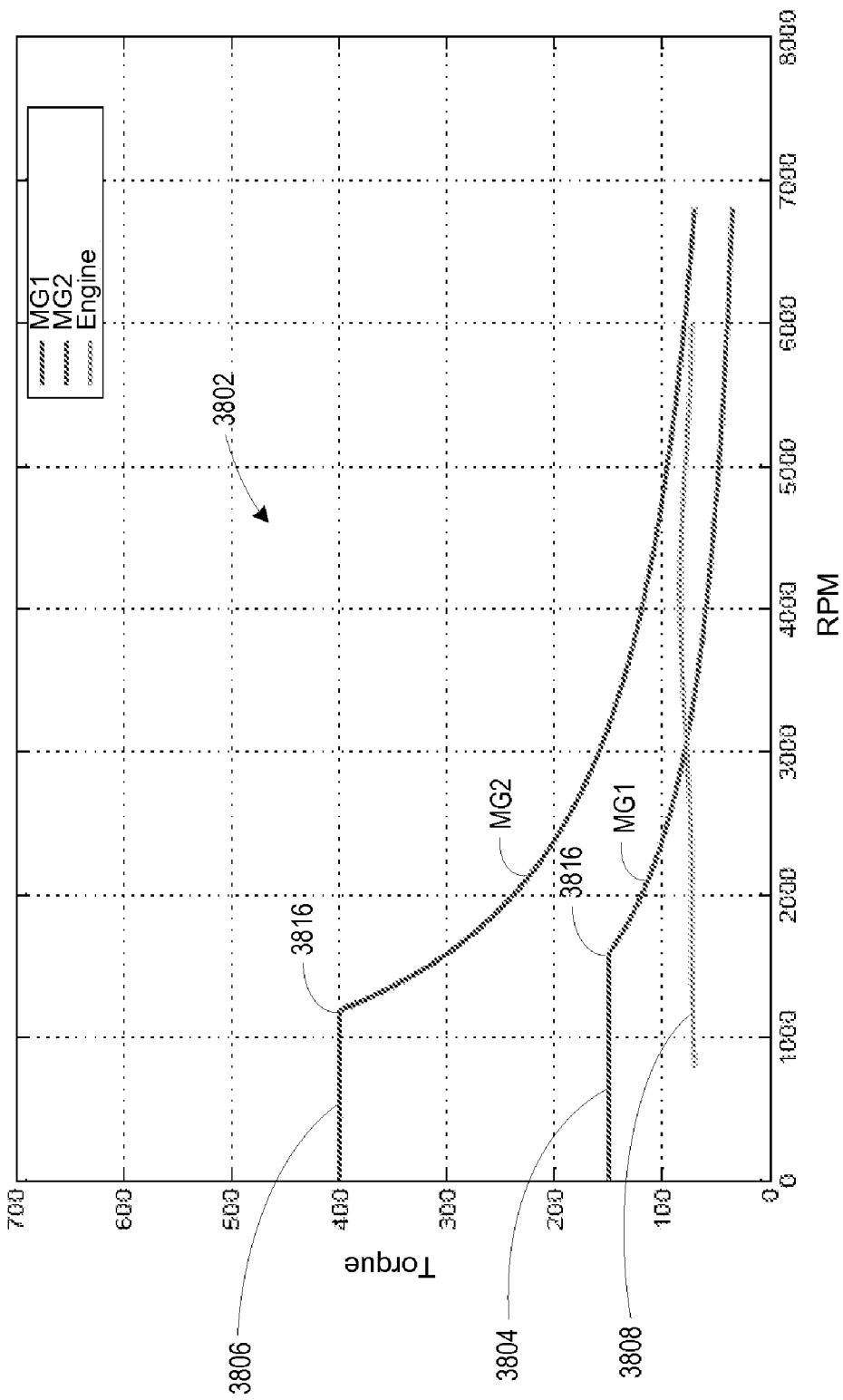
FIG. 38 is a graph showing the relationship between torque output and speed.

FIG. 38 shows a graph 3802 comparing output torque with vehicle speed and shown how the torque changes as the speed of the respective engine or motor increases. Graph 3804 represents the output torque of the motor-generator 106, graph 3806 represents output torque of the traction motor 108, and graph 3808 represents the output torque of the engine 104. Each graph represents the maximum output torque at different RPM, which is shown increasing along the horizontal axis.

When the engine 104 and/or motors 106, 108 are working, the output torque varies according to the vehicle demand. According to established engineering principles, power=torque×RPM×accelerator depth %. When the power output reaches a maximum value, the rpm increases, but the torque decreases. The data points 3816 on the graph 3802 indicate where the torque begins to decrease at the maximum power output available, thus as RPM continues to increase, the torque decreases. The data points 3816 shift along the horizontal axis for the different motors and the engine, respectively, because each device has a different maximum power.

This graph 3802 also explains why only a single drive gear or transmission is needed. As mentioned above, only a single drive gear is need to cover a large speed range, for example from zero km/hr to about 160 km/hr. The traction motor 108 is used to bring the vehicle from a stop to a cruising speed, whereas the engine 104 is not used at all at low vehicle speeds. To accomplish this, the starting torque of the traction motor 108 is very large, as shown by line 3806, and is much greater than the starting torque of the engine 104 (line 3808), thus the transmission or gear reduction assembly 1108 does not need to provide a large reduction ratio when compared to a conventional gas-engine vehicle.

Based on graph 3806 for the traction motor 108, only a single reduction ratio for the traction motor 108 is needed to permit the traction motor to meet the torque demand over the range of RPM. Because the engine 104 is not used to start vehicle, but rather is only used at high speeds, it can power the vehicle in the hybrid parallel tri-power mode using the same reduction ratio as used by the traction motor 108. For example, the engine 104 may be used above 4000 RPM to provide additional torque to the wheels.

FIGS. 40-43 are flowcharts showing control in the operating modes, such as the electric-only power mode, the series mode, and the parallel mode. The control flows shown in the flowcharts may be implemented by the vehicle controller 202, or other processing component of the system.

Figure 40:
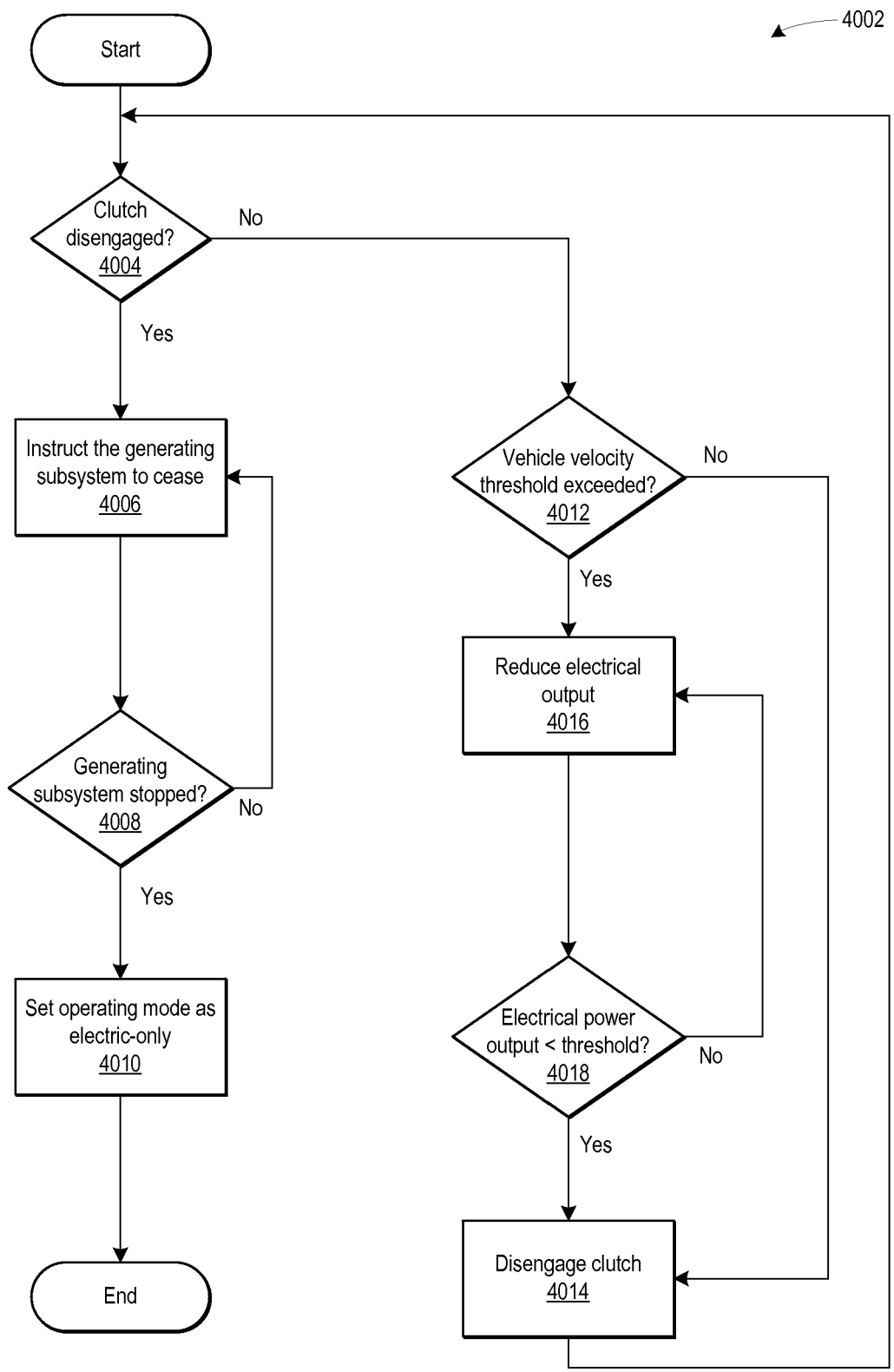
FIG. 40 is a flowchart showing electric-only power mode operation.

FIG. 40 shows electric-only power mode operation 4002. Initially, the control flow determines whether the clutch 206 is disengaged (4004). If the clutch is disengaged, the electrical power generating subsystem is instructed to cease operation (4006). An example of an electrical power generating subsystem is the combination of the internal combustible engine 104 and the electric motor-generator 106. Control flow then verifies that the electric power generating subsystem has ceased operation (4008). When the electric power generating subsystem has ceased operation (4008), the operating mode is set to electric-only power mode (4010).

If the clutch is engaged (4004), control flow determines if the present velocity VELO exceeds an electric-only power mode velocity threshold (4012), such as VELO$_1$ or VELO$_2$. If the vehicle velocity VELO does not exceed the electric-only power mode velocity threshold, the clutch 206 is disengaged (4014). However, if the present velocity VELO does exceed the electric-only power mode velocity threshold, the electrical power generating subsystem is instructed to reduce its torque or mechanical output (4016). The control flow may further determine if the present electric power output is less than or equal to an electric-only power mode electrical power output threshold (4018). In one implementation, the electric-only power mode electrical power output threshold is about 5 kW.

Figure 41:
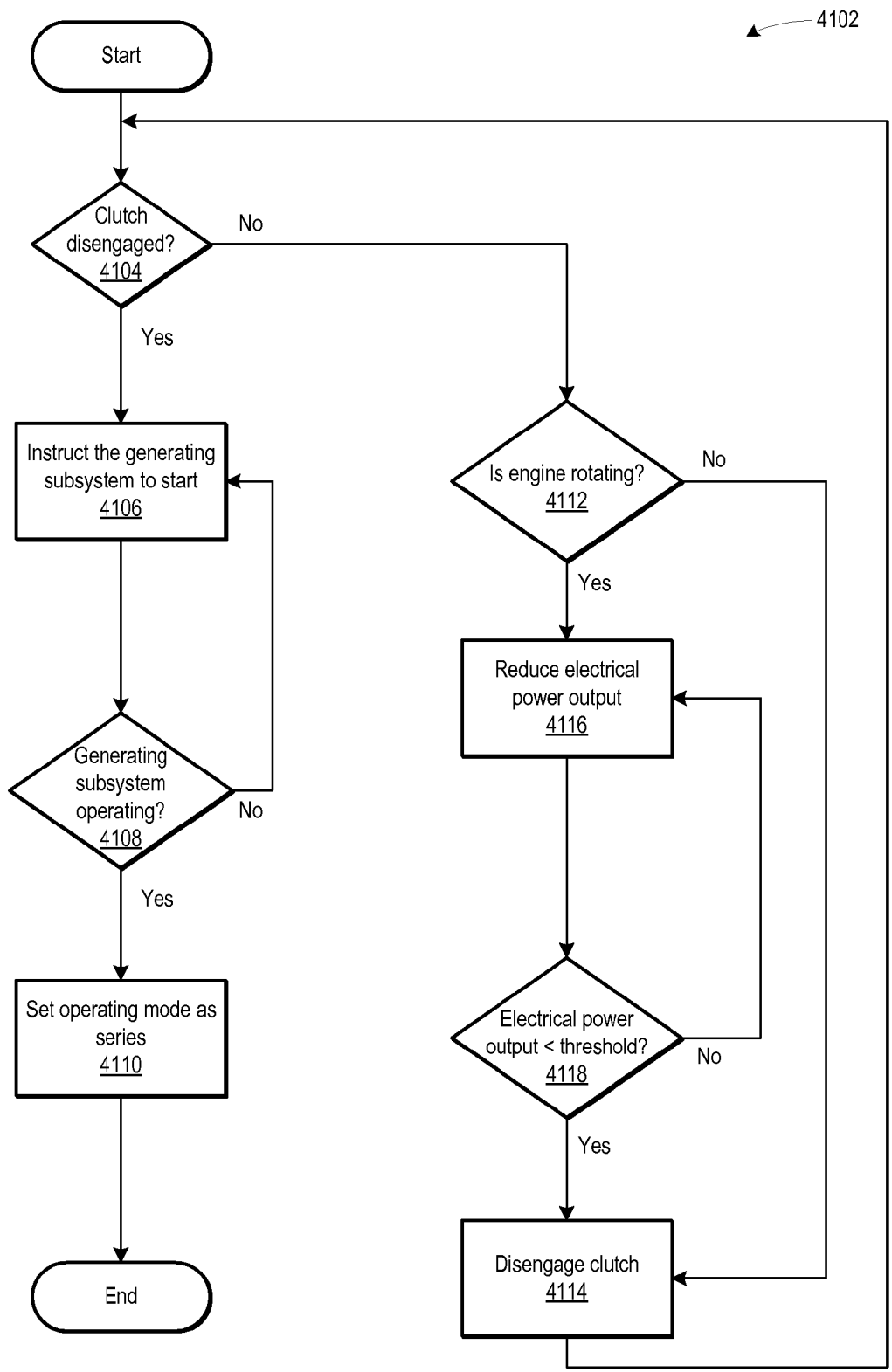
FIG. 41 is a flowchart showing series mode operation.

FIG. 41 shows series mode operation (4102). Initially, the control flow determines if the clutch 206 is disengaged (4104). If it is disengaged, the electrical power generating subsystem is instructed to start operation (4106). The control flow then verifies that the electric power generating subsystem has started operation (4108). When verified, the operating mode is set to series mode (4110). When the clutch 206 is not disengaged, control flow may then determine if the engine is rotating (4112). If the engine is not rotating, the clutch 206 is disengaged (4114). If the engine is rotating (4212), then the power output of the subsystem is reduced (4116), and when it is less than about 5 kw (4118), the clutch is disengaged (4114).

Figure 42:
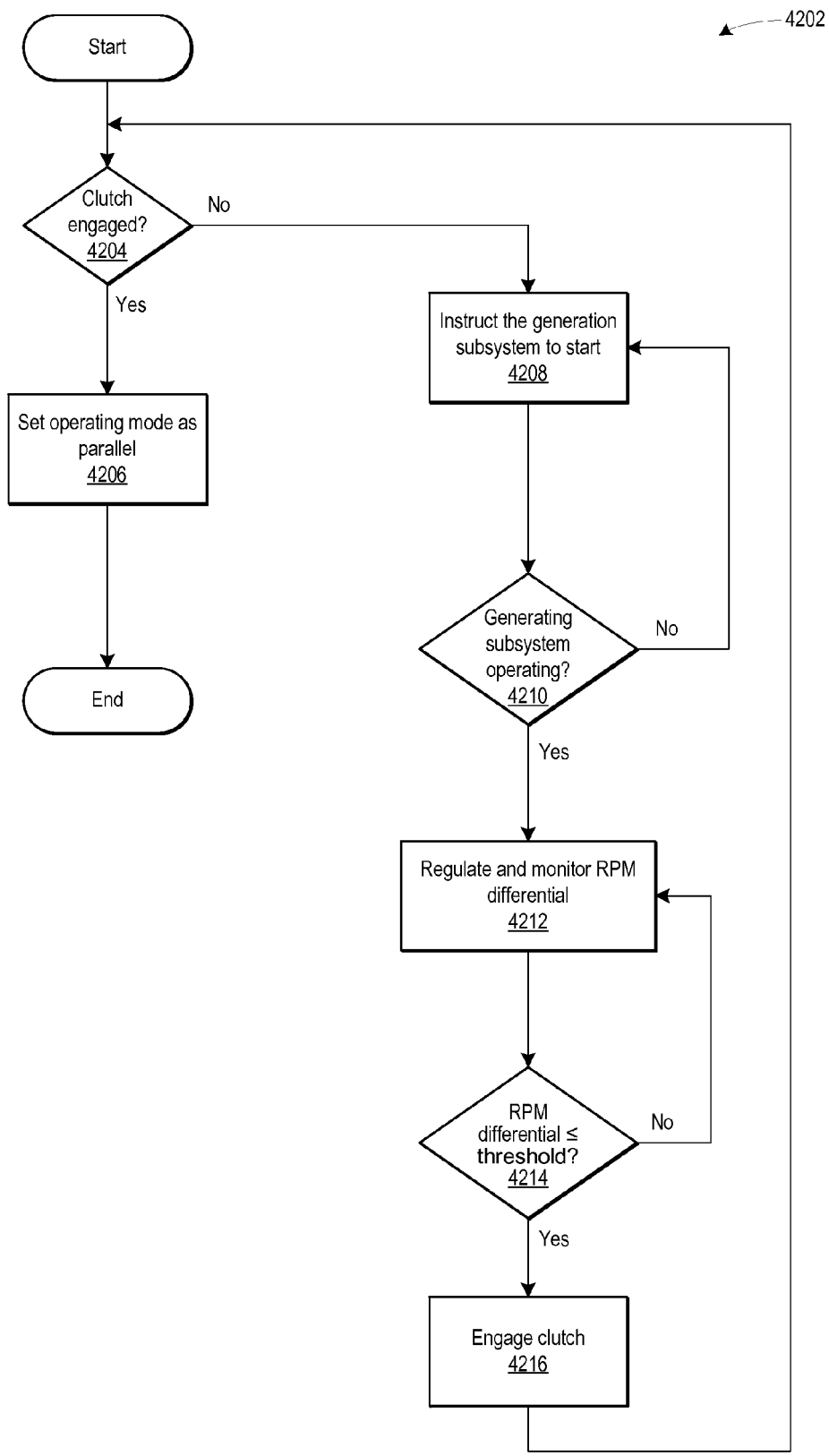
FIG. 42 is a flowchart showing parallel mode operation.

FIG. 42 shows a parallel mode operation (4202). Initially, control flow determines if the clutch 206 is engaged (4204). If the clutch is engaged, the parallel mode is set (4206). If the clutch is disengaged, the electrical power generating subsystem is started (4208). The control flow then verifies that the electric power generating subsystem has started operation (4210). After verification, the difference in RPM (RPM differential) between the electric power generating subsystem and the electric traction motor 108 is inspected (4212). In one implementation, the RPM differential between the electric power generating subsystem and the electric traction motor 108 is compared with a parallel mode RPM differential threshold (4214). For example, the parallel hybrid mode RPM differential threshold may be about 200 RPM. When the RPM differential between the electric power generating subsystem and the electric traction motor 108 is less than or equal to the parallel mode RPM differential threshold, the clutch is engaged (4216).

Figure 43:
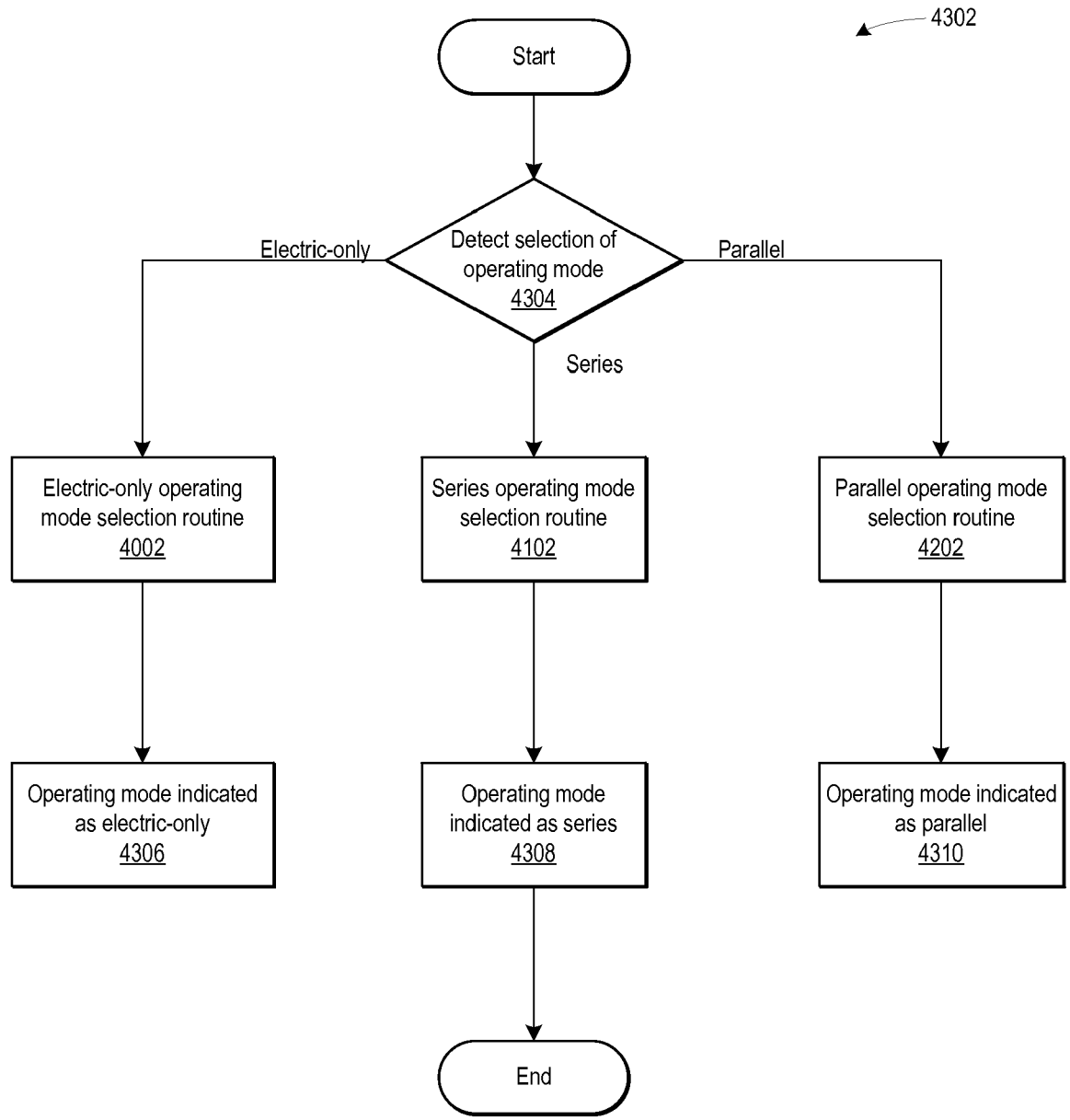
FIG. 43 is a flowchart showing mode switching.

FIG. 43 shows mode switching between the electric-only power mode, the series mode, and the parallel mode (4302). Initially, an operating mode selection is detected (4304). Depending on the selected operating mode, control flow may pass to the electric-only power mode process 4002, the series mode process 4102, or the parallel mode process 4202. After processes 4002, 4102, and 4202 have completed, the respective operating mode, namely, the electric-only power mode (4306), the series mode (4308), or the parallel mode (4310) are indicated. Sub-modes and alternative operating modes are also possible.

Figure 44:
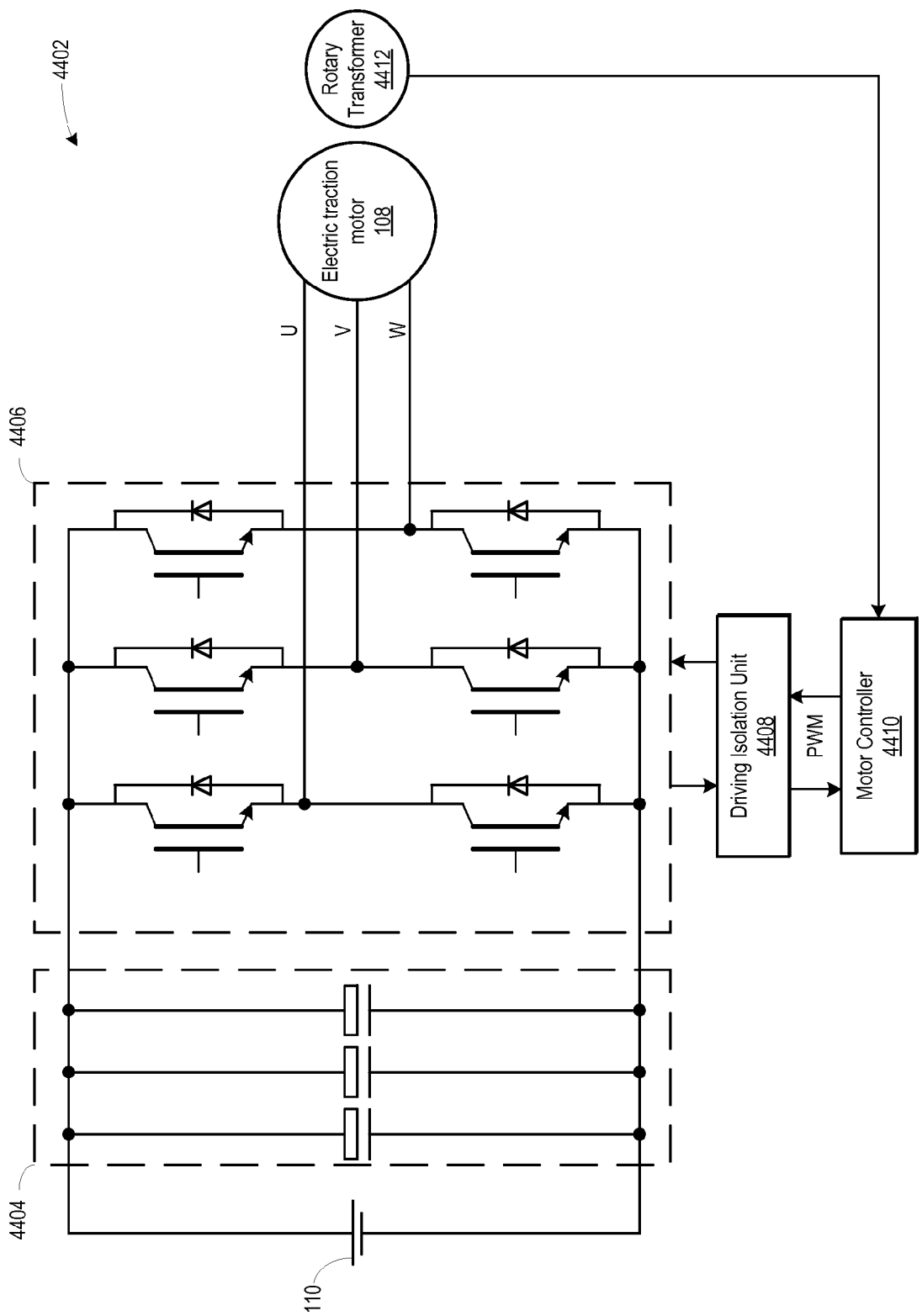
FIG. 44 is an electrical schematic diagram showing electrical power components.

FIG. 44 shows an electric schematic diagram 4402 that includes high power/high current components, such as inverters and transistors, and/or discrete components. The transistors comprising the inverters may be insulated gate bipolar transistors (IGBT), bipolar junction transistors (BJT) and/or high-power MOSFET devices. Other types of transistors may be used. The inverters may be arranged as a three-phrase full bridge inverter. The battery pack 110 is operatively coupled to a capacitor group 4404 and an inverter group 4406. The inverter group 4406 may include three groups of two inverters, with each group corresponding to one phase of the traction motor 108. The inverter group 4406 is coupled to a driving isolation unit 4408, which optically isolates the high power circuitry from the digital electronics portion, such as a motor controller 4410. The driving isolation unit 4408 may communicate with the motor controller 4410 using pulse width modulation (PCM) signals, which essentially control the duty cycle and on-off state of inverters.

The output of each of the inverter groups 4406 is coupled to an input winding (U, V, W) of the electric traction motor 108. The electric traction motor 108 is in turn coupled to a rotary transformer 4412. In one embodiment, the electric traction motor 108 is a Wye-connected three-phase motor. However, other types of motor connections may be used, such as a delta-connection, a split-phase connection, and the like. The rotary transformer 4412 monitors the rotor of the electric traction motor 108 and communicates the position of the rotor to the motor controller 4410.

Note that the vehicle controller 202 and/or motor controller 4402 are not limited to the embodiments described in this document. The vehicle controller 202 and/or the motor controller 4410, may include additional or different logic and may be implemented in many different ways. Such controllers may be implemented as a microprocessor, microcontroller, application specific integrated circuit (ASIC), discrete logic, or a combination of other types of circuits or logic. Similarly, the controllers may include various memory devices, such as, DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A hybrid vehicle having an engageable clutch assembly, the vehicle comprising:
   a battery system for receiving, storing and providing electrical power;
   an internal combustion engine configured to provide rotational power to a flywheel;
   a first motor/generator having a hollow rotor shaft rotatably operatively coupled to the flywheel;
   the first motor/generator configured to:
      in a first mode, receive electrical power from the battery system and provide rotational force to the hollow rotor shaft to rotate and start the internal combustion engine;
      in a second mode, receive rotational force through the hollow rotor shaft from the internal combustion engine to generate electrical power to charge the battery system;
      in a third mode, receive electrical power from the battery system and provide rotational force to the hollow rotor shaft;
   a gear transmission having a first port configured to receive rotational power in a first rotational range, and a second port configured to provide rotational power in a second range to at least one wheel of the vehicle;
   a second motor/generator having a rotor spindle concentrically disposed in the hollow rotor shaft and rotatably coupled to the first port of the gear transmission;
   the second motor/generator configured to:
      in a fourth mode, receive electrical power from the battery system and provide rotational force to the first port of the gear transmission;
      in a fifth mode, generate electrical power to charge the battery system when receiving rotational force from the first port of the gear transmission when the at least one wheel provides rotational force to the second port of the gear transmission;
   the engageable clutch assembly disposed between the flywheel and the first motor/generator and configured to operatively and fixedly couple the flywheel with the hollow rotor shaft of the first motor/generator so that the hollow rotor shaft rotates in unison with the flywheel, and
   wherein when engaged, the engageable clutch assembly further rotatably couples the rotor spindle of the second motor/generator with the flywheel and with the hollow rotor shaft, to provide additional rotational force from both the internal combustion engine and the first motor/generator to the first port of the gear transmission.

2. The hybrid vehicle of claim 1, wherein the engageable clutch assembly comprises:
   a driven plate assembly releasably coupled with the flywheel and configured to receive torsional power from the flywheel when the engageable clutch assembly is engaged, the driven plate assembly operatively coupled to the rotor spindle of the second motor/generator;
   an interconnecting plate assembly coupled with the flywheel and configured to receive the torsional power from the flywheel, and configured to provide torsional power to the hollow rotor shaft of the first motor/generator; and
   an engageable release bearing configured to:
      in an engaged position, engage the driven plate assembly with the flywheel to provide torsional power from the flywheel to the rotor spindle of the second motor/generator; and
      in a disengaged position, disengage the driven plate assembly from the flywheel so that torsional power from the flywheel is not transferred to the rotor spindle of the second motor/generator.

3. The hybrid vehicle of claim 2, comprising:
   a clutch cover adapted to house the driven plate assembly;
   the clutch cover fixedly coupled to the flywheel and configured to rotate with the flywheel; and
   wherein the driven plate assembly is configured to rotate with the flywheel and the clutch cover when the release bearing is in the engaged position, and is configured to remain stationary or rotate independently relative to the rotating flywheel and clutch cover, when the release bearing is in the disengaged position.

4. The hybrid vehicle of claim 3, further comprising:
   a spring arrangement disposed within the clutch cover;
   the spring arrangement in operative communication with the engageable release bearing and the driven plate;
   wherein when the engagable release bearing is in the engaged position, the spring arrangement permits contact between the driven plate and the flywheel; and
   wherein when the engagable release bearing is in the disengaged position, the spring arrangement maintains the driven plate away from the flywheel.

5. The hybrid vehicle of claim 4, wherein the spring arrangement is a diaphragm spring.

6. The hybrid vehicle of claim 2, wherein the driven plate includes a friction disk made of frictional material configured to contact a surface of the flywheel when the engagable release bearing is in the engaged position.

7. The hybrid vehicle of claim 3, wherein the interconnecting plate assembly comprises:
   an inner sideboard having a plurality of recesses, and configured to operatively couple the interconnecting plate assembly to the clutch cover;

a torsion plate in communication with the inner sideboard, and operatively coupled to the hollow rotor shaft of the first motor/generator;

an outer sideboard in communication with an opposite side of the torsion plate;

a plurality of shock absorbing elements mounted on the torsion plate and partially received within corresponding recesses of the inner sideboard; and the shock absorbing elements configured to absorb rotational shock transmitted between the internal combustion engine and the hollow rotor shaft of the first motor/generator.

8. The hybrid vehicle of claim 4, wherein when the engagable release bearing is in the disengaged position, the spring arrangement is in a flexed orientation; and wherein when the engagable release bearing is in the engaged position, the spring arrangement is in a non-flexed orientation.

9. The hybrid vehicle of claim 2, wherein the release bearing is hydraulically actuated to reciprocally move between the engaged position and the disengaged position.

10. The hybrid vehicle of claim 1, wherein the engageable clutch assembly is configured to:

operate in a first mechanical mode that selectively engages and disengages the internal combustion engine from the second motor/generator; and operate in a second mechanical mode that dampens at least one of shock and vibration between the internal combustion engine and the hollow rotor shaft of the first motor/generator.

11. The hybrid vehicle of claim 10, wherein the engageable release bearing is disposed between the internal combustion engine and the second motor/generator, and when in the engaged first position, causes the engageable clutch assembly to operate in the first mechanical mode.

12. The hybrid vehicle of claim 1, wherein the engageable release bearing is disposed within the hollow rotor shaft of the first motor-generator.

13. The hybrid vehicle of claim 1, wherein the engageable release bearing includes a central aperture configured to receive the rotor spindle of the second motor/generator therethrough.

14. The hybrid vehicle of claim 1, further comprising:

a controller configured to receive a first input signal indicating a rotational speed of the engine, and a second input signal indicating a rotational speed of the second motor/generator; and the controller configured to engage the engageable clutch assembly based on a difference in value between the first and second input signals.

15. A hybrid vehicle having an engageable clutch assembly, the vehicle comprising:

an internal combustion engine configured to provide rotational power to a flywheel;

a first motor/generator having a hollow rotor shaft rotatably operatively and fixedly coupled to the flywheel, and configured to provide rotational force to the hollow rotor shaft or receive rotational force from the hollow rotor shaft wherein the hollow rotor shaft rotates in unison with the flywheel;

a gear transmission having a first port and a second port, and configured to receive rotational power at the first port in a first rotational range, provide rotational power to the second port in a second rotational range to at least one wheel of the vehicle;

a second motor/generator having a rotor spindle concentrically disposed in the hollow rotor shaft and rotatably coupled to the gear transmission;

the second motor/generator configured to provide rotational force to the first port of the gear transmission or receive rotational force from the first port of the gear transmission;

the engageable clutch assembly disposed between the flywheel and the first motor/generator; and wherein when the engageable clutch assembly is engaged, the engageable clutch assembly further rotatably couples the rotor spindle of the second motor/generator with the flywheel and with the hollow rotor shaft, to provide additional rotational force from both the internal combustion engine and the first motor/generator to the first port of the gear transmission.

16. The hybrid vehicle of claim 15, wherein the gear transmission is configured to receive rotational power at the second port of the gear transmission in the second rotational range from at least one wheel of the vehicle, and provide rotational power to the first port in the first rotational range.

17. A hybrid vehicle having an engageable clutch assembly, the vehicle comprising:

a battery system for receiving, storing and providing electrical power;

an internal combustion engine configured to provide rotational power to a flywheel;

a first motor/generator having a rotor shaft rotatably operatively coupled to the flywheel;

the first motor/generator configured to:

in a first mode, receive electrical power from the battery system and provide rotational force to the rotor shaft to rotate and start the internal combustion engine;

in a second mode, receive rotational force through the rotor shaft from the internal combustion engine to generate electrical power to charge the battery system;

in a third mode, receive electrical power from the battery system and provide rotational force to the rotor shaft;

a gear transmission having a first port configured to receive rotational power in a first rotational range, and a second port configured to provide rotational power in a second range to at least one wheel of the vehicle;

a second motor/generator having a rotor spindle rotatably coupled to the first port of the gear transmission;

the second motor/generator configured to:

in a fourth mode, receive electrical power from the battery system and provide rotational force to the first port of the gear transmission;

the engageable clutch assembly disposed between the flywheel and the first motor/generator and configured to operatively and fixedly, couple the flywheel with the rotor shaft of the first motor/generator so that the hollow rotor shaft rotates in unison with the flywheel, and wherein when engaged, the engageable clutch assembly further rotatably couples the rotor spindle of the second motor/generator with the flywheel and with the rotor shaft, to provide additional rotational force from both the internal combustion engine and the first motor/generator to the first port of the gear transmission.

18. The hybrid vehicle of claim 17, wherein the engageable clutch assembly comprises:

a driven plate assembly releasably coupled with the flywheel and configured to receive torsional power from the flywheel when the engageable clutch assembly is engaged, the driven plate assembly operatively coupled to the rotor spindle of the second motor/generator;

an interconnecting plate assembly coupled with the flywheel and configured to receive the torsional power from the flywheel, and configured to provide torsional power to the rotor shaft of the first motor/generator; and an engageable release bearing configured to:
  in an engaged position, engage the driven plate assembly with the flywheel to provide torsional power from the flywheel to the rotor spindle of the second motor/generator; and
  in a disengaged position, disengage the driven plate assembly from the flywheel so that torsional power from the flywheel is not transferred to the rotor spindle of the second motor/generator.

19. A hybrid vehicle having an engageable clutch assembly, the vehicle comprising:
  an internal combustion engine configured to provide rotational power to a flywheel;
  a first motor/generator having a rotor shaft rotatably operatively and fixedly coupled to the flywheel, and configured to provide rotational force to the rotor shaft or receive rotational force from the rotor shaft, wherein the hollow rotor shaft rotates in unison with the flywheel;
  a gear transmission having a first port and a second port, and configured to receive rotational power at the first port in a first rotational range, provide rotational power to the second port in a second rotational range to at least one wheel of the vehicle;
  a second motor/generator having a rotor spindle rotatably coupled to the gear transmission;
  the second motor/generator configured to provide rotational force to the first port of the gear transmission or receive rotational force from the first port of the gear transmission;
  the engageable clutch assembly disposed between the flywheel and the first motor/generator; and
  wherein when the engageable clutch assembly is engaged, the engageable clutch assembly further rotatably couples the rotor spindle of the second motor/generator with the flywheel and with the rotor shaft, to provide additional rotational force from both the internal combustion engine and the first motor/generator to the first port of the gear transmission.

20. A hybrid vehicle having an engageable clutch assembly, the vehicle comprising:
  a battery system for receiving, storing and providing electrical power;
  an internal combustion engine configured to provide rotational power to a flywheel;
  a first motor/generator having a hollow rotor shaft rotatably operatively coupled to the flywheel;
  an engageable release bearing disposed within the hollow rotor shaft of the first motor-generator;
  the first motor/generator configured to:
    in a first mode, receive electrical power from the battery system and provide rotational force to the hollow rotor shaft to rotate and start the internal combustion engine;
    in a second mode, receive rotational force through the hollow rotor shaft from the internal combustion engine to generate electrical power to charge the battery system;
    in a third mode, receive electrical power from the battery system and provide rotational force to the hollow rotor shaft;
  a gear transmission having a first port configured to receive rotational power in a first rotational range, and a second port configured to provide rotational power in a second range to at least one wheel of the vehicle;
  a second motor/generator having a rotor spindle concentrically disposed in the hollow rotor shaft and rotatably coupled to the first port of the gear transmission;
  the second motor/generator configured to:
    in a fourth mode, receive electrical power from the battery system and provide rotational force to the first port of the gear transmission;
    in a fifth mode, generate electrical power to charge the battery system when receiving rotational force from the first port of the gear transmission when the at least one wheel provides rotational force to the second port of the gear transmission;
  the engageable clutch assembly disposed between the flywheel and the first motor/generator and configured to operatively couple the flywheel with the hollow rotor shaft of the first motor/generator, and
  wherein when engaged, the engageable clutch assembly further rotatably couples the rotor spindle of the second motor/generator with the flywheel and with the hollow rotor shaft, to provide additional rotational force from both the internal combustion engine and the first motor/generator to the first port of the gear transmission.

21. A hybrid vehicle having an engageable clutch assembly, the vehicle comprising:
  a battery system for receiving, storing and providing electrical power;
  an internal combustion engine configured to provide rotational power to a flywheel;
  a first motor/generator having a hollow rotor shaft rotatably operatively coupled to the flywheel;
  the first motor/generator configured to:
    in a first mode, receive electrical power from the battery system and provide rotational force to the hollow rotor shaft to rotate and start the internal combustion engine;
    in a second mode, receive rotational force through the hollow rotor shaft from the internal combustion engine to generate electrical power to charge the battery system;
    in a third mode, receive electrical power from the battery system and provide rotational force to the hollow rotor shaft;
  a gear transmission having a first port configured to receive rotational power in a first rotational range, and a second port configured to provide rotational power in a second range to at least one wheel of the vehicle;
  a second motor/generator having a rotor spindle concentrically disposed in the hollow rotor shaft and rotatably coupled to the first port of the gear transmission;
  the second motor/generator configured to:
    in a fourth mode, receive electrical power from the battery system and provide rotational force to the first port of the gear transmission;
    in a fifth mode, generate electrical power to charge the battery system when receiving rotational force from the first port of the gear transmission when the at least one wheel provides rotational force to the second port of the gear transmission;
  the engageable clutch assembly disposed between the flywheel and the first motor/generator and configured to operatively couple the flywheel with the hollow rotor shaft of the first motor/generator;
  an engageable release bearing disposed within the hollow rotor shaft of the first motor-generator, the engageable release bearing including a central aperture configured to receive the rotor spindle of the second motor/generator therethrough; and wherein when engaged, the engageable clutch assembly further rotatably couples the rotor spindle of the second motor/generator with the flywheel and with the hollow rotor shaft, to provide additional rotational force from both the internal combustion engine and the first motor/generator to the first port of the gear transmission.

* * * * *